(12) United States Patent
Combes et al.

(10) Patent No.: US 7,978,196 B2
(45) Date of Patent: Jul. 12, 2011

(54) EFFICIENT RENDERING OF PAGE DESCRIPTIONS

(75) Inventors: Ian Geoffrey Combes, Roselands (AU); Edward James Iskenderian, Toongabbie (AU); Vincent Groarke, Cork (IE); Joseph Leigh Belbin, Summer Hill (AU); Michael Warwick Chipman, Mona Vale (AU)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 11/680,702

(22) Filed: Mar. 1, 2007

(65) Prior Publication Data

US 2007/0206012 A1    Sep. 6, 2007

(30) Foreign Application Priority Data

Mar. 2, 2006   (AU) .............................. 2006200899
Dec. 21, 2006  (AU) .............................. 2006252197

(51) Int. Cl.
    *G06T 11/20* (2006.01)
(52) U.S. Cl. ......... 345/441; 345/467; 345/629; 345/636
(58) Field of Classification Search .......... 345/441–443, 345/467–471; 382/180
    See application file for complete search history.

(56) References Cited

U.S. PATENT DOCUMENTS

| | | | |
|---|---|---|---|
| 5,295,235 A | 3/1994 | Newman | |
| 5,644,406 A * | 7/1997 | Harrington et al. | ........... 382/239 |
| 6,049,339 A | 4/2000 | Schiller et al. | |
| 6,238,105 B1 | 5/2001 | Pardo | |
| 6,816,619 B2 | 11/2004 | Tlaskal et al. | |
| 6,961,067 B2 | 11/2005 | Moore | |
| 7,023,439 B2 * | 4/2006 | Martin et al. | ................. 345/428 |
| 7,084,878 B2 * | 8/2006 | Herceg et al. | ................. 345/555 |
| 7,145,681 B2 * | 12/2006 | Kato | ............................ 358/1.15 |
| 2002/0027563 A1 | 3/2002 | Van Doan et al. | ........... 345/630 |
| 2004/0085559 A1 * | 5/2004 | Danilo | ........................ 358/1.12 |
| 2005/0002455 A1 | 1/2005 | Lin et al. | |
| 2005/0067498 A1 * | 3/2005 | Smith | ........................ 235/494 |
| 2005/0116955 A1 * | 6/2005 | Cao | ............................ 345/441 |
| 2005/0122337 A1 * | 6/2005 | Chen | ............................ 345/545 |
| 2005/0200867 A1 * | 9/2005 | Faggion | ........................ 358/1.9 |
| 2005/0213130 A1 | 9/2005 | Bender et al. | |
| 2006/0001681 A1 * | 1/2006 | Smith | ........................ 345/629 |
| 2006/0082596 A1 * | 4/2006 | Karlov et al. | ................. 345/629 |
| 2006/0146362 A1 | 7/2006 | Romney | |
| 2006/1019298 | 8/2006 | Groarke et al. | |
| 2007/0206012 A1 | 9/2007 | Combes et al. | ............... 345/441 |

* cited by examiner

*Primary Examiner* — Xiao M Wu
*Assistant Examiner* — Charles Tseng
(74) *Attorney, Agent, or Firm* — Fitzpatrick, Cella, Harper & Scinto

(57) ABSTRACT

A method (600) is disclosed of generating a representation of a page (1500) to be rendered to a raster image (1600) of pixels. The page (1500) comprises one or more graphical objects (1520 and 1530), arranged in a rendering order. Each the object (1520 and 1530) comprises one or more object edges and an associated fill. The method (600) comprises decomposing the objects (1520 and 1530) into a plurality of fillmap edges (1750, 1755, 1760, 1765, and 1770) defining disjoint regions (1710, 1720, 1730, 1740, and 1780) of the page. The method (600) further comprises setting a reference from at least one fillmap edge (1750, 1755, 1760, 1765, and 1770) to a sequence comprising a plurality of fills to be composited to generate the values for all pixels within the defined region (1710, 1720, 1730, 1740, and 1780).

9 Claims, 48 Drawing Sheets

1800

| Index | Compositing Sequence |
|---|---|
| 1 | White |
| 2 | Grey |
| 3 | Bitmap / Grey |
| 4 | Bitmap / White |

Fig. 18

| Index | Compositing Sequence |
|---|---|
| 1 | White |
| 2 | Grey |
| 3 | Dark Grey |
| 4 | Bitmap / White |

| Index | Fill compositing sequence | Optimisation operation |
|---|---|---|
| 1 | Flat | NONE |
| 2 | Blend | FLATTEN TO PIXELS |
| 3 | Flat / Bitmap | FLATTEN TO BITMAP |
| 4 | Bitmap | CROP |

Fig. 33

EFFICIENT RENDERING OF PAGE DESCRIPTIONS

CROSS-REFERENCE TO RELATED PATENT APPLICATIONS

This application claims the right of priority under 35 U.S.C. §119 based on Australian Patent Application No. 2006200899, filed Mar. 2, 2006, and Australian Patent Application No. 2006252197, filed Dec. 21, 2006, which are incorporated by reference herein in their entirety as if fully set forth herein.

FIELD OF THE INVENTION

The present invention relates generally to computer-based printer systems and, in particular, to reduced memory printer systems for high-speed printing.

BACKGROUND

A computer application typically provides a page to a device for printing and/or display in the form of a description of the page, with the description provided to device driver software of the device in a page description language (PDL), such as Adobe® PostScript® or Hewlett-Packard® PCL. The PDL provides descriptions of objects to be rendered onto the page in a rendering (or Z-) order, as opposed to a raster image of the page to be printed. Equivalently, a set of descriptions of graphic objects may be provided in function calls to a graphics interface, such as the Graphical Device Interface (GDI) in the Microsoft Windows™ operating system, or X-11 in the Unix™ operating system. The page is typically rendered for printing and/or display by an object-based graphics system, also known as a Raster Image Processor (RIP).

Page representations e.g. PDL scripts vary in complexity. The complexity of a page representation is related to object density and the amount of overlap within the page. For example, for page representations containing text only the object density is low and there is usually no compositing to be performed. Hence, such a page representation would not be considered to be complex. In contrast, a page representation with hundreds of overlapping transparent bitmaps for example, requires compositing and bitmap interpolation and would be considered to be complex. Unfortunately, the complexity of a page representation is unknown until the entire page representation has been interpreted by the printer device. Due to the varying and unpredictable complexity of page representations a printer device cannot guarantee that all page representations can be rendered in real-time. Hence, typical printer devices found in the prior art spool an entire page of pixels in memory before shipping the rendered pixels to the printer engine.

In general a printer device renders the page to pixels in a memory buffer. The memory buffer may contain the pixels required for the entire page or for a band of the page. Once a band has been completely rendered to pixels, lossy compression is applied to the pixel data for that band to reduce the memory requirements of the printer. The compressed pixels are then stored in memory at least until the entire page has been rendered to pixels and compressed. Once the entire page has been spooled to memory, the compressed pixels are decompressed and shipped to the printer engine. In some cases, several pages may be spooled to memory before the compressed pixels are decompressed and shipped to the printer engine to allow constant paper feed in the device.

This approach has two major problems. Firstly, the page is rendered to pixels at the device resolution. An A4 page at 600 dpi resolution may require over one hundred megabytes of pixel data to be stored in memory. Compressing the pixel data alleviates the problem to some extent, particularly when the pixel data has already been halftoned. However, many megabytes of memory are still required to store the compressed pixel data.

The memory requirements of this configuration are particularly sensitive to an increase in page resolution, for example, an increase in page resolution from 600 dpi to 1200 dpi may increase the memory requirements by up to a factor of four. Similarly, the memory requirements of this configuration are also sensitive to an increase in page dimensions. A twelve colour channel A0 plotter may require several gigabytes of compressed pixel data to be stored in memory.

The second problem with this approach is that lossy image compression algorithms such as JPEG are generally used to reduce the memory requirements of the printing device. As a result there will be a loss in the quality of the rendered output. Such quality degradation is manifest when the compression algorithm is applied to sharp edges commonly found in text and graphic regions of the page, resulting in undesirable visual artefacts.

Yet another problem exists with printer devices which operate in low memory environments. As complex page representations generally require a large amount of memory for storage and processing, printer devices with low memory may not be able to both store and process the entire page representation. Typical low memory devices found in the prior art divide the page representation into several layers. Each layer will contain objects within a predetermined range of Z-orders. In these devices, each layer will be rendered into a background image. This background image is then compressed and subsequently decompressed as subsequent layers are rendered into the buffer. A lossy compression algorithm such as JPEG is used to compress the background image. As a result of several compression and decompression stages the final quality of the image may incur substantial loss.

SUMMARY

It is an object of the present invention to substantially overcome, or at least ameliorate, one or more disadvantages of existing arrangements.

According to an aspect of the present invention, there is provided a page representation adapted to be printed, said page representation comprising a plurality of non-overlapping regions having edges, said edges being aligned with pixel boundaries, each said region being associated with a fill compositing sequence, wherein:

at least one said region spans a plurality of pixels vertically and a plurality of pixels horizontally;

the associated fill compositing sequence of said at least one region comprises a plurality of fills; and all pixels in said at least one region share a reference to said associated fill compositing sequence.

According to another aspect of the present invention, there is provided a method of generating a representation of a page to be rendered to a raster image of pixels, said page comprising one or more graphical objects in a rendering order, each said object comprising one or more edges and an associated fill, said method comprising the steps of:

decomposing said objects into a plurality of edges, each said edge being aligned with pixel boundaries, at least one said edge extending over a plurality of contiguous scanlines of said raster image; and setting a reference from at least one said fillmap edge to a sequence of said fills to be composited to generate the colours for a span of contiguous pixels between said fillmap edge and another said fillmap edge, or between said fillmap edge and a boundary of said raster image, along a scanline.

According to another aspect of the present invention, there is provided a method of rendering a representation of a page to a raster image of pixels, said representation comprising a plurality of non-overlapping regions having edges, said edges being aligned with pixel boundaries, at least one said region spans a plurality of pixels vertically and a plurality of pixels horizontally, each said region being associated with a fill compositing sequence, the associated fill compositing sequence of said at least one region comprises a plurality of fills, and all pixels in said at least one region share a reference to said associated fill compositing sequence, said method comprising the steps, for a current scanline of said raster image, of:
  (a) determining one or more spans of contiguous pixels on said current scanline, said spans being bounded by said edges;
  (b) identifying, for each said span, an associated fill compositing sequence; and
  (c) compositing, for each said span, said associated fill compositing sequence to generate the pixels in said span.

According to yet another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the present invention will now be described with reference to the drawings, in which:

FIG. 18 shows a table of known fill compositing sequences derived from the page representation shown in FIG. 15;

FIG. 22 shows a table of known fill compositing sequences derived from the page representation shown in FIG. 19;

FIG. 33 shows a table of fillmap fill compositing sequences;

DETAILED DESCRIPTION

Figure 1:
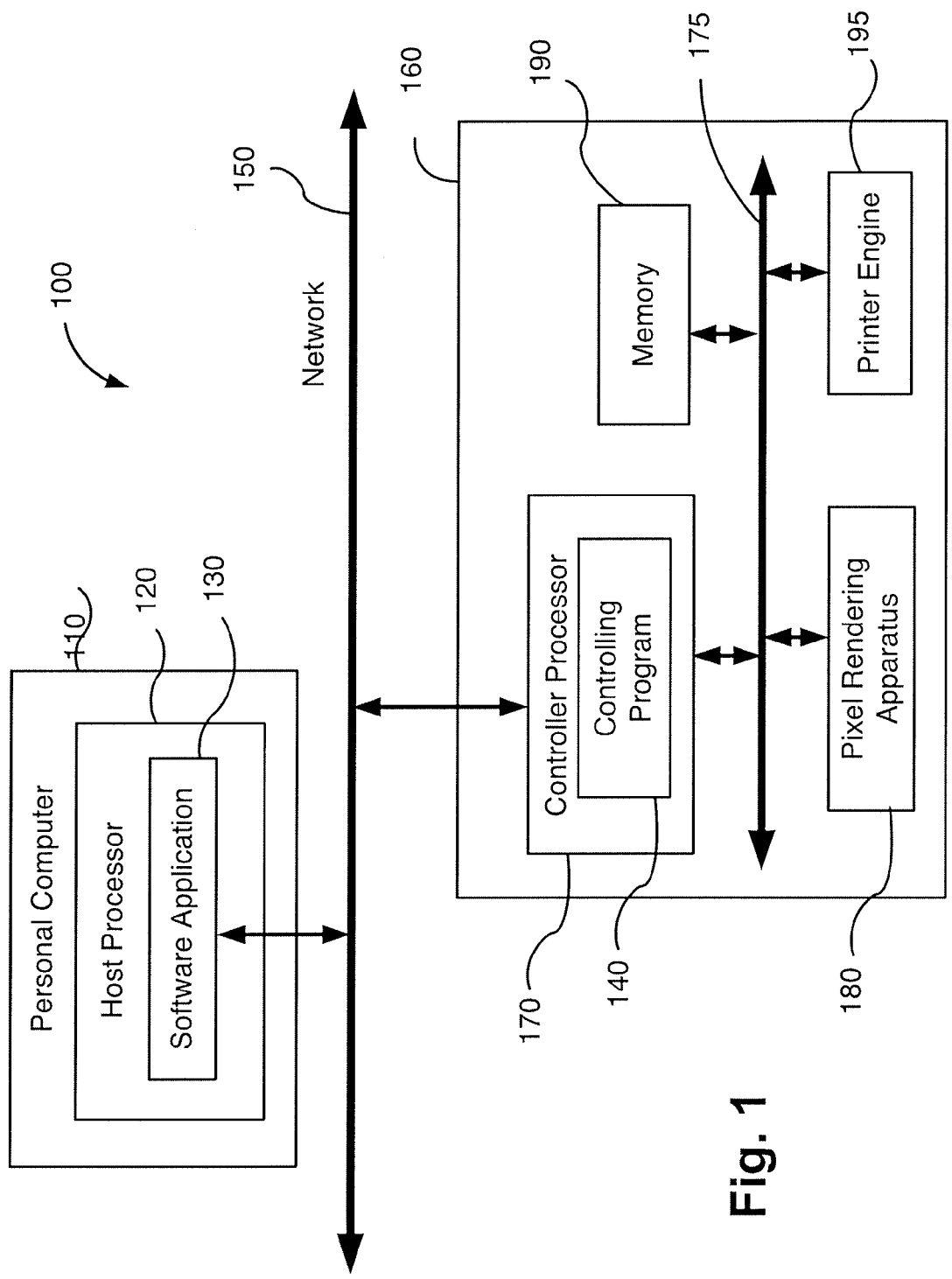
FIGS. 1 to 3 show schematic block diagrams of a pixel rendering systems for rendering computer graphic object images according to the present invention.

Where reference is made in any one or more of the accompanying drawings to steps and/or features, which have the same reference numerals, those steps and/or features have for the purposes of this description the same function(s) or operation(s), unless the contrary intention appears.

Aspects of prior art pixel rendering systems are described before describing embodiments of the invention. It is noted however that the discussions contained in the "Background" section and the prior art systems described below relate to systems which form prior art through their respective publication and/or use. Such should not be interpreted as a representation by the present inventors or patent applicant that such documents or systems in any way form part of the common general knowledge in the art.

FIG. 1 shows a schematic block diagram of a pixel rendering system 100 for rendering computer graphic object images in accordance with the present invention. The pixel rendering system 100 comprises a personal computer 110 connected to a printer system 160 through a network 150. The network 150 may be a typical network involving multiple personal computers, or may be a simple connection between a single personal computer and printer system 160.

The personal computer 110 comprises a host processor 120 for executing a software application 130, such as a word processor or graphical software application.

The printer system 160 comprises a controller processor 170 for executing a controlling program 140, a pixel rendering apparatus 180, memory 190, and a printer engine 195 coupled via a bus 175. The pixel rendering apparatus 180 is in the form of an ASIC coupled via the bus 175 to the controller processor 170, and the printer engine 195. However, the pixel rendering apparatus 180 may also be implemented in software executed in the controller processor 170.

In the pixel rendering system 100, the software application 130 creates page-based documents where each page contains objects such as text, lines, fill regions, and image data. The software application 130 sends a high level description of the page (for example a PDL file) to the controlling program 140 executing in the controller processor 170 of the printer system 160 via the network 150.

The controlling program 140 receives the description of the page from the software application 130, and decomposes the graphical objects into edges, levels and fills. These edges, levels and fills are called the first set of primitives. The fill may be a flat fill representing a single colour, a blend representing a linearly varying colour, a bitmap image or a tiled (i.e. repeated) image.

The controlling program 140 then further processes this first set of primitives to generate a fillmap and a table of known fill compositing sequences. This fillmap and table of known fill compositing sequences are called the second set of primitives. The program executing on the controller processor 170 is also responsible for providing memory 190 for the pixel rendering apparatus 180, initialising the pixel rendering apparatus 180, and instructing the pixel rendering apparatus 180 to start rendering the job.

The pixel rendering apparatus 180 then uses the second set of primitives to render the page to pixels. The output of the pixel rendering apparatus 180 is colour pixel data, which may be used by printer engine 195.

The fillmap is a region based representation of a page. The fillmap maps a region within the page to a fill compositing sequence which will be composited to generate the colour of each pixel within that region. Therefore all pixels within the region can be said to share a reference to the fill compositing sequence associated with that region. Multiple regions within a fillmap can map to the same fill compositing sequence. Regions within the fillmap are disjoint, i.e. do not overlap, and hence each pixel in the rendered page can only belong to a single region. Each region within the fillmap is defined by a fillmap edge which activates the region, or more precisely, activates the fill compositing sequence associated with the region. Fillmap edges:

- are monotonically increasing in the y-direction of the page;
- do not intersect;
- are aligned with pixel boundaries, meaning that each fillmap edge consists of a sequence of segments each of which follows a boundary between two contiguous pixels;
- contain a reference field referring to the index of the fill compositing sequence, within the table of known fill compositing sequences, required to be composited to generate the value of each pixel in the region which the fillmap edge defines; and
- activates a single region.

On any given scanline, starting at the fillmap edge which activates a region and progressing in the direction of increasing x, the region remains active until a fillmap edge which activates a further region is encountered. When such an edge is encountered, the active region is deactivated, and the region corresponding to that edge is activated.

For a fillmap to be a compact page representation, at least one region should span a plurality of pixels both vertically and horizontally, which means the edge defining that region must extend over two or more contiguous scanlines.

The fill compositing sequence active within each region of pixels defined by the fillmap is stored in the table of known fill compositing sequences. A fill compositing sequence is a sequence of Z-ordered levels, where each level contains attributes such as a fill, the opacity of the level, a raster operation which determines how to mix the colour data of this level with other overlapping levels, and the priority, or Z-order of the level. A fill compositing sequence contains references to all the objects or levels which may contribute colour to the pixels within the region, in rendering order.

Figure 15:
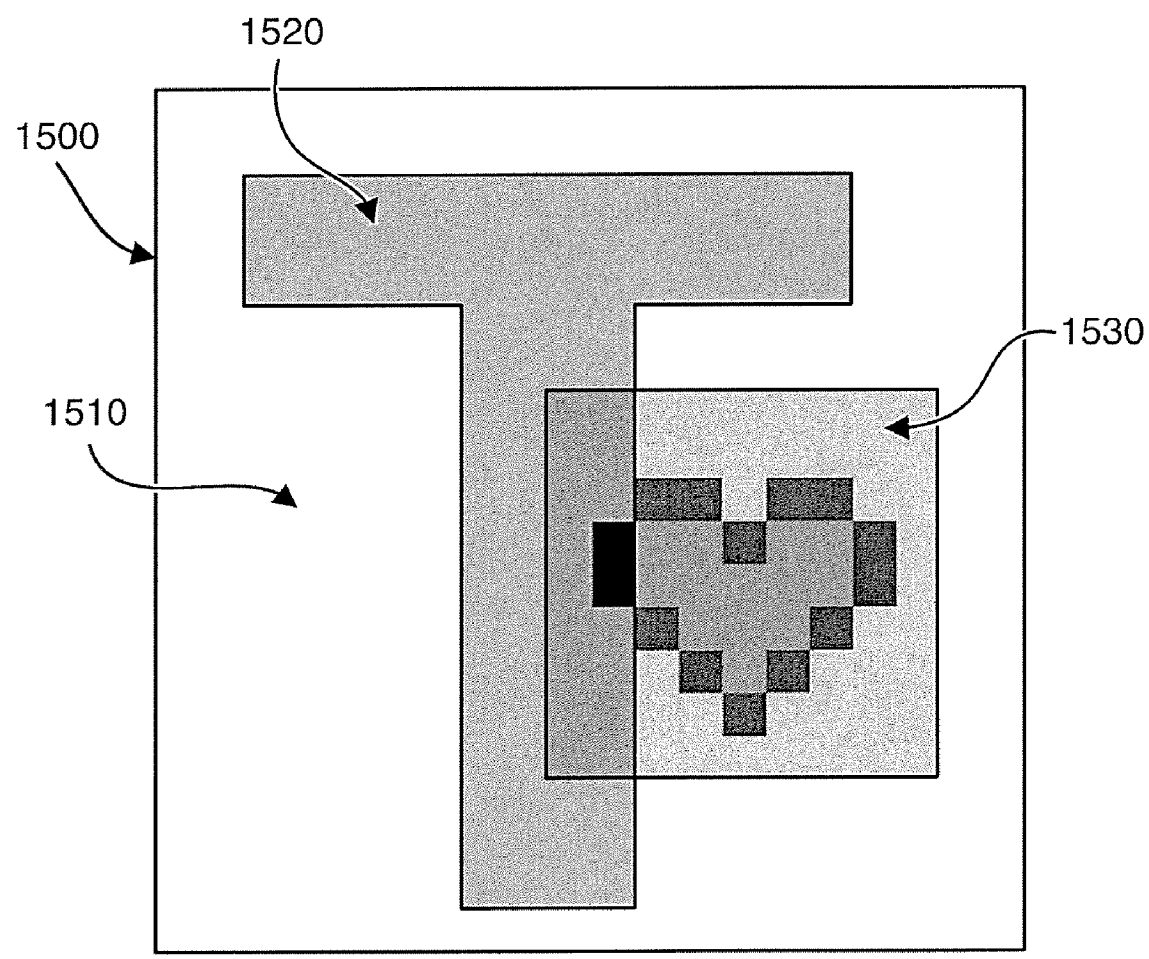
FIG. 15 shows a page representation.
Figure 16:
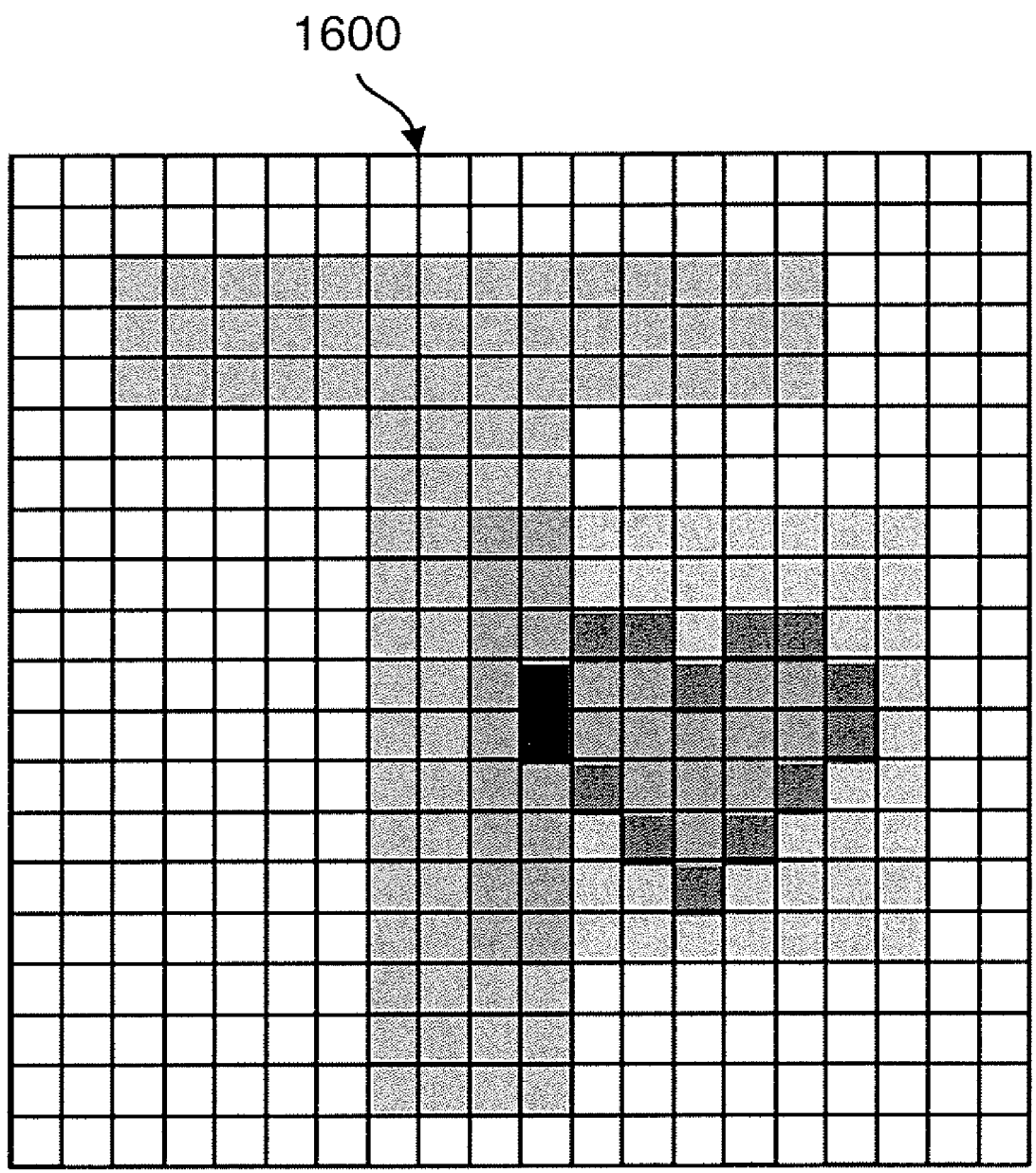
FIG. 16 shows a bitmap representation of the page representation shown in FIG. 15.

FIG. 15 shows a page representation 1500 containing object primitives. These object primitives include a white background 1510; a fill path 1520 with a light grey flat fill and a square 1530 with a bitmap fill. The square 1530 with the bitmap fill is semi-transparent and has a higher priority than the fill path 1520 with the light grey flat fill. In addition, the square 1530 with the bitmap fill partially overlaps the fill path 1520 with the light grey flat fill. FIG. 16 shows a raster image 1600 of the page of which the representation 1500 is shown in FIG. 15.

Figure 17:
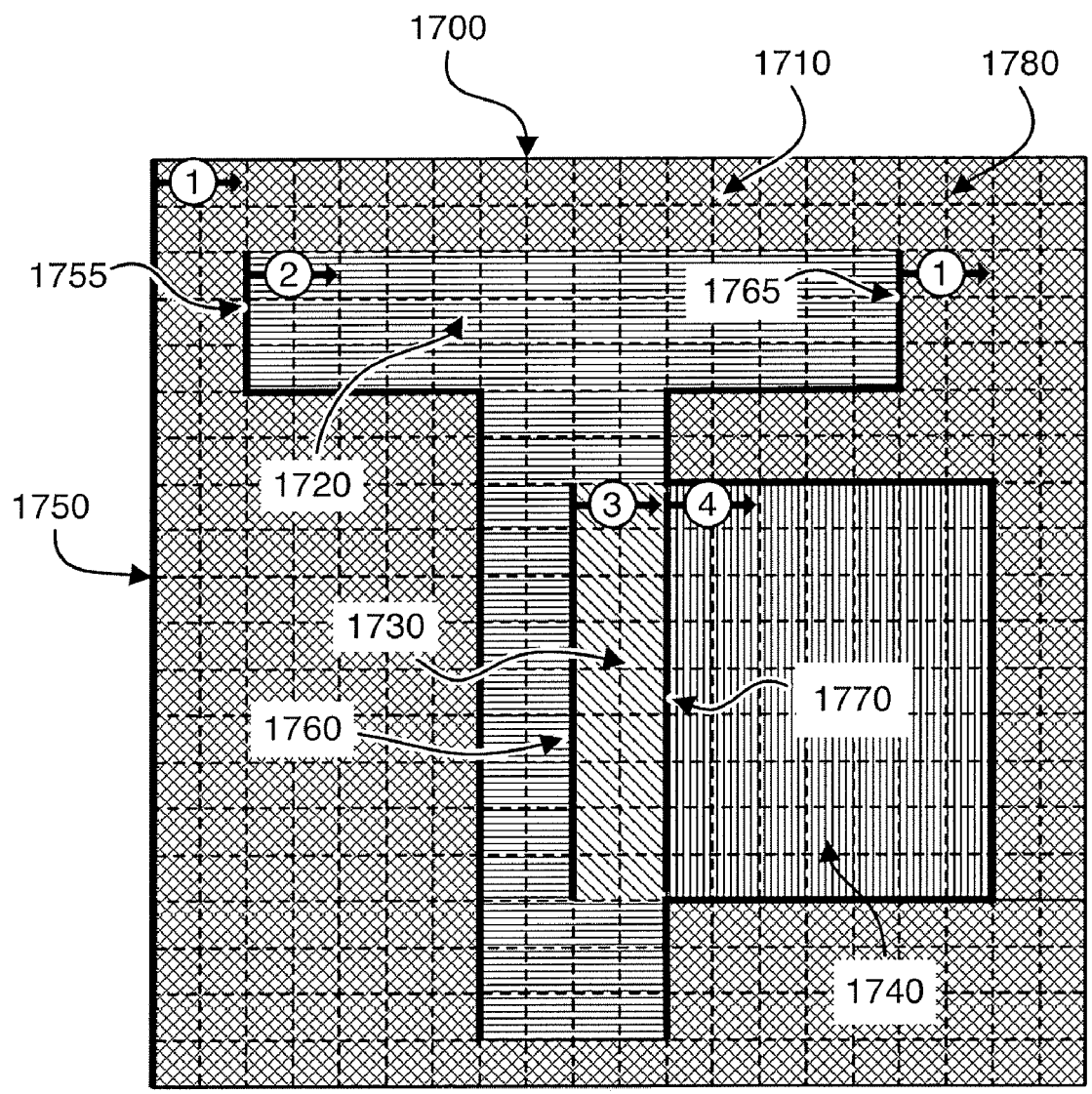
FIG. 17 shows a fillmap representation of the page representation shown in FIG. 15.

FIG. 17 shows a fillmap representation of the page of which the page representation 1500 is shown in FIG. 15. In FIG. 17 the background 1510, the fill path 1520 and square 1530 are decomposed into fillmap edges 1750, 1755, 1760, 1765, and 1770. The fillmap edges 1750, 1755, 1760, 1765, and 1770 divide the fillmap representation 1700 into several regions 1710, 1720, 1730, 1740, and 1780. Each region corresponds to a single fill compositing sequence which is derived from the page representation 1500 in FIG. 15. Each region in the fillmap 1700 also corresponds to a set of locations in the raster image 1600 shown in FIG. 16 whose colour is derived from the fill compositing sequence associated with that region.

The first region 1710 in the fillmap 1700 corresponds to the white background 1510 in the representation 1500 shown in FIG. 15. The region 1710 is activated by fillmap edge 1750. The set of locations in the raster image 1600 shown in FIG. 16 which correspond to this region 1710 will derive their colour from the fill compositing sequence corresponding to this region 1710. The fill compositing sequence corresponding to this region 1710 is the compositing sequence with a single level corresponding to the white background 1510 in the representation 1500 shown in FIG. 15 and is stored at index 1 in the table of known fill compositing sequences 1800 as shown in FIG. 18. The fillmap edge 1750 which activates this region 1710 contains a fill compositing sequence index (fill index) with a value set to 1 (shown by the arrow numbered "1"), which is the index of the fill compositing sequence with a single level corresponding to the white background 1510, within the table of fill compositing sequences 1800.

The second region 1720 in the fillmap 1700 corresponds to the fill path 1520 with a light grey flat fill in the representation 1500 shown in FIG. 15. The region 1720 is activated by the fillmap edge 1755. The set of locations in the raster image 1600 shown in FIG. 16 which correspond to this region 1720 will derive their colour from the fill compositing sequence corresponding to this region 1720. The fill compositing sequence corresponding to this region 1720 is the fill compositing sequence with a single level corresponding to the fill path 1520 with a light grey flat fill in the representation 1500 shown in FIG. 15 and is stored at index 2 in the table of fill compositing sequences 1800 as shown in FIG. 18. The fillmap edge 1755 which activates this region 1720 contains a fill index with a value set to 2, which is the index of the compositing sequence with a single level corresponding to the fill path 1520 with the light grey flat fill, within the table of compositing sequences 1800.

The third region 1730 in the fillmap 1700 corresponds to the region of overlap between the fill path 1520 with the light grey flat fill and the square 1530 with the semi-transparent bitmap fill in the representation 1500 shown in FIG. 15. The region 1730 is activated by the fillmap edge 1760. The set of locations in the raster image 1600 shown in FIG. 16 which correspond to this region 1730 will derive their colour from the fill compositing sequence corresponding to this region 1730. The fill compositing sequence corresponding to this region 1730 is the compositing sequence with two levels, where the topmost level corresponds to the square 1530 with the semi-transparent bitmap fill and the bottommost level corresponds to the fill path 1520 with the light grey flat fill in the representation 1500 shown in FIG. 15. This fill compositing sequence is stored at index 3 in the table of compositing sequences 1800 as shown in FIG. 18. The fillmap edge 1760 which activates this region 1730 contains a fill index with a value set to 3, which is the index of the compositing sequence with two levels, where the topmost level corresponds to the square 1530 with the semi-transparent bitmap fill and the bottommost level corresponds to the fill path 1520 with the light grey flat fill, within the table of compositing sequences 1800.

The fourth region 1740 in the fillmap 1700 corresponds to the region of overlap between the square 1530 with the semi-transparent bitmap fill and the white background 1510 in the representation 1500 shown in FIG. 15. The region 1740 is activated by the fillmap edge 1770. The set of locations in the raster image 1600 shown in FIG. 16 which correspond to this region 1740 will derive their colour from the fills corresponding to this region 1740. The fill compositing sequence corresponding to this region 1740 is the fill compositing sequence with two levels, where the topmost level corresponds to the square 1530 with the semi-transparent bitmap fill and the bottommost level corresponds to the white background 1510 in the representation 1500 in FIG. 15. This fill is stored at index 4 in the table of fill compositing sequences 1800 as shown in FIG. 18. The fillmap edge 1770 which activates this region 1740 contains a fill index with a value set to 4, which is the index of the fill compositing sequence with two levels, where the topmost level corresponds to the square 1530 with the semi-transparent bitmap fill and the bottommost level corresponds to the white background 1510, within the table of compositing sequences 1800.

The fifth region 1780 in the fillmap 1700 corresponds to the white background 1510 in the representation 1500 shown in FIG. 15. The region 1710 is activated by fillmap edge 1765. The fillmap edge 1765 which activates this region 1710 contains a fill compositing sequence index (fill index) with a value set to 1 (shown by the arrow numbered "1"), which is the index of the fill compositing sequence with a single level corresponding to the white background 1510, within the table of fill compositing sequences 1800.

After the fillmap 1700 has been generated, the fillmap 1700 can be efficiently rendered to a raster image. The resulting raster image is pixel accurate with respect to the input page representation.

Figure 4:
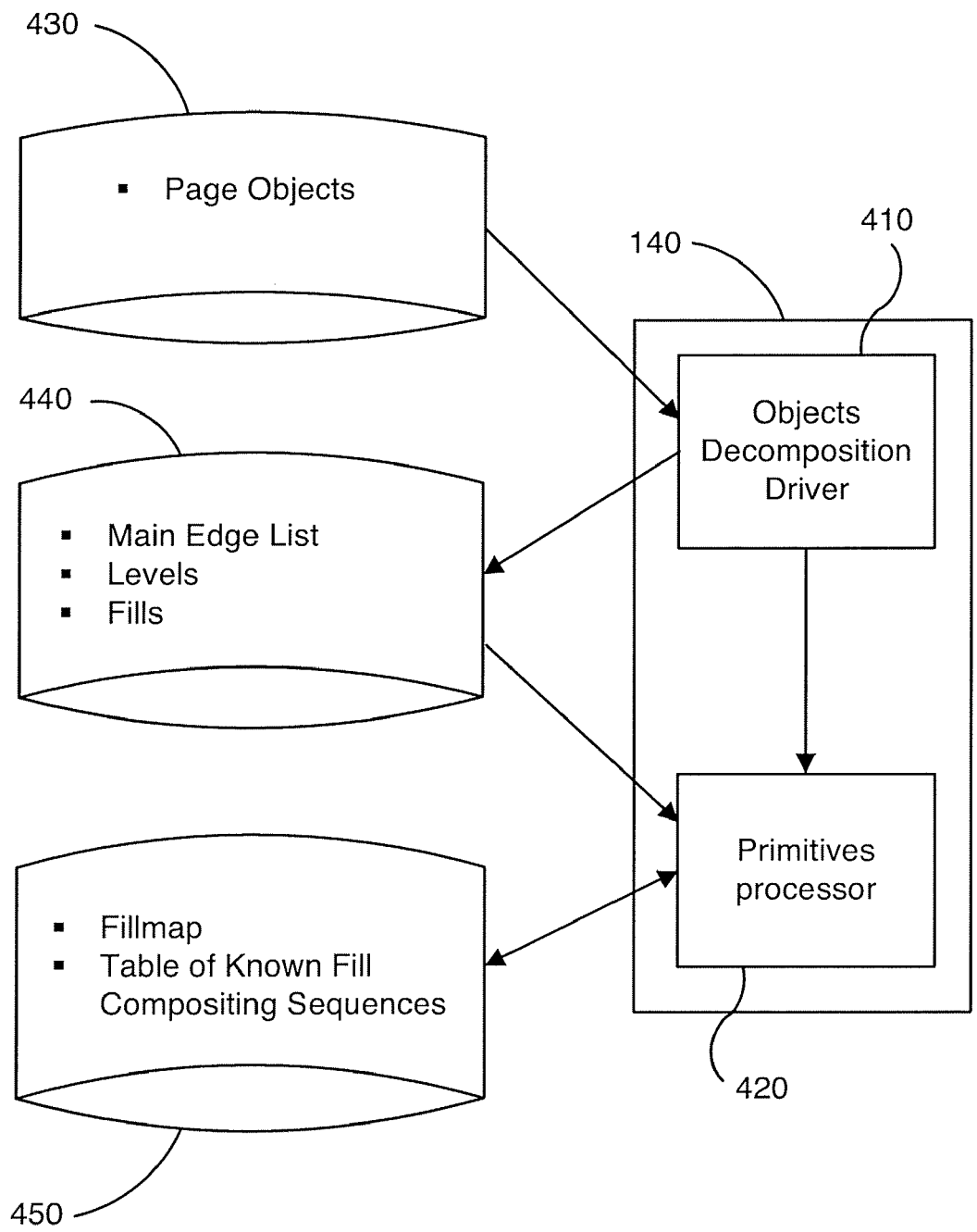
FIG. 4 shows a schematic block diagram of a controlling program in the pixel rendering systems shown in FIGS. 1 to 3.

Referring again to the pixel rendering system 100 in FIG. 1, the graphical objects on a page to be printed are transferred from the software application 130 to the controlling program 140 via the network 150. The role of the controlling program 140 is to generate a page representation that can be rendered by the pixel rendering apparatus 180. FIG. 4 shows a schematic block diagram of the controlling program 140 in more detail. The controlling program 140 comprises an objects decomposition driver 410 and a primitives processor 420.

The method employed by the controlling program 140 is to first decompose page objects 430 passed from the software application 130 into edges, levels and fills, using the objects decomposition driver 410. As noted above, these edges, levels and fills are called the first set of primitives, and are stored in store 440. Within the primitives processor 420, the first set of primitives in store 440 is further processed to generate a second set of primitives placed in store 450.

Figure 5:
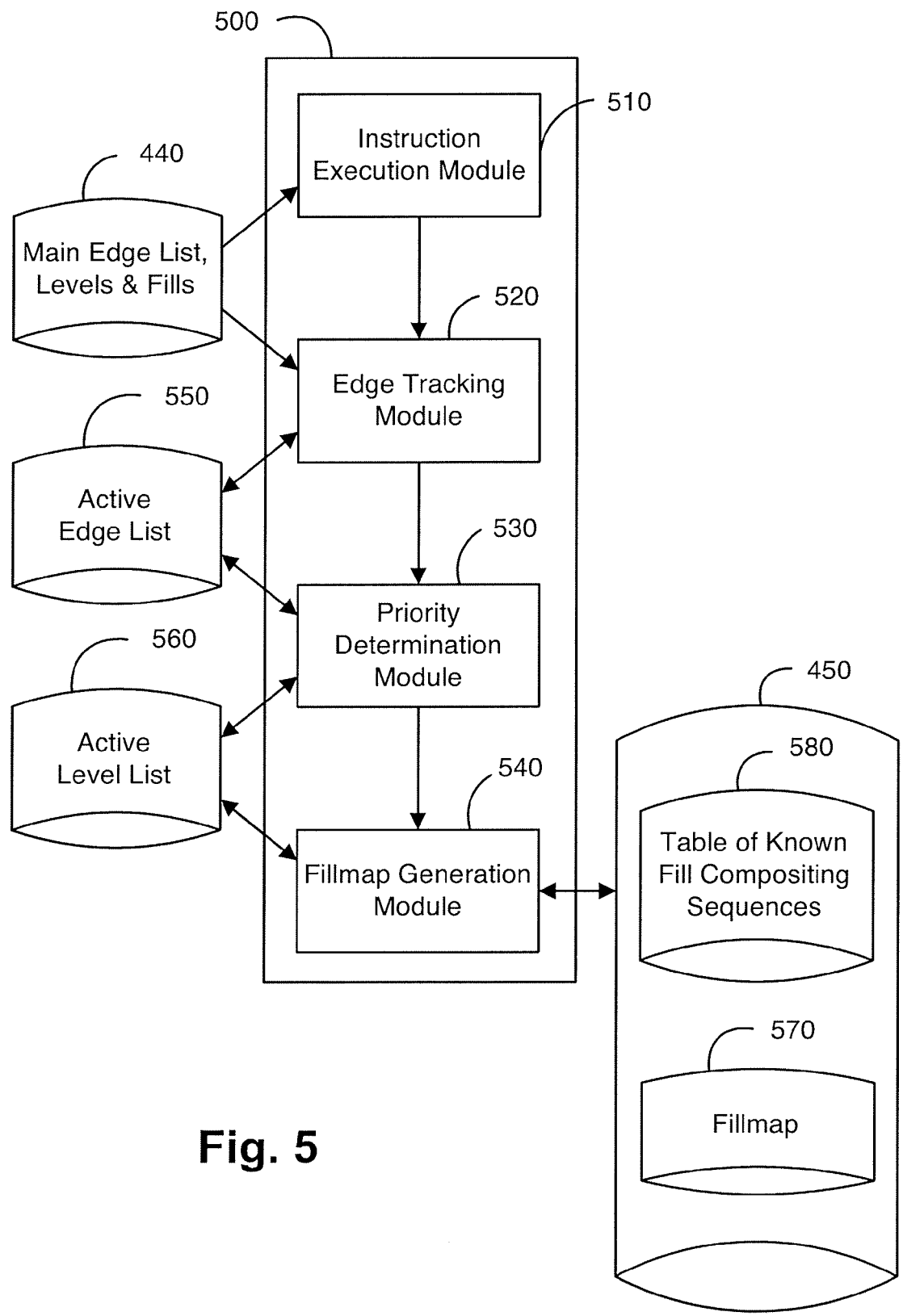
FIG. 5 shows a schematic block diagram of a pre-processing module from the primitives processor shown in FIG. 4.

The second set of primitives includes a fillmap 570 and a table of known fill compositing sequences 580 as shown in FIG. 5. The fillmap 570 and table of known fill compositing sequences 580 in store 450 are then spooled for rendering by the pixel rendering apparatus 180. The fillmap 570 and table of known fill compositing sequences 580 in store 450 may be serialised prior to spooling.

In the preferred implementation the primitives processor 420 comprises a pre-processing module 500, a schematic block diagram of which is shown in FIG. 5. The pre-processing module 500 comprises an instruction execution module 510; an edge tracking module 520; a priority determination module 530; and a fillmap generation module 540.

The instruction execution module 510 reads and processes instructions from the first set of primitives in store 440 and formats the instructions into data that are transferred to the other modules within the pre-processing module 500. The edge tracking module 520 is responsible for determining the edges bounding the currently scanned pixel span. The edge tracking module 520 does this by maintaining the active edge list 550. The active edge list 550 is passed on to the priority determination module 530 which determines the fill compositing sequence required to render each span of contiguous pixels. The priority determination module 530 does this by maintaining the active level list 560. The active level list is then further processed by the fillmap generation module 540 to generate the fillmap 570 and the table of known fill compositing sequences 580.

Figure 6:
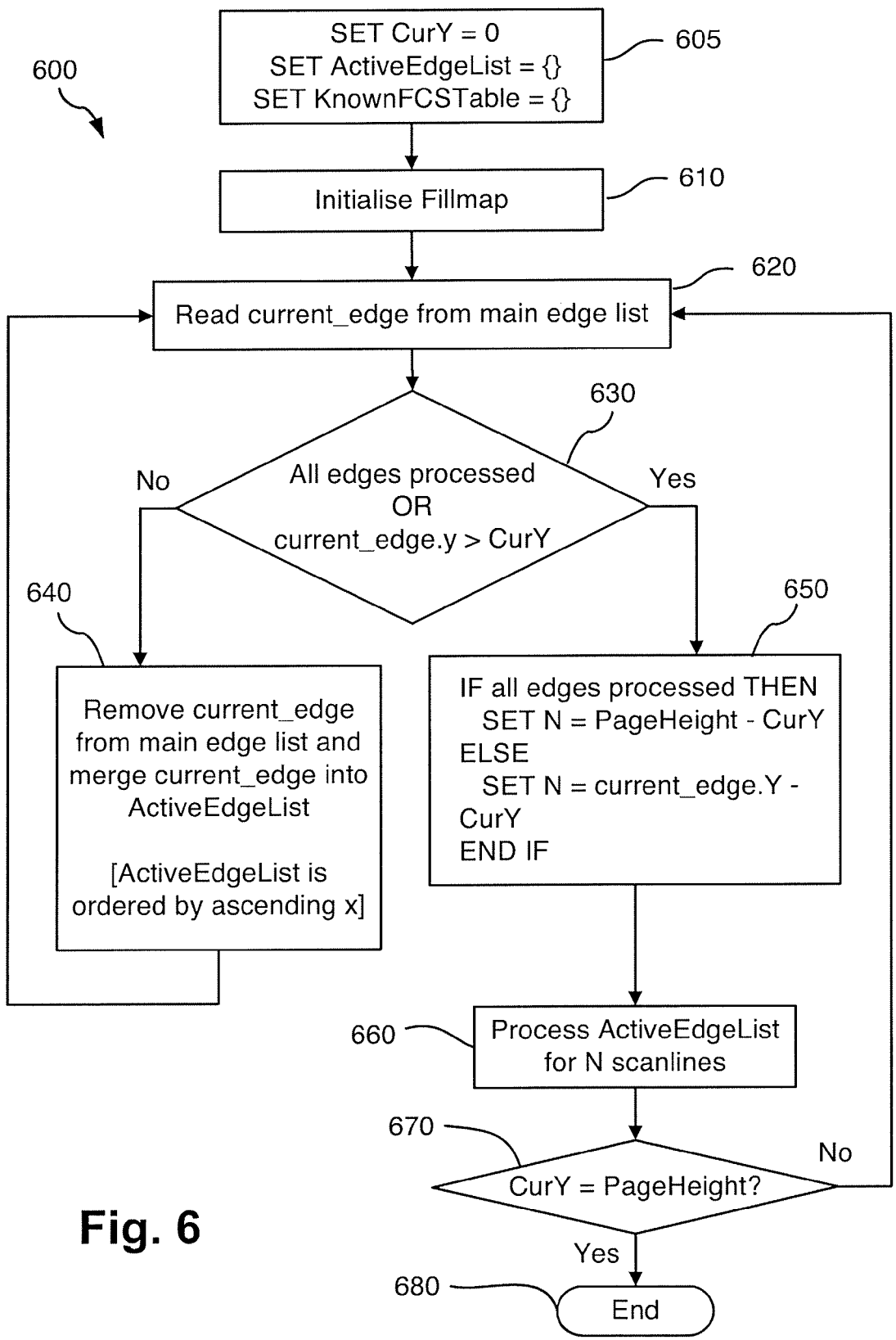
FIGS. 6 to 12 show schematic flow diagrams of a method, performed by a controlling program, of generating a fillmap representation of a page and a table of known fill compositing sequences from an input page representation.

FIG. 6 shows a schematic flow diagram of a method 600, performed by the edge tracking module 520, of processing the edges on a scanline. Scanlines are processed by determining the active edges on each scanline and, from these active edges, determining the objects that contribute to each pixel within the set of scanlines to be rendered. The method 600 determines the active edges for a scanline from the main edge list contained within the first set of primitives in store 440. The main edge list contains all the edges to be rendered on the page, sorted in ascending order of their starting scanline (y-order). The active edge list (ActiveEdgeList) 550 is a temporary list of edges that intersect the current scanline.

The method 600 starts in step 605 where the edge tracking module 520 initialises a variable CurY to zero; and the active edge list 550 and a table of known fill compositing sequences 580 to be empty lists. Step 605 is followed by step 610, which initialises a fillmap 570. The initialisation of the fillmap 570 is described in more detail with reference to FIG. 7. Then, in step 620, the edge tracking module 520 reads an edge from the main edge list in store 440. The edge tracking module 520 then determines in step 630 whether all the edges in the main edge list have been processed, or whether the y-value of the currently-read edge, having variable name current_edge.y, is greater than the value stored in the variable CurY. If neither of these conditions is satisfied, then the method 600 proceeds to step 640, where the edge tracking module 520 removes the current edge from the main edge list. The current edge is also merged into the active edge list 550. Edges in the active edge list 550 are ordered by ascending x-value; i.e. the order along the scanline. Once the current edge is merged into the active edge list 550, the method 600 returns to step 620 where the next edge is read from the main edge list.

If it is determined in step 630 that either of the conditions is satisfied, then in step 650 the edge tracking module 520 determines a number N of scanlines to pre-render. If all the edges in the main edge list have been processed then the number N is set to the number of scanlines remaining on the page; i.e. the difference between the page height and the current scanline CurY as follows:

$$N = \text{PageHeight} - CurY \qquad (1)$$

However, if there are still edges in the main edge list to process, then the number N is set to the number of scanlines between the current scanline CurY and the scanline on which the currently-read edge commences:

$$N = \text{current\_edge}.y - CurY \qquad (2)$$

Once the number N of scanlines has been determined in step 650, the active edge list 550 is passed to the priority determination module 530 for processing in step 660. In step 660 the priority determination module 530 processes the active edge list 550 for N scanlines and updates the current scanline CurY. The processing of the N scanlines in step 660 is described in more detail with reference to FIG. 8.

Next, in step 670, the edge tracking module 520 determines whether the updated current scanline CurY is equal to the page height. If so, the method 600 terminates in step 680. Alternatively, if it is determined in step 670 that the current scanline CurY is less than the page height, then the method 600 returns to step 620 from where the next edge from the main edge list is processed.

Figure 7:
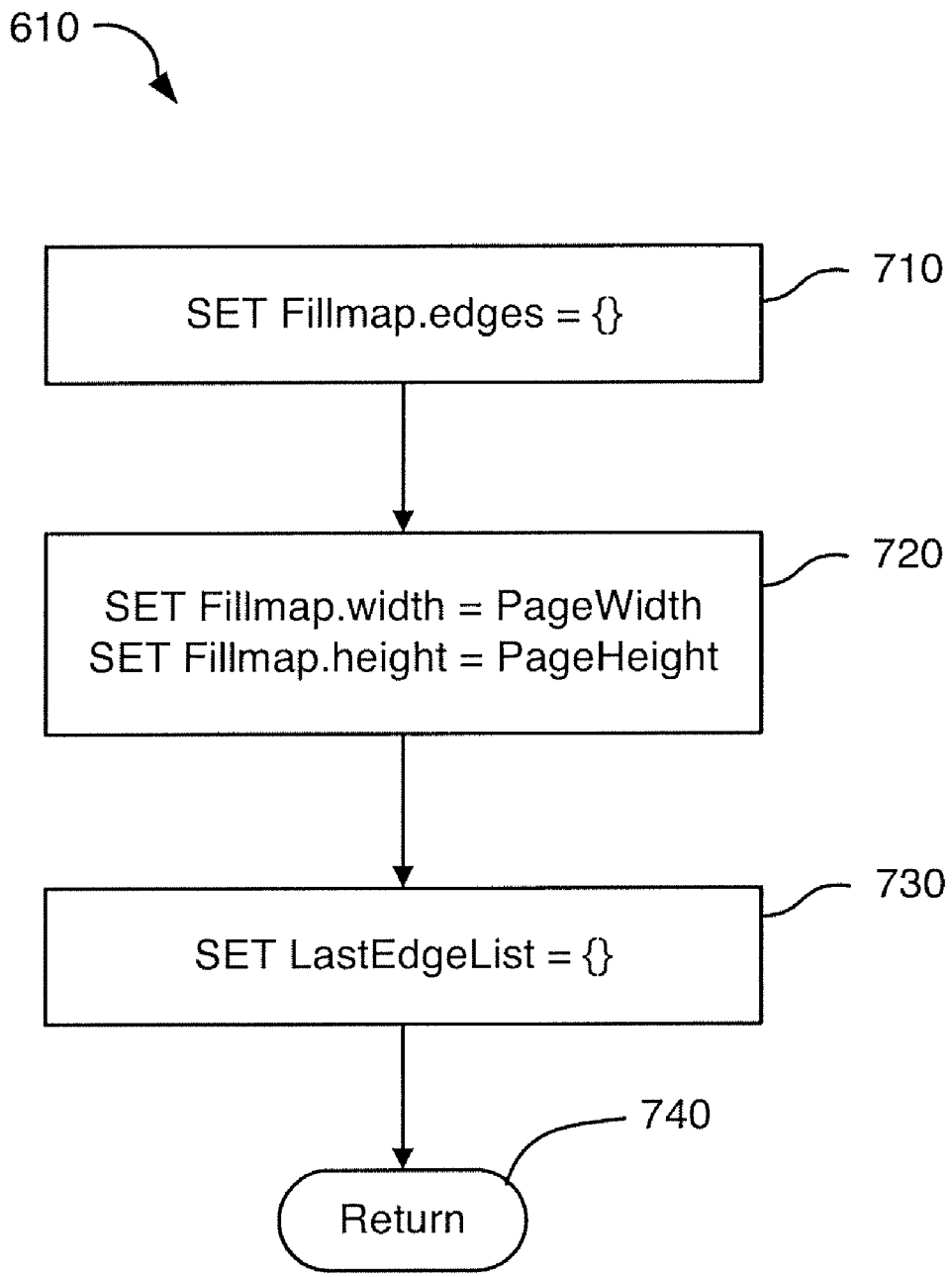

Step 610 of initialising the fillmap 570 is now described in more detail with reference to FIG. 7. In particular, in sub-step 710 a variable Fillmap.edges is set to an empty list. Then, in sub-step 720, the dimensions of the fillmap 570 are set to be the dimensions of the page to be rendered. In particular, a variable Fillmap.width is set to be the page width, and a variable Fillmap.height is set to be the page height. Then in sub-step 730 a variable LastEdgeList is set to an empty list. Finally, step 610 returns in sub-step 740 to step 620 in FIG. 6.

Step 660 of processing N scanlines by the priority determination module 530 is now described in more detail with reference to FIG. 8, wherein a schematic flow diagram of step 660 is shown. In step 660 the active edge list 550 created by the edge tracking module 520 is used by the priority determination module 530 to update the active level information in the active level list 560. The step 660 starts in an initialising sub-step 810, wherein the priority determination module 530 sets a temporary active edge list (TempAEL), the active level list (ActiveLevelList) 560, and a list of fill compositing sequence (FCS) runs for the current scanline (FCSRunList) to empty lists. Also, a variable LastFCS is initialised to the white background (WhiteBkGnd) and a variable CurX is initialised to zero. Sub-step 820 follows where the priority determination module 530 determines whether the active edge list 550 is empty, and hence whether all edges in the active edge list 550 have been processed.

If it is determined that the active edge list 550 still contains entries, then step 660 continues to sub-step 830 where the next edge along the scanline is read into a variable Edge and removed from the active edge list 550. Also, the level or levels pointed to by that edge are activated or deactivated as appropriate. If a level or set of levels are activated, then they are added to the active level list 560. Otherwise, if the level or set of levels are deactivated, then they are removed from the active level list 560.

Then, in sub-step 840, the active level list 560 is further processed by the fillmap generation module 540 in order to generate the active fill compositing sequence (ActiveFCS). Sub-step 840 is described in more detail with reference to FIG. 9. Sub-step 850 follows sub-step 840, in which a new entry is appended to FCSRunList if a new fill compositing sequence has become active for a non-zero span. Sub-step 850 is described in more detail with reference to FIG. 10.

In sub-step 860 the active fill compositing sequence (ActiveFCS) is copied into the variable LastFCS and the x-position of the edge (Edge.x) and the y-position of the edge (Edge.y) are updated for the next scanline.

In sub-step 870 the priority determination module 530 then determines whether the edge expires, or in other words, terminates. If the edge terminates then step 660 returns to sub-step 820. Alternatively, if it is determined in sub-step 870 that the edge does not terminate, then in sub-step 880 the edge is sorted into the temporary active edge list (TempAEL) based on its updated x-position determined in sub-step 860. Step 660 then returns to sub-step 820.

From sub-step 820, any subsequent edges on the scanline are processed until it is determined, in sub-step 820, that the active edge list 550 is empty. Step 660 then proceeds to sub-step 815 where a new entry is inserted into FCSRunList for the last active fill compositing sequence on the scanline if a new fill compositing sequence has become active for a non-zero span. Sub-step 815 is described in more detail with reference to FIG. 11.

Next, in sub-step 825, the priority determination module 530 copies the temporary active edge list into the active edge list 550. The fillmap generation module 540 then updates the fillmap in sub-step 835, using the fill compositing sequences and their respective spans which were collected for the current scanline. Sub-step 835 is described in more detail with reference to FIG. 12. The priority determination module then proceeds to sub-step 845 where the current scanline is incremented by one scanline.

Then in sub-step 855, the priority determination module determines whether more scanlines need to be processed. If not, then the step 660 proceeds to sub-step 865 wherein all the fillmap edges within the list LastEdgeList are terminated. These fillmap edges are then removed from the list LastEdgeList and inserted into the list Fillmap.edges. Step 660 then returns in sub-step 875 back to step 670 in FIG. 6. Alternatively, if it is determined in sub-step 855 that more scanlines have to be processed, then the step 660 returns to sub-step 810.

Figure 9:
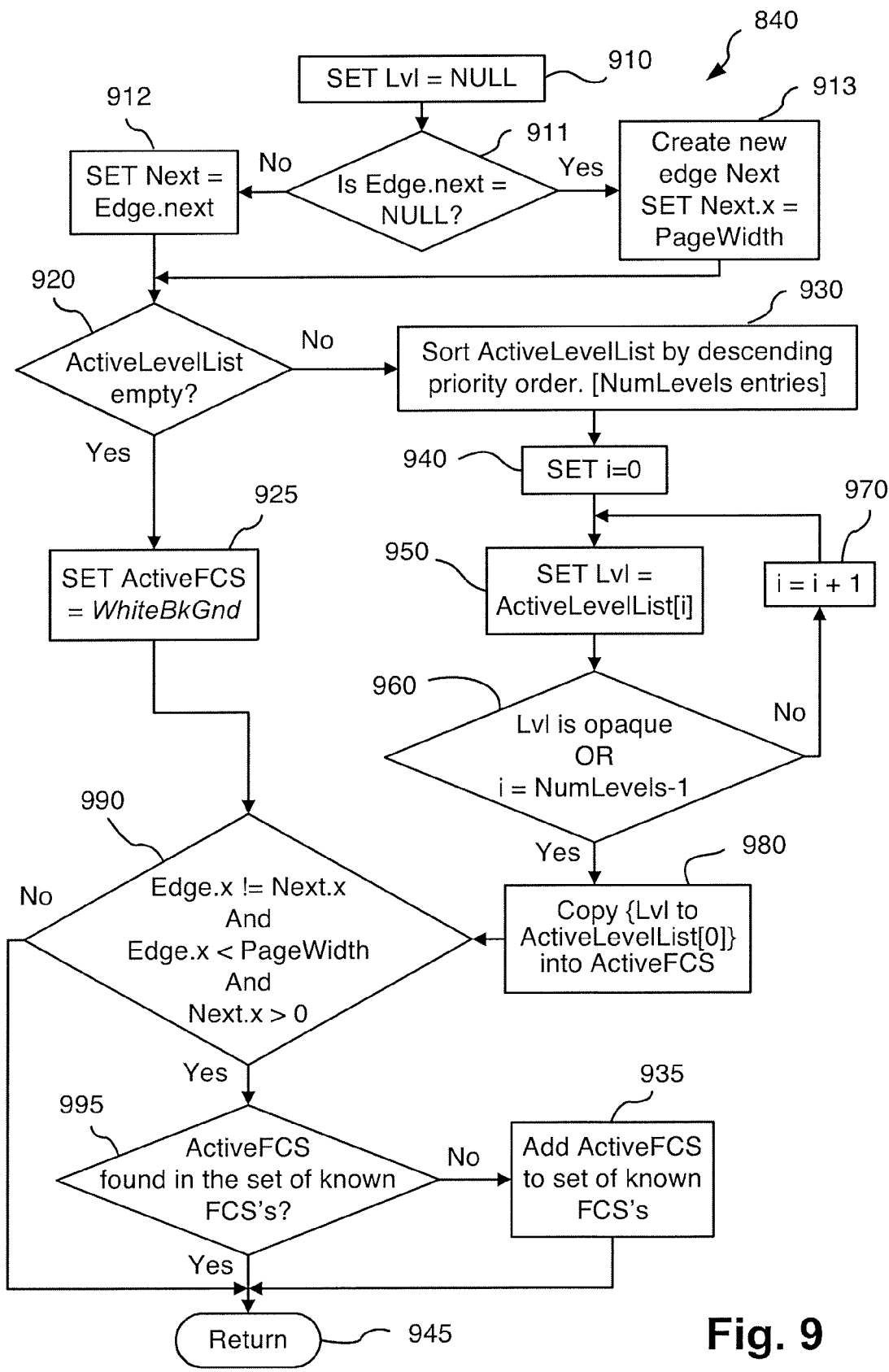

Sub-step 840 of processing the active level list 560 by the fillmap generation module 540 to calculate the active fill compositing sequence (ActiveFCS) is now described in more detail with reference to FIG. 9, wherein a schematic flow diagram of sub-step 840 is shown. Sub-step 840 starts in sub-step 910 where a variable Lvl is set to the value NULL.

Next, in sub-step 911, the fillmap generation module 540 determines whether Edge.next is equal to NULL, i.e. whether the edge stored in a variable Edge is the last edge in the active edge list 550. If it is determined that Edge.next is equal to NULL, then, in sub-step 913, the fillmap generation module sets the variable Next to a new temporary edge and the x-position of the temporary edge stored in the variable Next is set to the width of the page. Alternatively, it is determined that Edge.next is not equal to NULL, then, in sub-step 912, the fillmap generation module sets the variable Next to Edge.next.

Next, in sub-step 920, the fillmap generation module 540 determines whether the active level list 560 is empty. If the active level list 560 is determined to be empty, then, in sub-step 925, the fillmap generation module 540 sets the active fill compositing sequence variable ActiveFCS to WhiteBkGnd.

Alternatively, if it is determined in sub-step 920 that the active level list 560 is not empty, then sub-step 840 proceeds to sub-step 930 where the active level list 560 is sorted by descending priority order, such that the first level in the active level list 560 corresponds to the object that is closest to the viewer. The number of entries in the active level list is NumLevels. In sub-steps 940, 950, 960 and 970, the fillmap generation module 540 determines the earliest level (Lvl) in the sorted active level list 560 that is opaque when the objects are viewed from above. When such a level is found, the fillmap generation module 540 copies that opaque level, and any levels above it, into the active fill compositing sequence variable ActiveFCS in sub-step 980. If an opaque level is not found in the active level list 560, then the fillmap generation module copies all of the levels in active level list into the active fill compositing sequence variable ActiveFCS.

From sub-step 925 or 980 processing continues to sub-step 990 where the fillmap generation module 540 determines whether the fill compositing sequence ActiveFCS will contribute to the output, i.e. whether the current pixel span is non zero, and intersects the visible region of the rendered page. This is determined by evaluating the following logical expression:

$$(\text{Edge}.x! = \text{Next}.x) \text{ and } (\text{Edge}.x < \text{PageWidth}) \text{ and } (\text{Next}.x > 0) \quad (3)$$

If it is determined in sub-step 990 that the fill compositing sequence does contribute to the output in sub-step 990, then processing continues to sub-step 995 where the fillmap generation module 540 determines whether the active fill compositing sequence (ActiveFCS) already exists in the table of known fill compositing sequences 580. Optionally, step 995 first checks whether all the fills in the active fill compositing sequence (ActiveFCS) are flats, and if so, "flattens" the active fill compositing sequence (ActiveFCS) to a single equivalent flat fill. If it is determined in sub-step 995 that a fill equivalent to the active fill compositing sequence (ActiveFCS) does not exist in the table of known fill compositing sequences 580, then sub-step 840 progresses to sub-step 935 in which the active fill compositing sequence (ActiveFCS) is added to the table of known fill compositing sequences 580.

Figure 8:
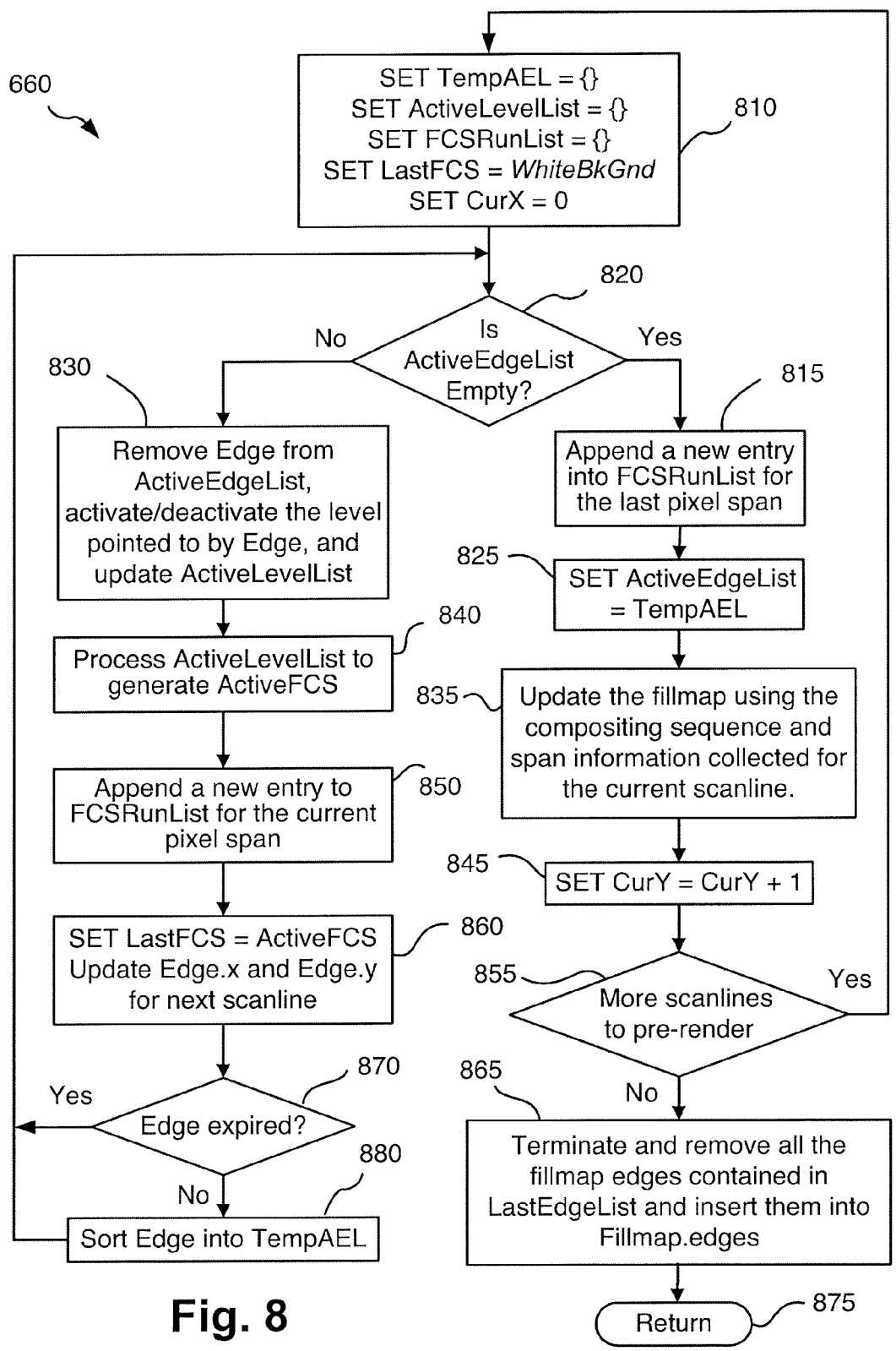

From sub-step 935, or if it is determined in sub-step 995 that the active fill compositing sequence already exists in the set of known fill compositing sequences 580, or if it is determined in sub-step 990 that the fill compositing sequence does not contribute to the output, then processing continues to sub-step 945 where sub-step 840 returns to sub-step 850 in FIG. 8.

Figure 10:
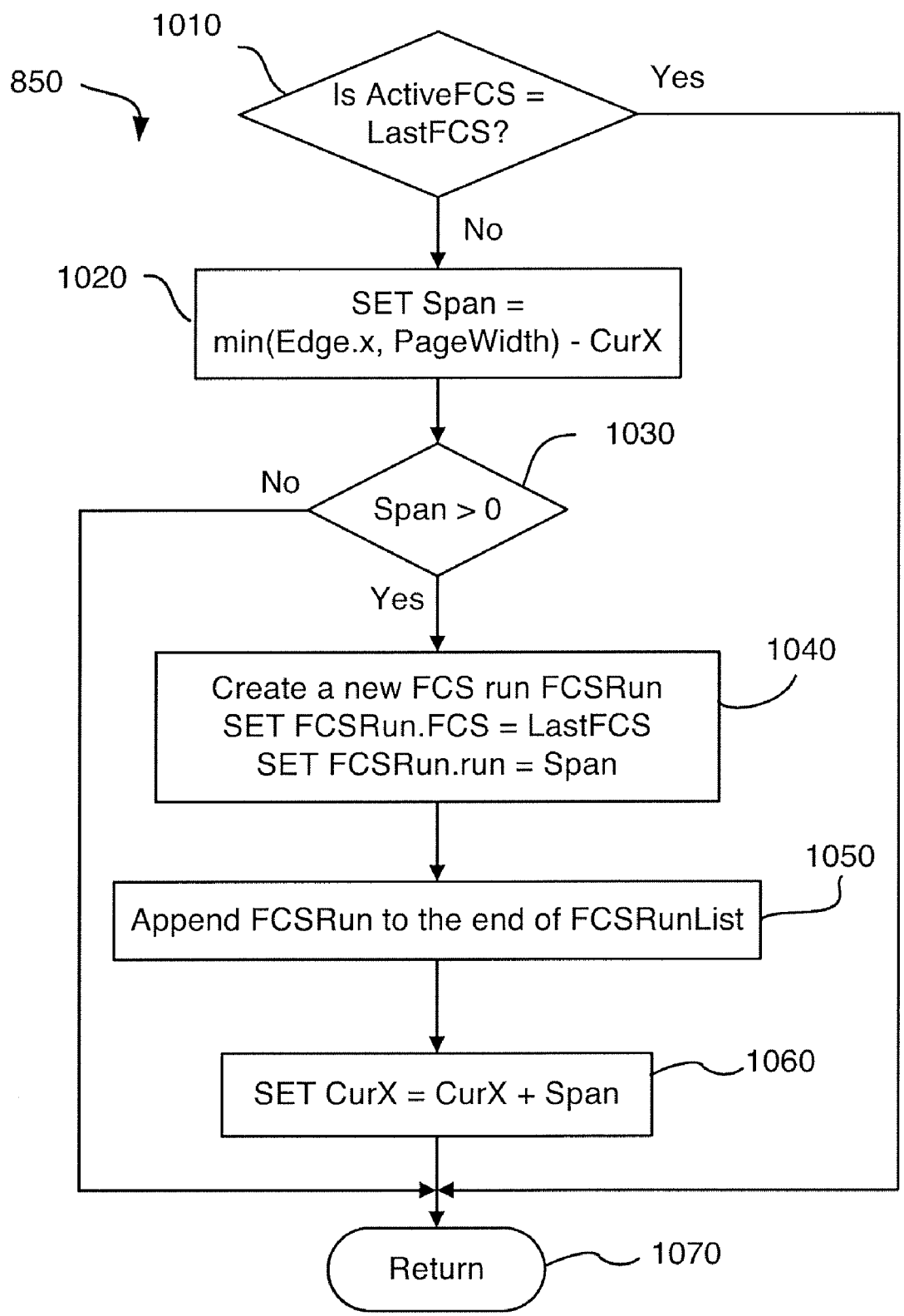

Sub-step 850, in FIG. 8, where a new entry is appended to FCSRunList for the current pixel span is now described in more detail with reference to FIG. 10, where a schematic flow diagram of sub-step 850 is shown. Sub-step 850 starts in sub-step 1010 wherein it is determined whether the active fill compositing sequence (ActiveFCS) is equal to the last active fill compositing sequence (LastFCS). If it is determined that the active fill compositing sequence (ActiveFCS) is not equal to the last active fill compositing sequence (LastFCS), then sub-step 850 continues to sub-step 1020, where a variable Span is set as follows:

$$\text{Span} = \min(\text{Edge}.x, \text{Page Width}) - CurX \quad (4)$$

Next, in sub-step 1030, it is determined whether the value of the variable Span is greater than zero. If it is determined in sub-step 1030 that the value of the variable Span is greater than zero, then sub-step 850 proceeds to sub-step 1040 where a new FCS run is created and assigned to a variable FCSRun. Also, the variable FCSRun.FCS is set to LastFCS and the variable FCSRun.run is set to Span.

Then, in sub-step 1050, a variable FCSRun is appended to the end of the list FCSRunList. Next, sub-step 850 proceeds to sub-step 1060, where a variable CurX is set as follows:

$$CurX = CurX + \text{Span} \quad (5)$$

From sub-step 1060, or if it is determined in sub-step 1030 that the variable Span is not greater than zero, or, alternatively, if it is determined in sub-step 1010 that a variable ActiveFCS is equal to a variable LastFCS, processing continues to sub-step 1070 where sub-step 850 returns to sub-step 860 in FIG. 8.

Figure 11:
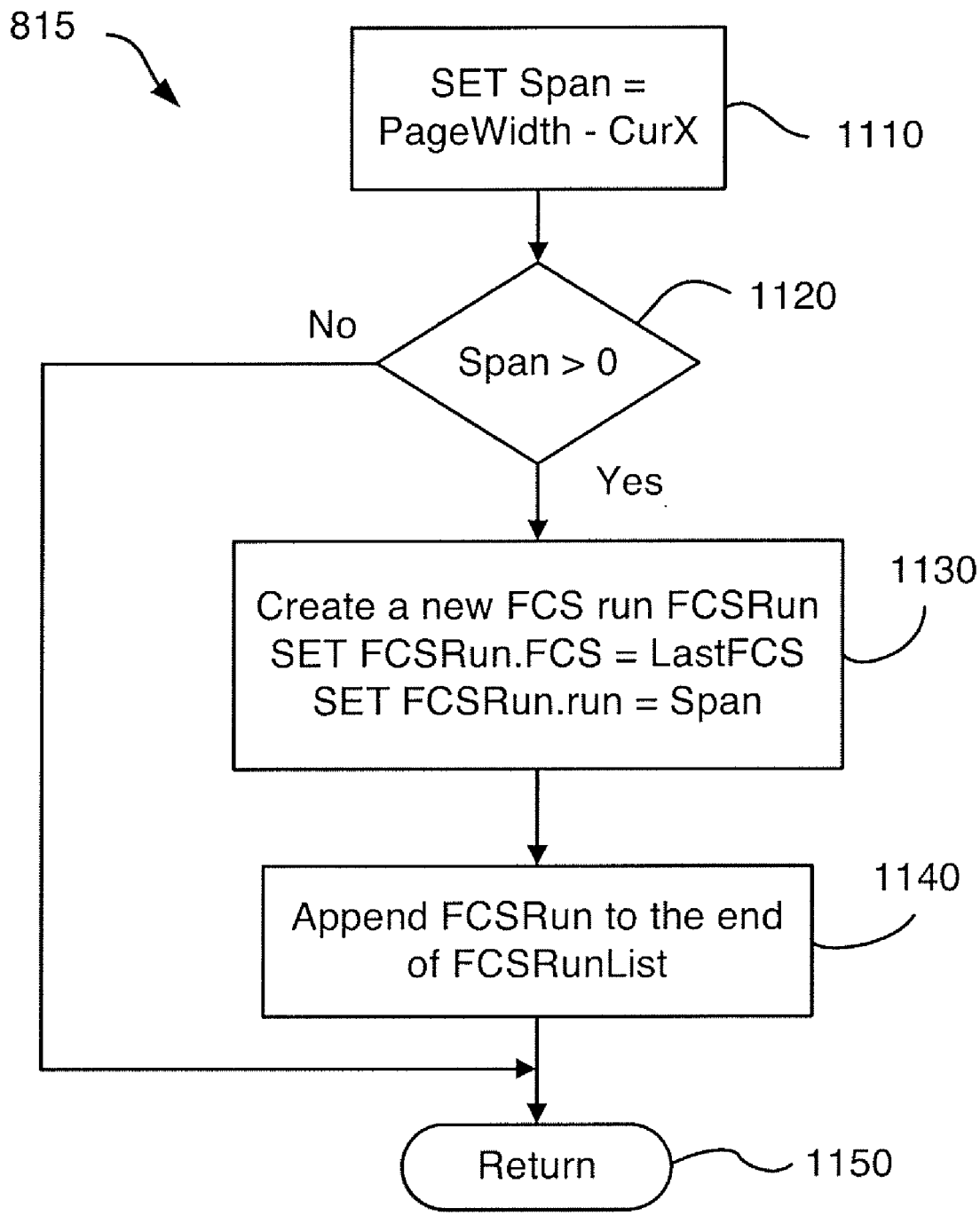

Sub-step 815, in FIG. 8, where a new entry is appended to the list FCSRunList for the last pixel span on the current scanline is now described in more detail with reference to FIG. 11, where a schematic flow diagram of sub-step 815 is shown. Sub-step 815 starts in sub-step 1110 wherein a variable Span is set as follows:

$$\text{Span} = \text{PageWidth} - CurX \quad (6)$$

Next, in sub-step 1120, it is determined whether the value of the variable Span is greater than zero. If it is determined in sub-step 1120 that the value of the variable span is greater than zero, then sub-step 815 proceeds to sub-step 1130 where a new FCS run is created and assigned to a variable FCSRun. Also, the variable FCSRun.FCS is set to LastFCS and the variable FCSRun.run is set to Span. Then, in sub-step 1140, a variable FCSRun is appended to the end of the list FCSRunList.

From sub-step 1140, or if it is determined in sub-step 1120 that the variable Span is not greater than zero, processing continues to sub-step 1150 where sub-step 815 returns to sub-step 825 in FIG. 8.

Sub-step 835, in FIG. 8, where the fillmap generation module 540 updates the fillmap using the fill compositing sequence and span information collected for the current scanline is now described in more detail with reference to FIG. 12, where a schematic flow diagram of sub-step 835 is shown. Sub-step 835 starts in sub-step 1201 wherein a variable CurrentEdgeList is initialised to an empty list and a variable x is set to zero.

Next, sub-step 835 proceeds to sub-step 1202 where the fillmap generation module 540 determines whether the list of fill compositing sequence runs FCSRunList is empty. If it is determined in sub-step 1202 that the list of fill compositing sequence runs FCSRunList is not empty, then in sub-step 1205 the FCS run FCSRun is removed from the list of fill compositing sequence runs FCSRunList. Then, in sub-step 1206 a variable FCS is set to FCSRun.FCS, and a variable Run is set to FCSRun.run.

Next, sub-step 835 proceeds to sub-step 1207 wherein the fillmap generation module 540 performs a search on the list LastEdgeList to locate all of the fillmap edges within the list which activate the fill compositing sequence FCS. The fillmap edge with the minimum x-position on the previous scanline is chosen. The fillmap generation module 540 then determines in sub-step 1208 whether a fillmap edge which activates the fill compositing sequence FCS was found in the list LastEdgeList. If it is determined in sub-step 1208 that a fillmap edge was found, then sub-step 835 proceeds to sub-step 1209 where the variable Edge is set to be the fillmap edge that was chosen from the list LastEdgeList in sub-step 1207.

Next, sub-step 835 proceeds to sub-step 1221 where the fillmap generation module 540 determines whether the variable Edge satisfies the edge extension condition. The edge extension condition is satisfied when range of pixel x-positions in the current fill compositing sequence run overlaps or abuts the range of pixel x-positions in the span on the previous scanline bounded by the variables Edge.x and Edge.next.x. If the fillmap edge Edge is not the last edge in the list LastEdgeList, the edge extension condition is satisfied if the following expression evaluates to TRUE:

$$Edge.x \leq x \leq Edge.next.x$$

or $$x \leq Edge.x \leq x+Run \quad (7)$$

Alternatively, if the fillmap edge Edge is the last edge in the list LastEdgeList, the edge extension condition is satisfied if the following expression evaluates to TRUE:

$$Edge.x \leq x+Run \leq PageWidth \quad (8)$$

The edge extension condition is illustrated in FIGS. 30A-30H. In FIGS. 30A-30H a pixel span 3000, bounded by the fillmap edges 3010 and 3020, is shown on the previous scanline 3030. A fill compositing sequence run 3040 bounded by a pixel boundary 3050 is shown on the current scanline 3060. The edge extension condition is satisfied by the pixel boundary 3000 in the scenarios illustrated in FIGS. 30A-30F, where the fill compositing sequence run 3040 overlaps or abuts the pixel span 3000. In the scenarios illustrated in FIGS. 30G and 30H the pixel boundary 3050 does not satisfy the edge extension condition as the fill compositing sequence run 3040 does not overlap or abut the pixel span 3000.

If it is determined in sub-step 1221 that the fillmap edge stored in the variable Edge satisfies the edge extension condition, then sub-step 835 proceeds to sub-step 1222 where the variable Delta is set as follows:

$$Delta=x-Edge.x \quad (9)$$

Delta is then appended to the list Edge.deltas. Processing then continues to sub-step 1223 wherein the variable Edge.x is set to x.

Sub-step 835 then proceeds to sub-step 1224 where the fillmap generation module 540 appends the fillmap edge in the variable Edge to the list CurrentEdgeList. Next, in sub-step 1225, all the fillmap edges to the left of the fillmap edge in the variable Edge from the list LastEdgeList are terminated. These fillmap edges are then removed from the list LastEdgeList and inserted into the list Fillmap.edges. Then in sub-step 1226 the fillmap edge in the variable Edge is removed from the list LastEdgeList. Processing then continues to sub-step 1227 where the variable x is set as follows:

$$x=x+Run \quad (10)$$

Sub-step 835 then returns to sub-step 1202 where it is determined whether the list of fill compositing sequence runs FCSRunList is empty.

If it is determined in sub-step 1202 that the list of fill compositing sequence runs FCSRunList is empty, then processing continues to sub-step 1203 where the fillmap generation module 540 terminates all of the fillmap edges remaining in the list LastEdgeList. These fillmap edges are then removed from the list LastEdgeList and inserted into the list Fillmap.edges. Then, in sub-step 1204, the fillmap generation module 540 copies the list CurrentEdgeList into the list LastEdgeList. Sub-step 835 then returns in sub-step 1211 to sub-step 845 in FIG. 8.

If it was determined in sub-step 1208 that a fillmap edge which activated FCS was not found in the list LastEdgeList, then sub-step 835 continues to sub-step 1210 where a new fillmap edge is created and assigned to the variable Edge.

Processing then continues to sub-step 1241 where a variable Edge.startX is set to x, a variable Edge.startY is set to CurY, a variable Edge.FCS is set to FCS, and a variable Edge.deltas is initialised to an empty list.

Sub-step 835 then proceeds to sub-step 1242 where the fillmap generation module 540 appends the fillmap edge stored in the variable Edge to end of the list CurrentEdgeList. Next, in sub-step 1243, the variable x is set as follows:

$$x=x+Run \quad (11)$$

Sub-step 835 then returns to sub-step 1202 where the fillmap generation module 540 determines whether the list of fill compositing sequence runs FCSRunList is empty.

If it is determined in sub-step 1221 that the fillmap edge stored in the variable Edge does not satisfy the edge extension condition, then processing continues to sub-step 1228 where the fillmap generation module 540 determines whether the variable Edge.x is greater than the variable x. If it is determined that the variable Edge.x is greater than the variable x, then sub-step 835 returns to sub-step 1210 where a fillmap edge is created.

Alternatively, if it is determined that the variable Edge.x is not greater than the variable x, then processing continues to sub-step 1229 where all the fillmap edges to the left of the fillmap edge stored in the variable Edge in the list LastEdgeList are terminated. These fillmap edges are then removed from the list LastEdgeList and are inserted into the list Fillmap.edges. Sub-step 835 then proceeds to sub-step 1230 where the fillmap edge stored in the variable Edge is terminated. The fillmap edge stored in the variable Edge is then removed from the list LastEdgeList and inserted into the list Fillmap.edges. Processing then returns to sub-step 1207 a wherein a search is performed on the list LastEdgeList to locate all fillmap edges within the list which activate the fill compositing sequence FCS.

Figure 13:
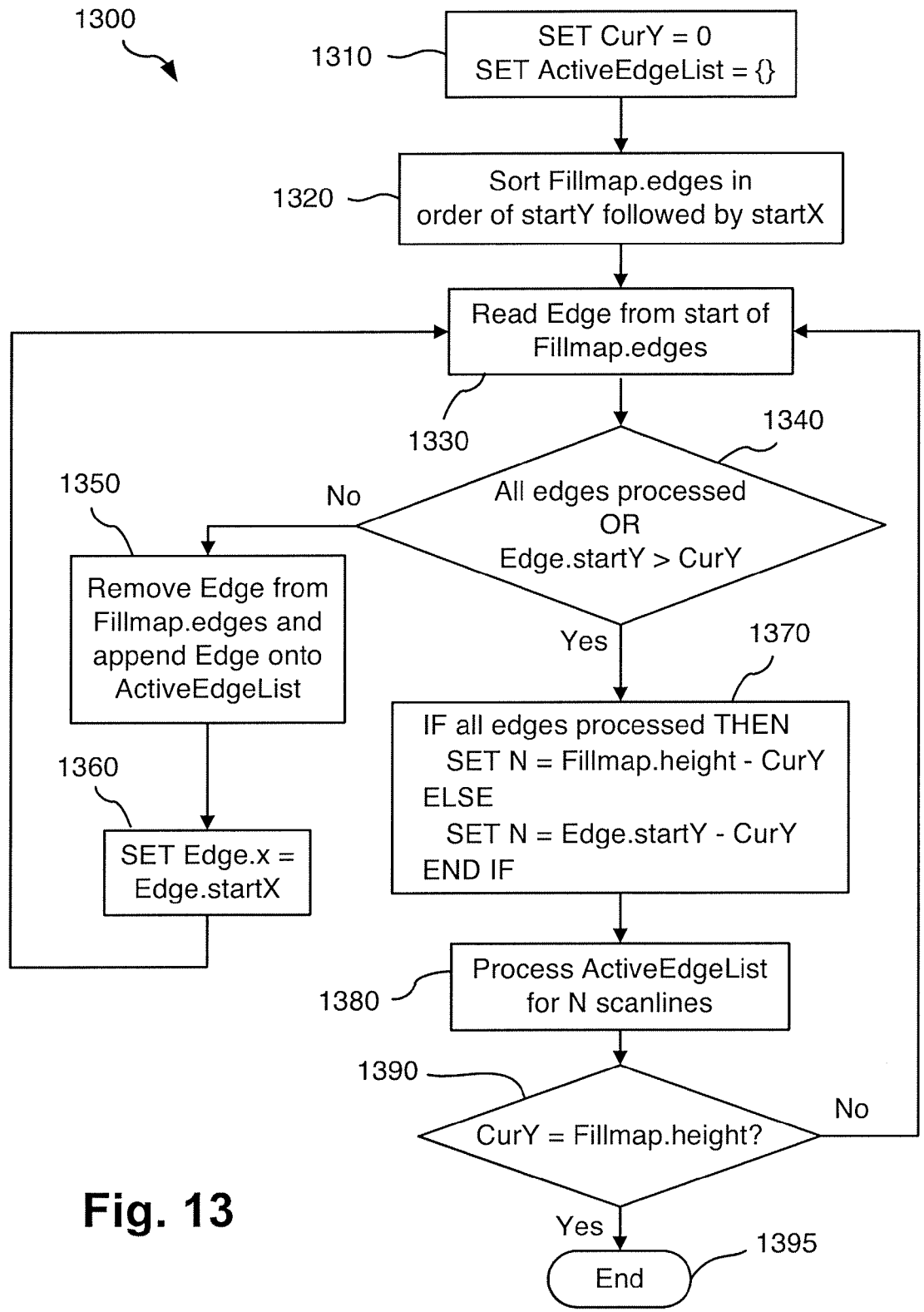
FIGS. 13 to 14 show a schematic flow diagram of a method, performed by a pixel rendering apparatus, of rendering a fillmap representation of a page and a table of known fill compositing sequences to pixels.

FIG. 13 shows a schematic flow diagram of a method 1300, performed by the pixel rendering apparatus 180, of rendering a page representation comprising the fillmap 570 and the table of known fill compositing sequences 580 to pixels. The method 1300 starts in step 1310 where a variable CurY is set to zero, and the active edge list 550 is set to an empty list. Step 1310 is followed by step 1320, which sorts the list of fillmap edges (Fillmap.edges) which describe the fillmap 570 in order of each fillmap edge's start-y position, followed by each fillmap edge's start-x position. Then, in step 1330, a fillmap edge is read from the list of fillmap edges (Fillmap.edges) describing the fillmap and stored in a variable Edge. It is then determined in step 1340 whether all the fillmap edges in the list of fillmap edges (Fillmap.edges) describing the fillmap have been processed, or whether the start-y position of the currently-read fillmap edge stored in the variable Edge, having a variable name Edge.startY, is greater than the value stored in the variable CurY. If neither of these conditions is satisfied, then the method 1300 proceeds to step 1350, where the fillmap edge stored in the variable Edge is removed from the list of fillmap edges (Fillmap.edges) describing the fillmap. The fillmap edge stored in the variable Edge is also appended onto the active edge list (ActiveEdgeList). Next, in step 1360, the x-position of the fillmap edge on the current scanline is set the start-x position of the edge. The method 1300 then returns to step 1330 where the next fillmap edge is read from the list of fillmap edges (Fillmap.edges) describing the fillmap.

If it is determined in step 1340 that either of the conditions is satisfied, then in step 1370 the method 1300 determines a number N of scanlines to render. If all the edges in the fillmap have been processed, then the number N is set to the number of scanlines remaining on the page; i.e. the difference between the page height and the current scanline CurY as follows:

$$N = \text{Fillmap.height} - CurY \quad (12)$$

However, if there are still edges in the fillmap to process, then the number N is set to the number of scanlines between the current scanline CurY and the scanline on which the currently-read fillmap edge commences:

$$N = \text{Edge.start}Y - CurY \quad (13)$$

Once the number N of scanlines has been determined in step 1370, the active edge list (ActiveEdgeList) is processed to generate pixels for the next N scanlines and the current scanline is updated in step 1380. The processing of the N scanlines in step 1380 is described in more detail with reference to FIG. 14.

Next, in step 1390, the method 1300 determines whether the updated current scanline CurY is equal to the page height. If so, the method 1300 terminates in step 1395. Alternatively, if it is determined in step 1390 that the current scanline CurY is less than the page height, then the method 1300 returns to step 1330 from where the next edge in the fillmap is read.

Figure 14:
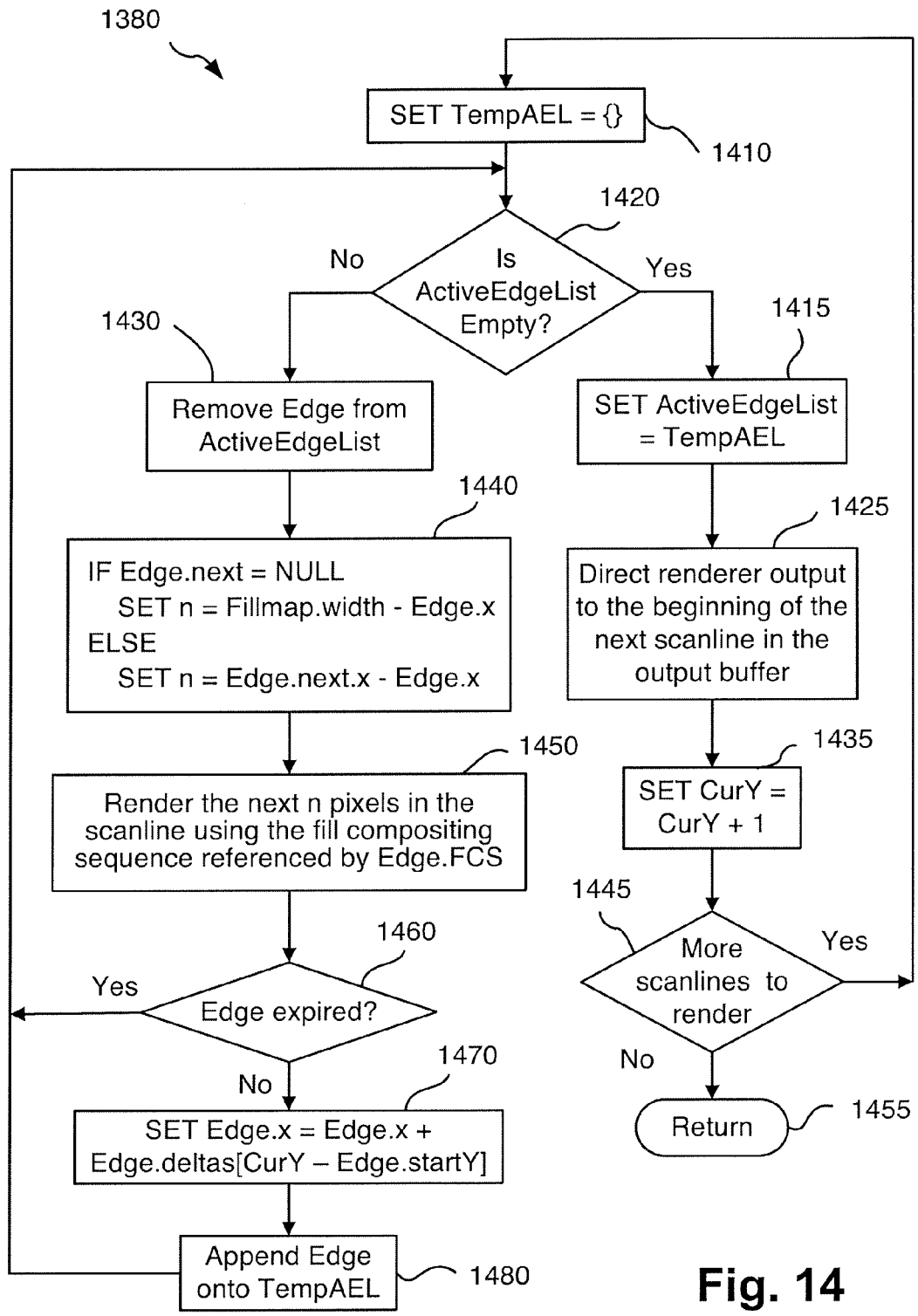

Step 1380, in FIG. 13, where the active edge list is processed for N scanlines is now described in more detail with reference to FIG. 14, where a schematic flow diagram of step 1380 is shown. Step 1380 starts in sub-step 1410 where the variable TempAEL is initialised to an empty list. Step 1380 then proceeds to sub-step 1420 where it is determined whether the active edge list is empty. If it is determined that the active edge list is not empty, then a fillmap edge is removed from the beginning of the active edge list and is stored in a variable Edge in sub-step 1430. Next, in sub-step 1440, a variable n is set. If a variable Edge.next is equal to NULL i.e. the fillmap edge stored in the variable Edge is the last edge in the active edge list, then a variable n is set as follows:

$$n = \text{Fillmap.width} - \text{Edge.}x \quad (14)$$

Alternatively, if a variable Edge.next is not equal to NULL, then a variable n is set as follows:

$$n = \text{Edge.next.}x - \text{Edge.}x \quad (15)$$

Step 1380 then proceeds to sub-step 1450 where the next n pixels in the scanline are rendered using the fill compositing sequence stored in the variable Edge.FCS. Next, in sub-step 1460, it is determined whether the fillmap edge stored in the variable Edge has expired. If it is determined that the fillmap edge stored in the variable Edge has not expired, then step 1380 proceeds to sub-step 1470 where the x-position of the fillmap edge stored in the variable Edge is updated for the next scanline. The x-position of the fillmap edge stored in the variable Edge is updated as follows:

$$\text{Edge.}x = \text{Edge.}x + \text{Edge.deltas}[CurY - \text{Edge.start}Y] \quad (16)$$

Processing continues to sub-step 1480 where the fillmap edge stored in the variable Edge is appended to the list TempAEL. Next step 1380 returns to sub-step 1420 where it is determined whether the active edge list (ActiveEdgeList) is empty.

If it is determined in sub-step 1460 that the fillmap edge stored in the variable Edge has expired, then step 1380 returns to sub-step 1420.

If it is determined in sub-step 1420 that the active edge list (ActiveEdgeList) is empty, then processing continues to sub-step 1415 where variable ActiveEdgeList is assigned the list stored in the variable TempAEL. Step 1380 then proceeds to sub-step 1425 where the output of the renderer is directed to the beginning of the next scanline in the output buffer. Next, in sub-step 1435, the variable CurY is set to CurY+1. Processing then continues to sub-step 1445 where it is determined whether there are more scanlines to render. If it is determined in sub-step 1445 that there are more scanlines to render, then processing returns to sub-step 1410 where the variable TempAEL is initialised to an empty list for the next scanline. Alternatively, if it is determined in sub-step 1445 that there are no more scanlines to render, then processing continues to sub-step 1455 where step 1380 returns to step 1390 in FIG. 13.

Figure 29:
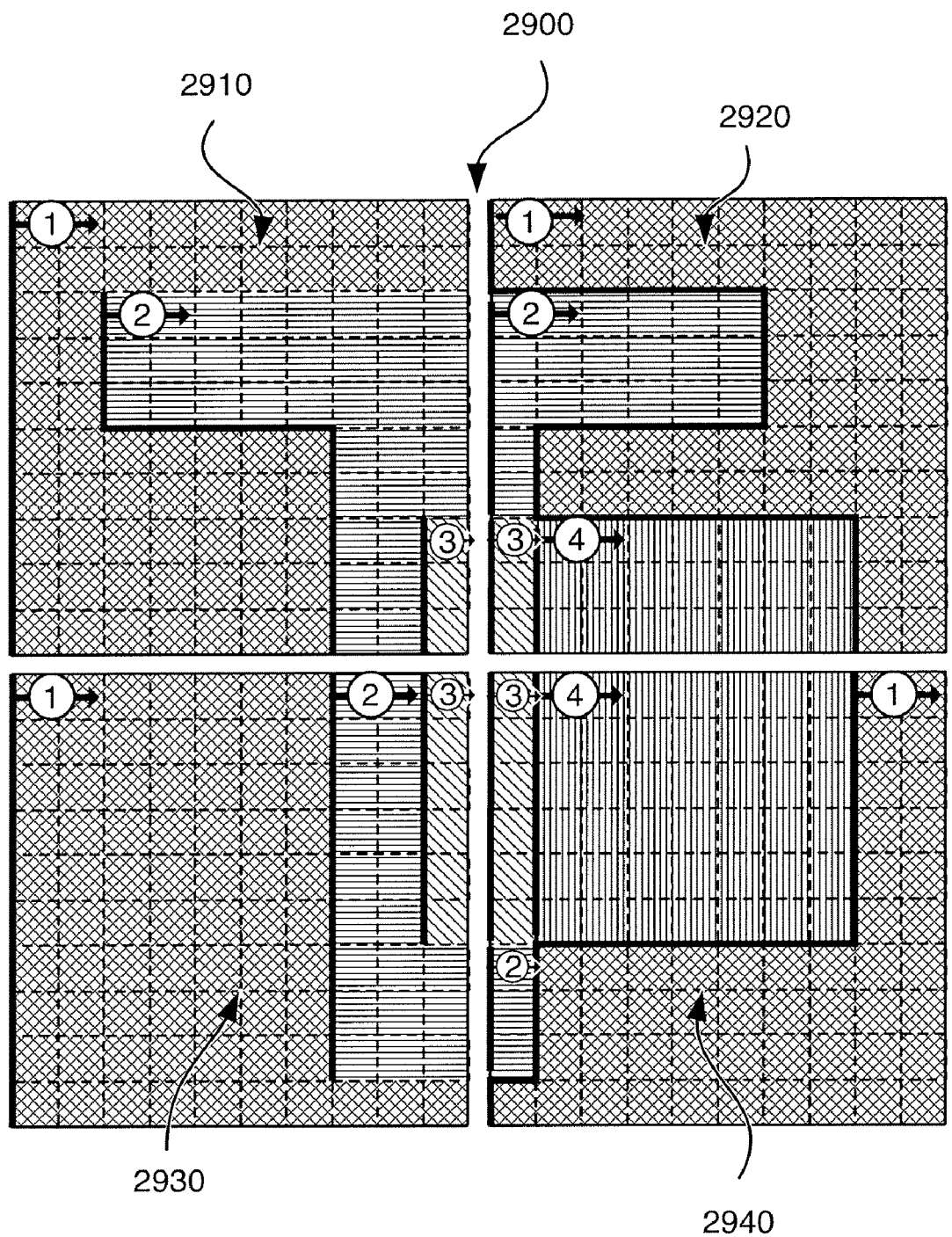
FIG. 29 illustrates a tiled fillmap representation of the page represented in FIG. 15.
Figure 30A:
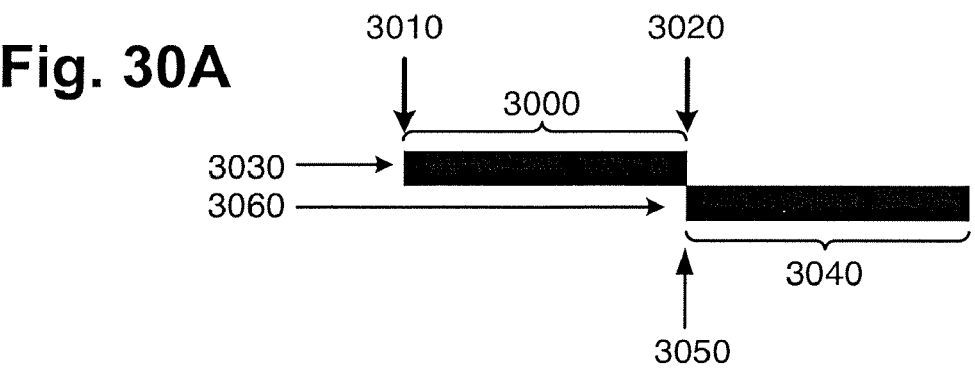
FIGS. 30A to 30H illustrate the edge extension condition.
Figure 30B:
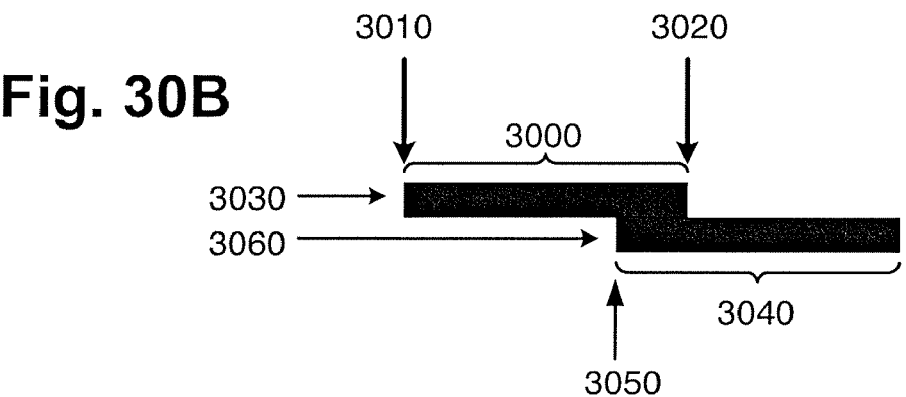
Figure 30C:
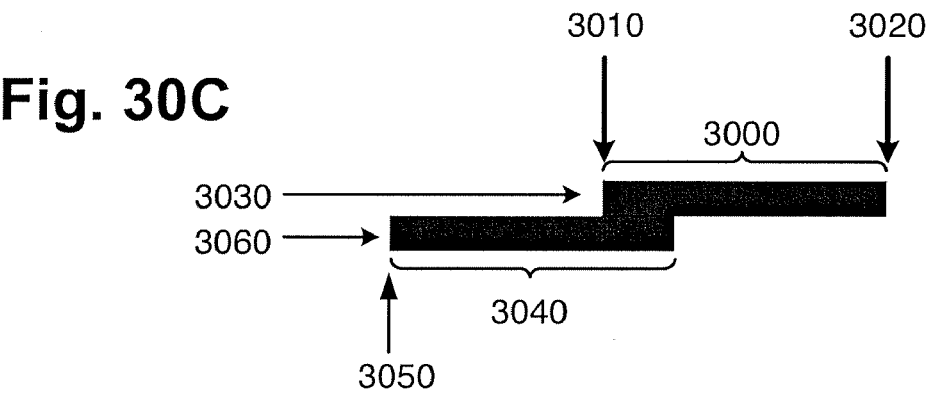
Figure 30D:
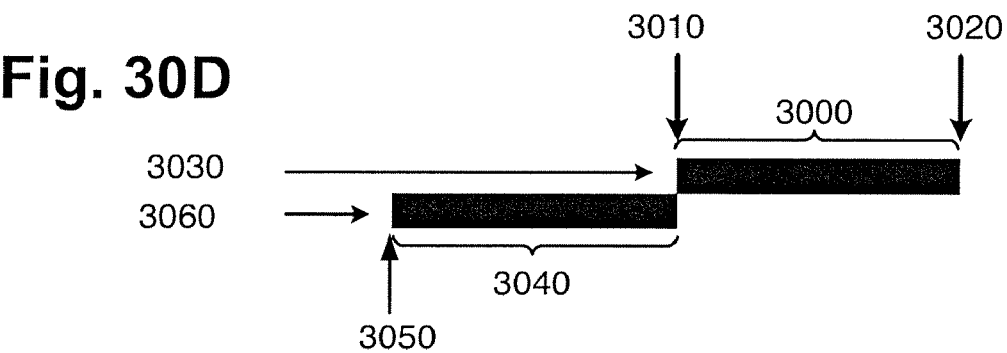
Figure 30E:
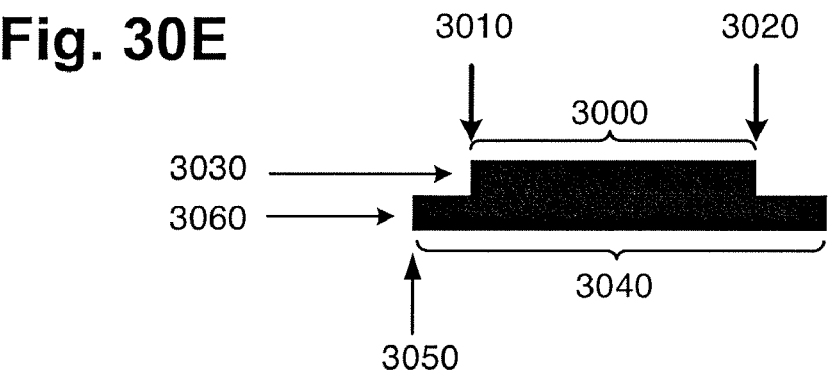
Figure 30F:
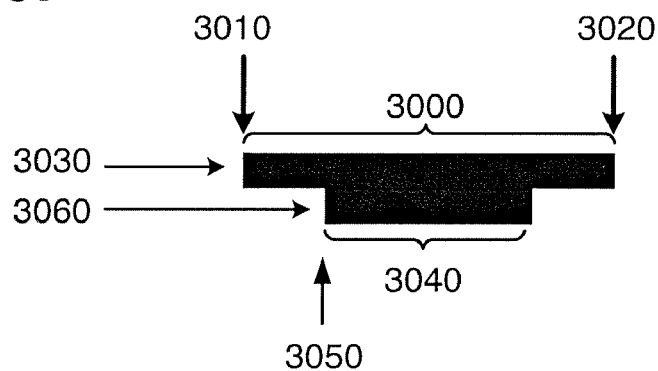
Figure 30G:
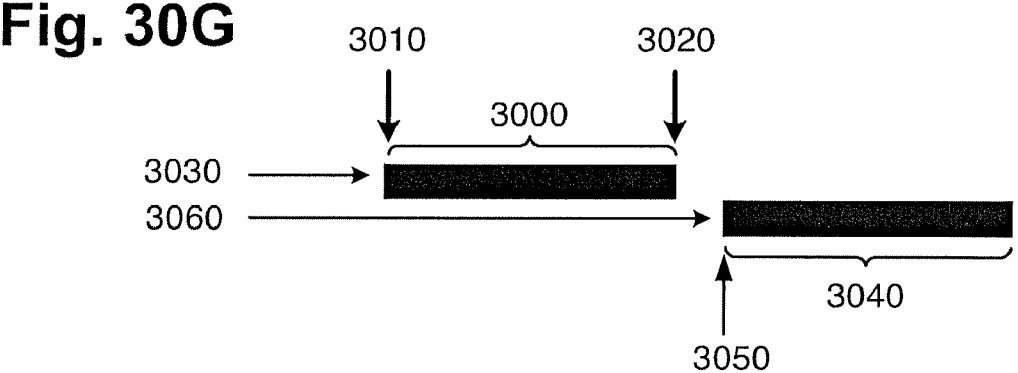
Figure 30H:
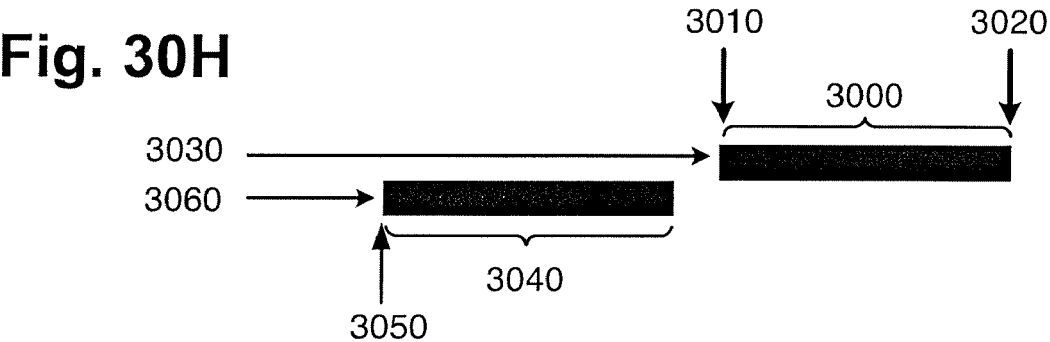

Thus far, a full page fillmap has been disclosed. The fillmap can also be tiled using a random access tiling scheme. Applying such a tiled representation onto the fillmap allows the pixel rendering apparatus 180 in FIG. 1 to render a rectangular portion of the page to pixels. Also, by applying random access tiling to the fillmap, tiles can be rendered independently, and in random order. This allows the pixel rendering apparatus to rotate the page without a full page frame store. FIG. 29 shows a tiled fillmap representation of the page represented in FIG. 15. The regions defined by the tiled fillmap 2900 in FIG. 29 are equivalent to the regions defined by the full page fillmap 1700 in FIG. 17. The tiled fillmap in FIG. 29 consists of four tiles 2910, 2920, 2930 and 2940. Each tile in the tiled fillmap is created by generating fill compositing sequence runs on a per tile basis, and then generating a fillmap for each tile. Fill compositing sequences are shared across tiles, and a single table of known fill compositing sequences is used to store the fill compositing sequences for the entire fillmap.

An alternative method of generating a fillmap and table of known fill compositing sequences is to create the fillmap using a painter's algorithm. In this alternate method a list of scanlines is maintained as each object is rendered in ascending Z-order, where each scanline is represented as an ordered list of fill compositing sequence runs, similar to the list of fill compositing sequence runs FCSRunList described in FIGS. 8-12. A table of known fill compositing sequences is also maintained which contains the fill compositing sequences referenced by the fill compositing sequence runs. After all the objects in the input page have been processed, a fillmap is derived from the list of scanlines. The fillmap, together with the table of known fill compositing sequences can then be used to render the page to pixels.

Figure 23:
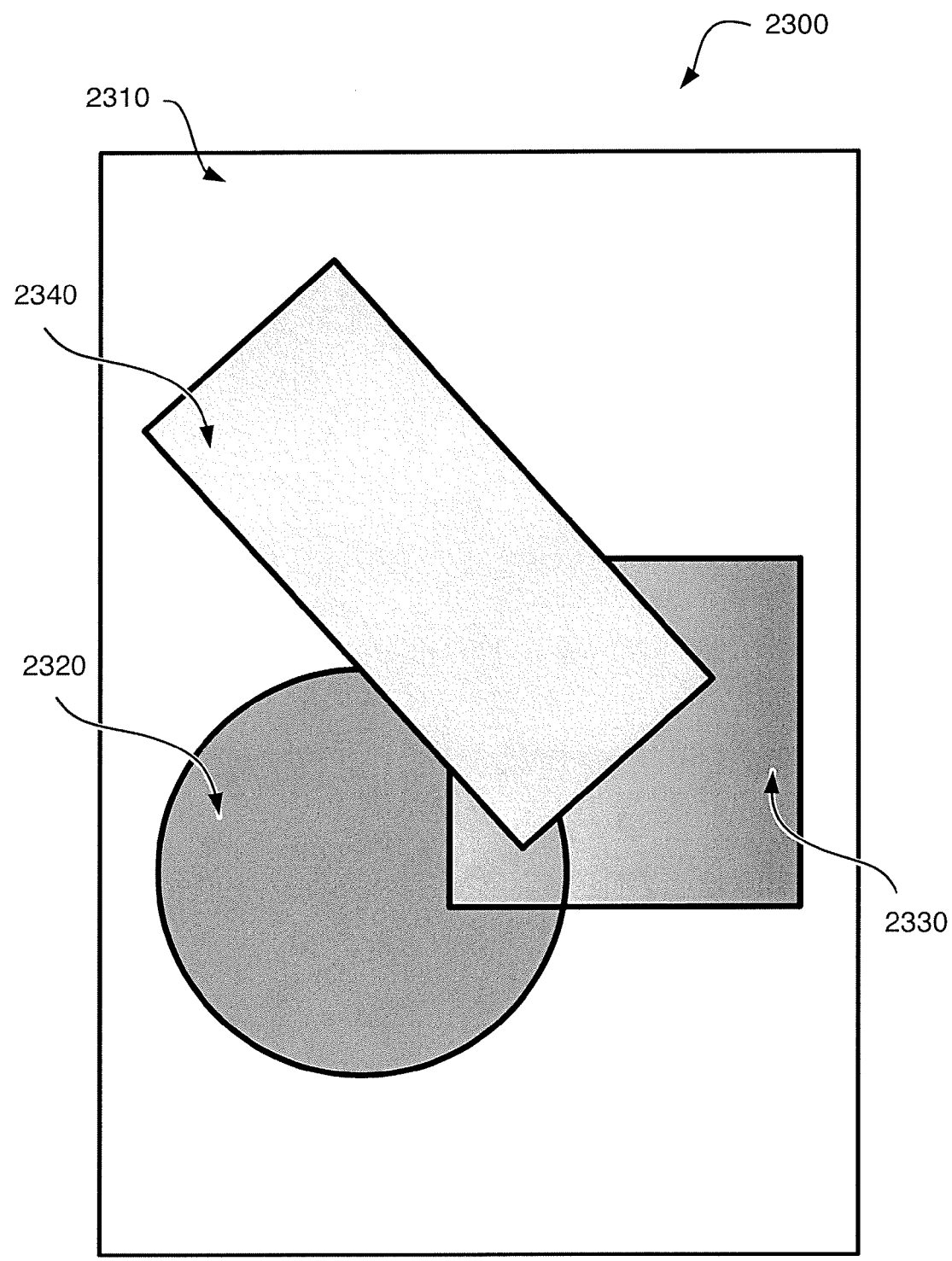
FIG. 23 shows yet another page representation.

FIG. 23 shows a page representation 2300. The page representation 2300 comprises the following object primitives: a white background 2310; a dark grey circle 2320, which is opaque; a rectangle 2330 with a linear blend fill, which is semi-transparent; and a light grey rectangle 2340, which has been rotated, and which is opaque.

Figure 24:
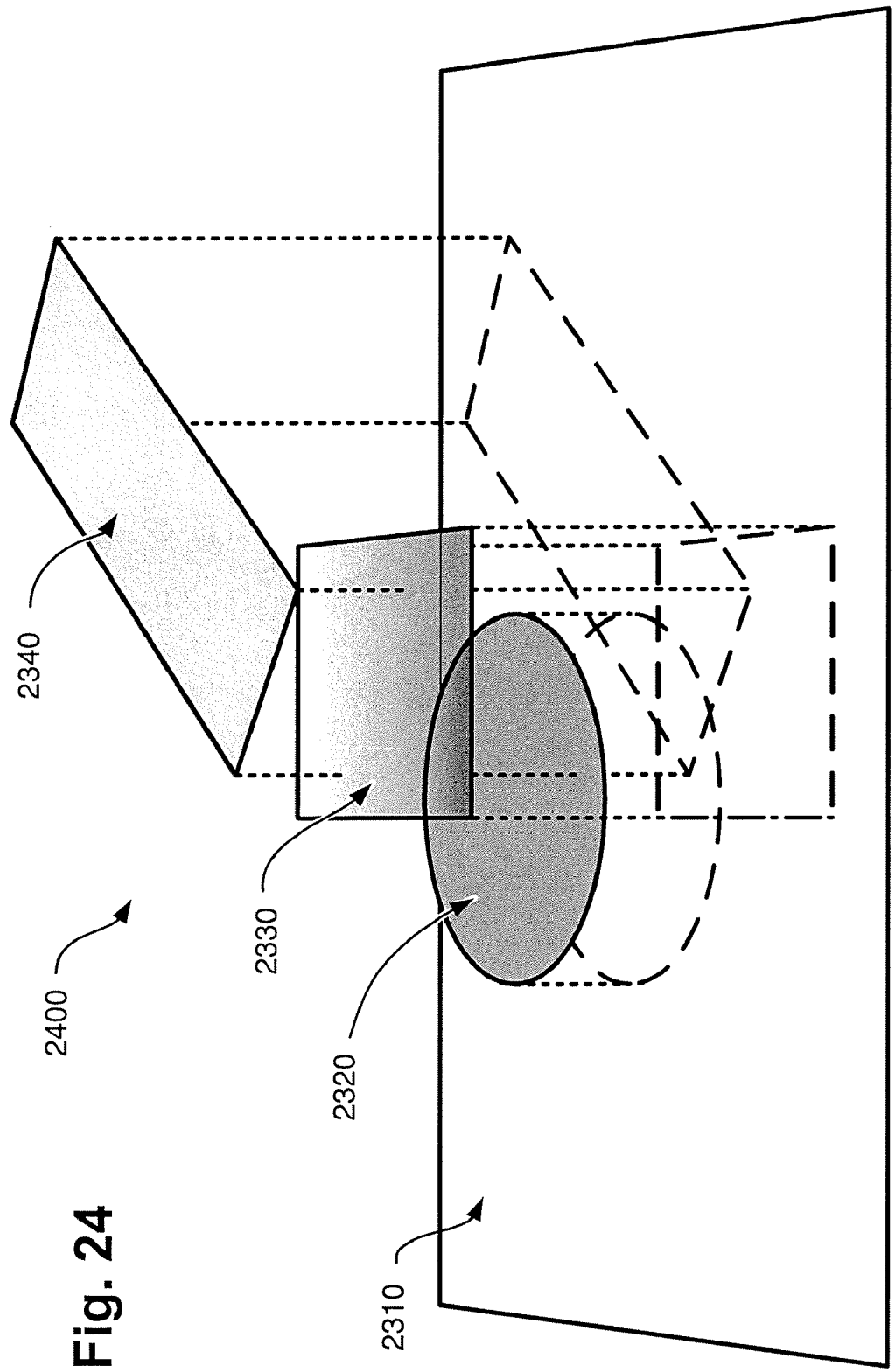
FIG. 24 shows page representation objects being painted onto a page.

FIG. 24 shows a different representation 2400 of the page represented in FIG. 23. The representation 2400 in FIG. 24 shows a different perspective to highlight the z-order of each of the object primitives 2310, 2320, 2330 and 2340. From FIG. 24 it can be seen that the light grey rectangle 2340 has the highest priority. The rectangle 2330, with the linear blend fill, has the second highest priority, followed by the dark grey circle 2320. The white background 2310 has lowest priority.

Figure 25:
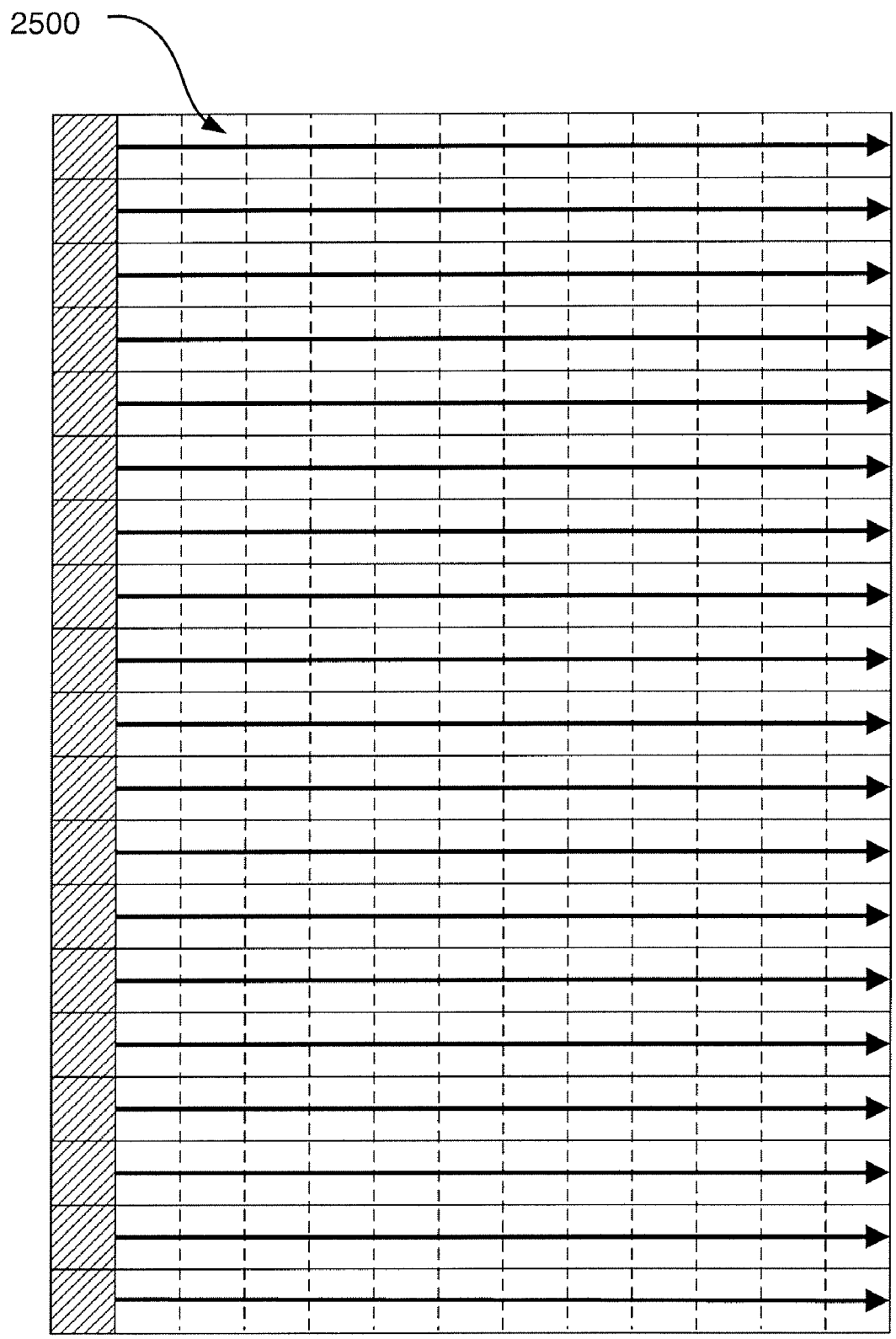
FIGS. 25 to 28 illustrate the generation of a fillmap using a painter's algorithm.

FIGS. 25, 26, 27 and 28 illustrate the generation of a fillmap using a painter's algorithm. In FIG. 25, the white background 2310 of the page represented in FIG. 23 is painted into the list of scanlines 2500. When the white background 2310 is painted into the list of scanlines 2500, a fill compositing sequence containing a single level is inserted into the table of known fill compositing sequences. This level contains an opaque white fill and other parameters. The table of known fill compositing sequences is initially empty. The list of scanlines 2500 is each initialised to a list containing a single fill compositing sequence run. Each fill compositing sequence run contains a reference to the fill compositing sequence representing the white background. Each fill compositing sequence run also has a run which is set to be the width of the page.

Figure 26:
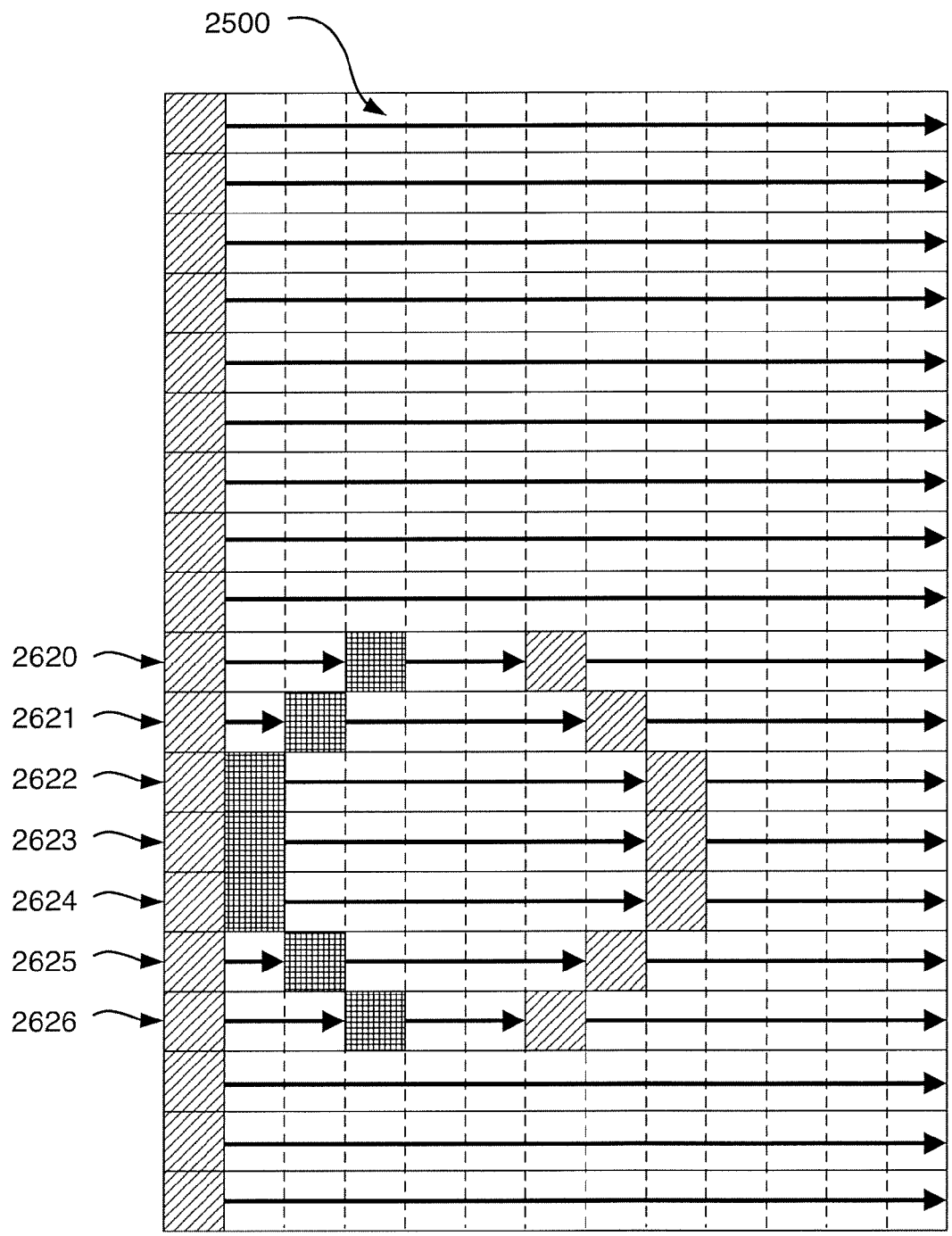

Next, as shown in FIG. 26, the dark grey circle 2320 is painted into the list of scanlines 2500. Scanlines 2620, 2621, 2622, 2623, 2624, 2625 and 2626 intersect the dark grey circle 2320. These scanlines are updated to reflect the fill compositing sequences, and the corresponding runs, required to render the page to pixels. Before the dark grey circle 2320 is painted into the list of scanlines 2500 the ordered list of fill compositing sequence runs representing the tenth scanline 2620 contained a fill compositing sequence run, as shown in FIG. 25. When the dark grey circle 2320 is then painted into the tenth scanline 2620, the fill compositing sequence run containing a reference to the background fill compositing sequence, with a run equal to the width of the page, is replaced by the following three fill compositing sequence runs. These are: a fill compositing sequence run containing a reference to the background fill compositing sequence, and a run of three pixels; a fill compositing sequence run containing a reference to a dark grey fill compositing sequence, and a run of three pixels; and a fill compositing sequence run containing a reference to the background fill compositing sequence, and a run of seven pixels. Also, a fill compositing sequence containing a single level with a dark grey opaque flat fill is inserted into the table of known fill compositing sequences.

The ordered lists for the remaining scanlines 2621 to 2626 are updated in similar fashion.

Figure 27:
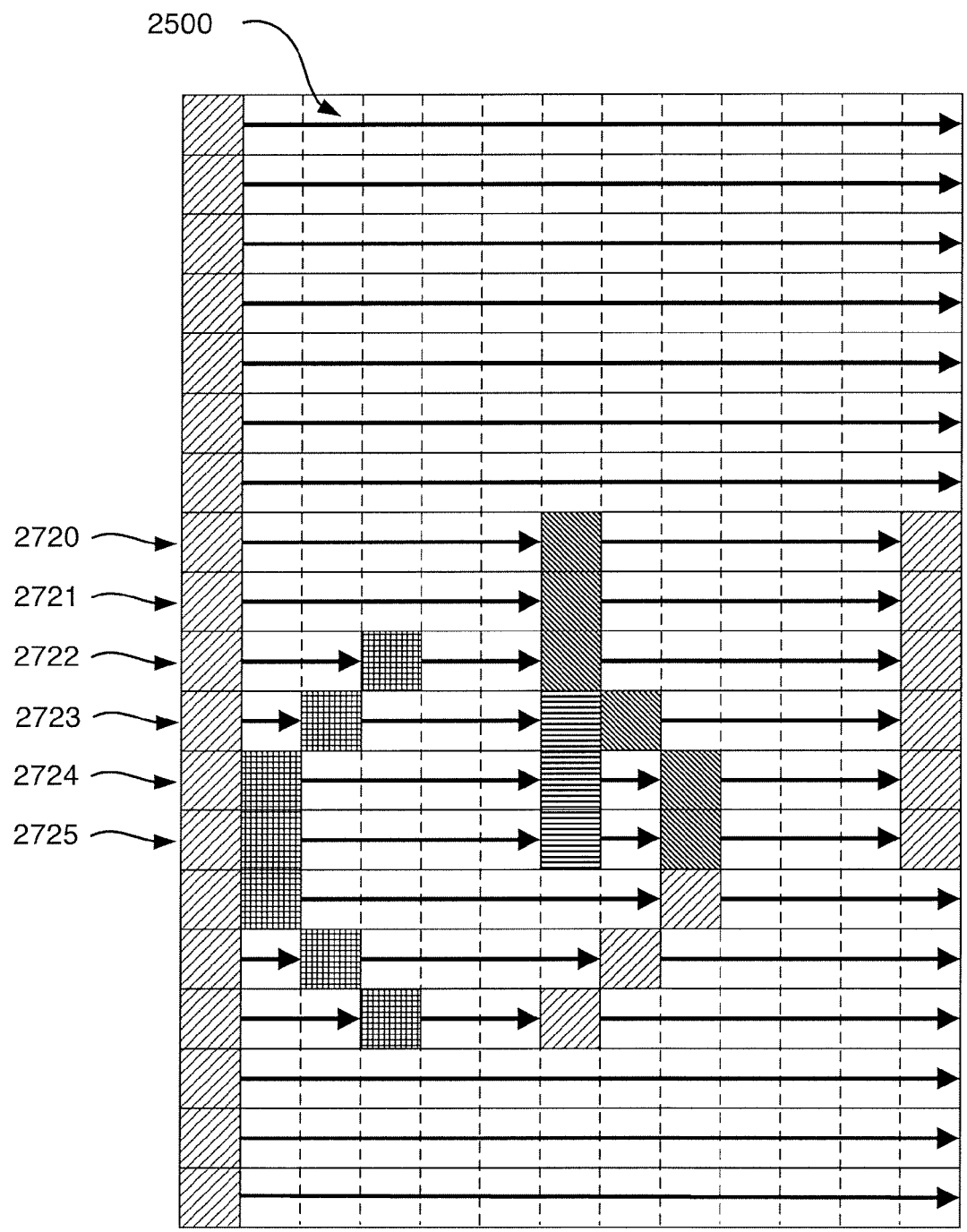

Next, as shown in FIG. 27, the linear blend rectangle 2330 is painted into the list of scanlines 2500. Scanlines 2720, 2721, 2722, 2723, 2724 and 2725 intersect the linear blend rectangle 2330. These scanlines are updated to reflect the fill compositing sequences, and the corresponding runs, required to render the page to pixels. Before the linear blend rectangle 2330 is painted into the list of scanlines 2320, the ordered list of fill compositing sequence runs representing the eighth scanline 2720 contains a single fill compositing sequence run, as shown in FIG. 26. When the linear blend rectangle 2130 is then painted into the eighth scanline 2720, the fill compositing sequence run containing a reference to the background fill compositing sequence, with a run equal to the width of the page, is replaced by the following three fill compositing sequence runs. These are: a fill compositing sequence run containing a reference to the background fill compositing sequence, and a run of six pixels; a fill compositing sequence run containing a reference to a linear blend mixed with white fill compositing sequence, and a run of six pixels; and a fill compositing sequence run containing a reference to the background fill compositing sequence, and a run of one pixel. Also, a fill compositing sequence containing two levels is inserted into the table of known fill compositing sequences. The topmost level contains a transparent linear blend fill and other parameters. The bottommost level contains an opaque white flat fill. The ordered list of fill compositing sequence runs representing the ninth scanline 2721 is updated in identical fashion to that of scanline 2720.

Before the linear blend rectangle 2330 is painted into the list of scanlines 2500 the ordered list of fill compositing sequence runs representing the tenth scanline 2722 contains three fill compositing sequence runs, as shown in FIG. 26. When the linear blend rectangle 2330 is then painted into the tenth scanline 2722, the ordered list of fill compositing sequence runs is updated to contain the following four fill compositing sequence runs. These are: a fill compositing sequence run containing a reference to the background fill sequence, and a run of three pixels; a fill compositing sequence run containing a reference to a dark grey fill compositing sequence, and a run of three pixels; a fill compositing sequence run containing a reference to a linear blend mixed with white fill compositing sequence, and a run of six pixels; and a fill compositing sequence run containing a reference to the background fill compositing sequence, and a run of one pixel.

Before the linear blend rectangle 2330 is painted into the list of scanlines 2500 the ordered list of fill compositing sequence runs representing the eleventh scanline 2723 contains three fill compositing sequence runs, as shown in FIG. 26. When the linear blend rectangle 2330 is then painted into the eleventh scanline 2723, the ordered list of fill compositing sequence runs is updated to contain the following five fill compositing sequence runs. These are: a fill compositing sequence run containing a reference to the background fill compositing sequence, and a run of two pixels; a fill compositing sequence run containing a reference to a dark grey fill compositing sequence, and a run of four pixels; a fill compositing sequence run containing a reference to a linear blend mixed with dark grey fill compositing sequence, and a run of one pixel; a fill compositing sequence run containing a reference to a linear blend mixed with white fill compositing sequence, and a run of five pixels; and a fill compositing sequence run containing a reference to the background fill compositing sequence, and a run of one pixel. Also, a fill compositing sequence containing two levels is inserted into the table of known fill compositing sequences. The topmost level contains a transparent linear blend fill and other parameters. The bottommost level contains an opaque grey flat fill.

The ordered lists for scanlines 2724 and 2725 are updated in similar fashion. The remaining scanlines are unaffected and hence do not need to be updated.

Similarly, the light grey rotated rectangle 2340 is painted into the 2500. The final list of scanlines 2500 is shown in FIG. 28.

Figure 12A:
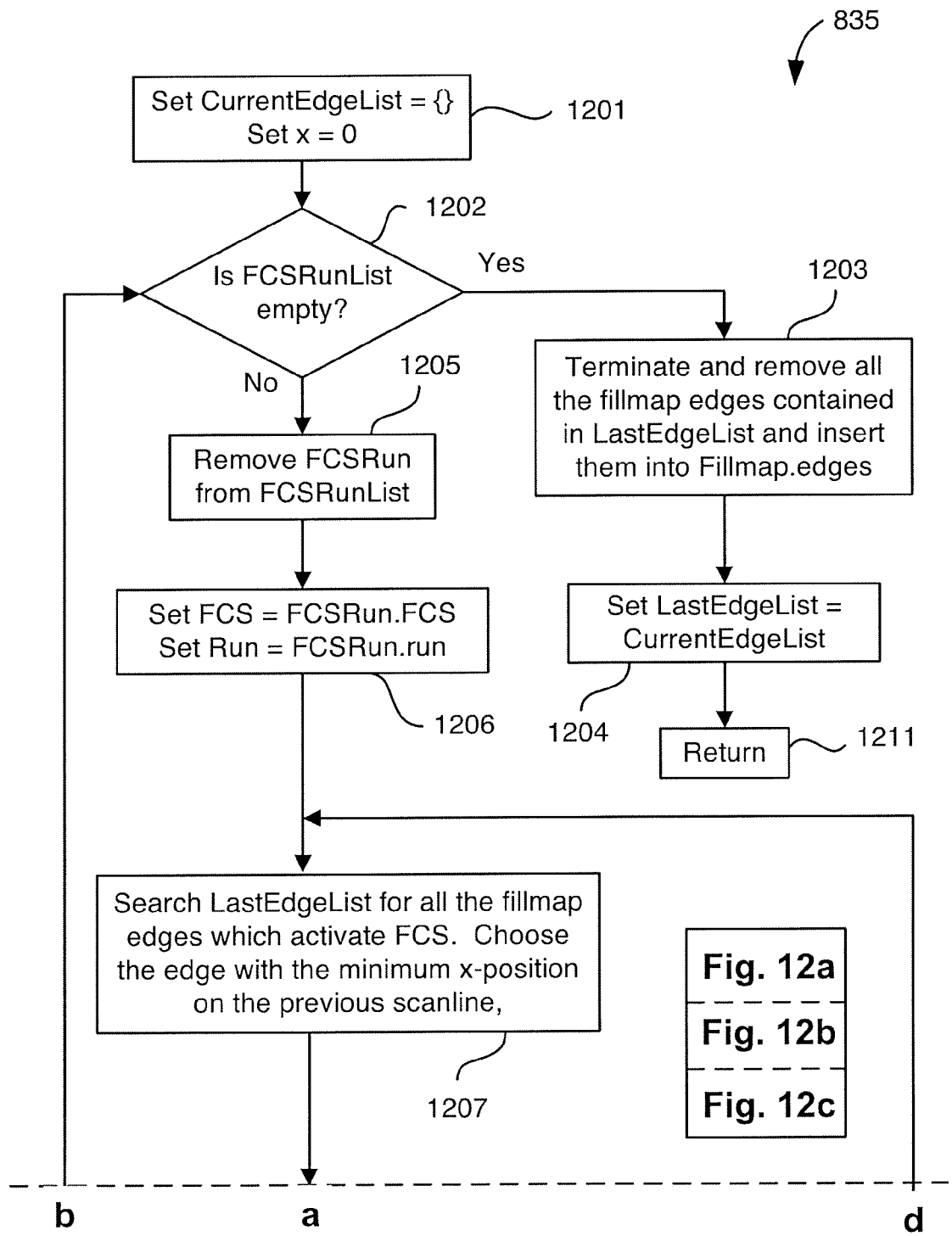
Figure 12B:
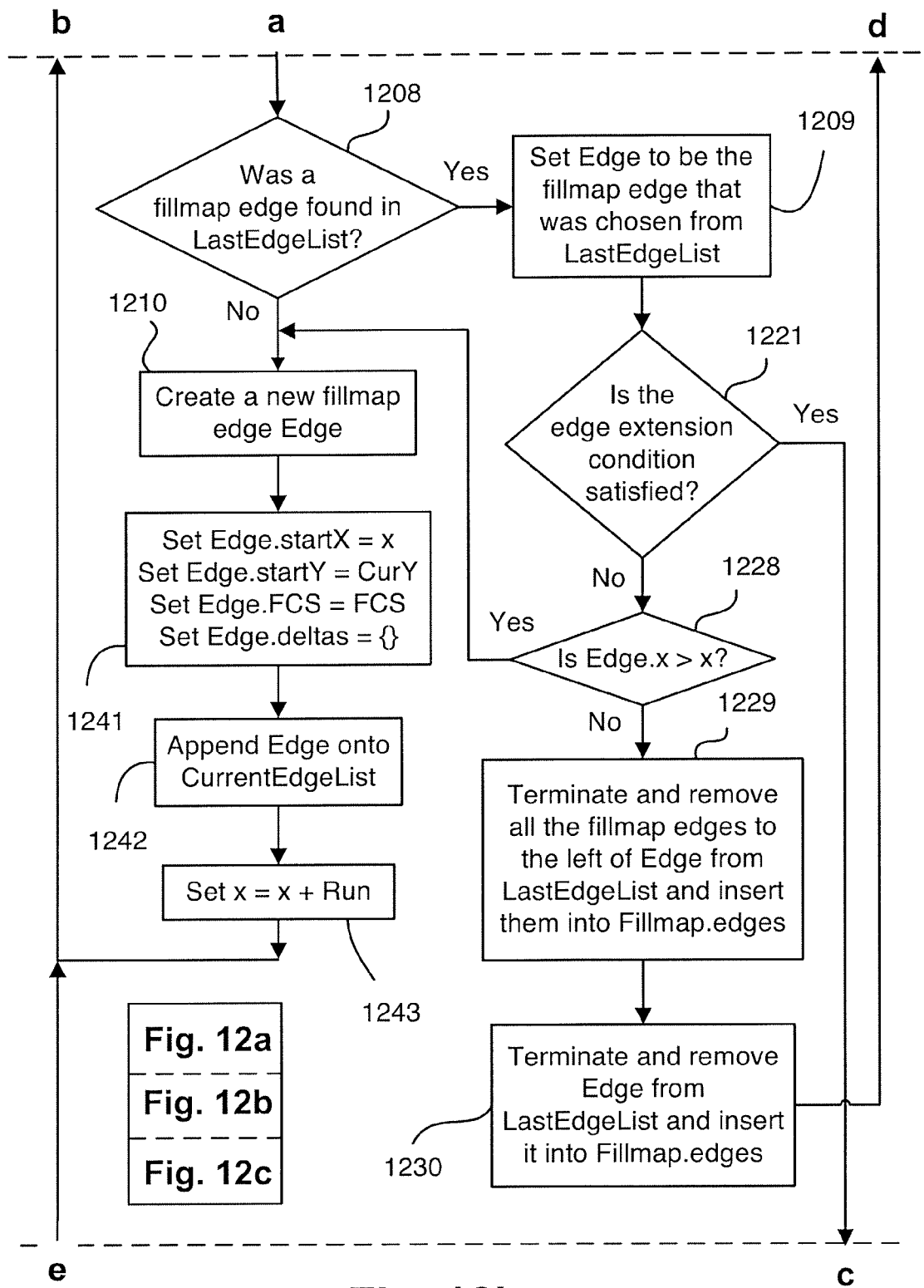
Figure 12C:
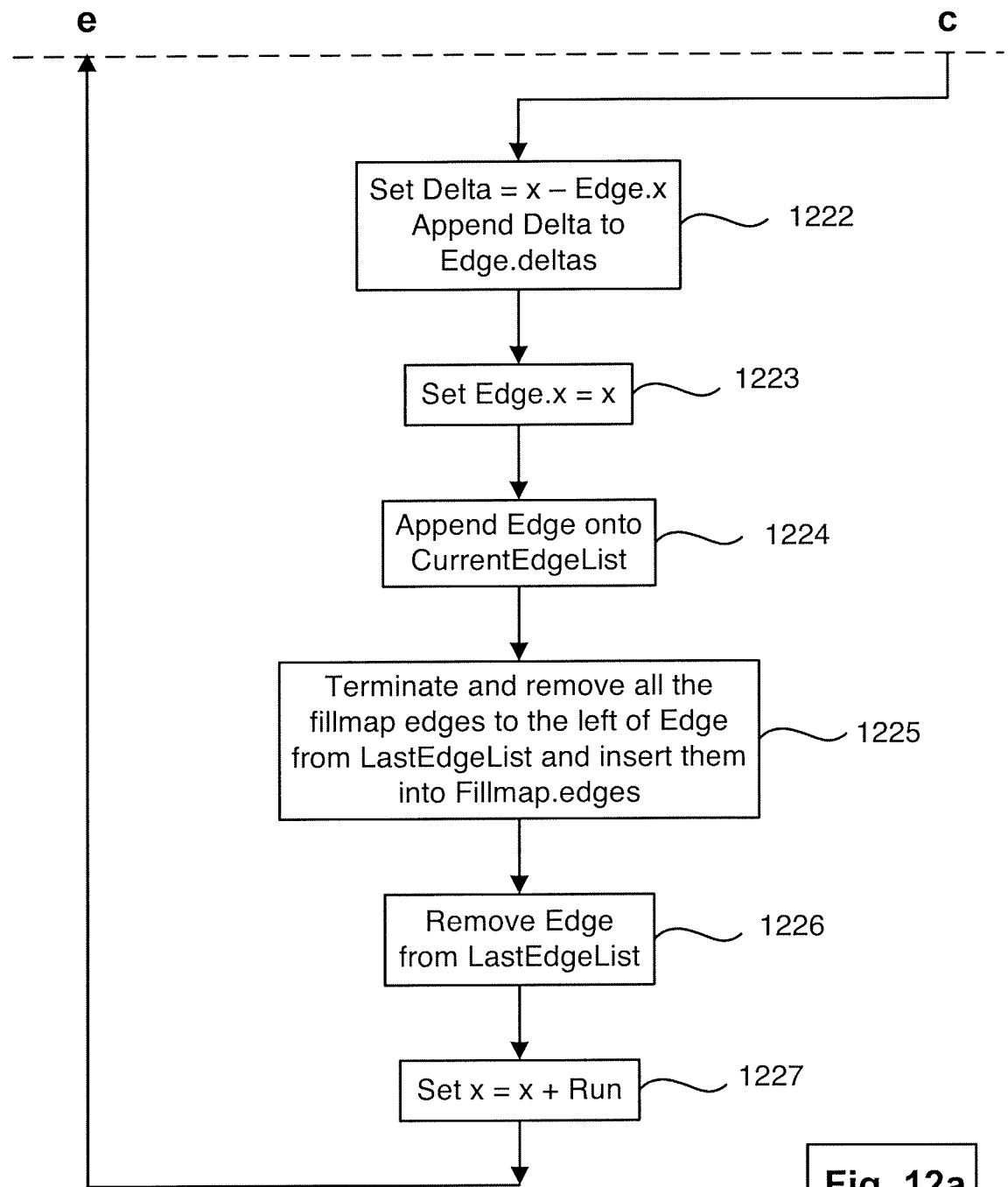
Figure 28:
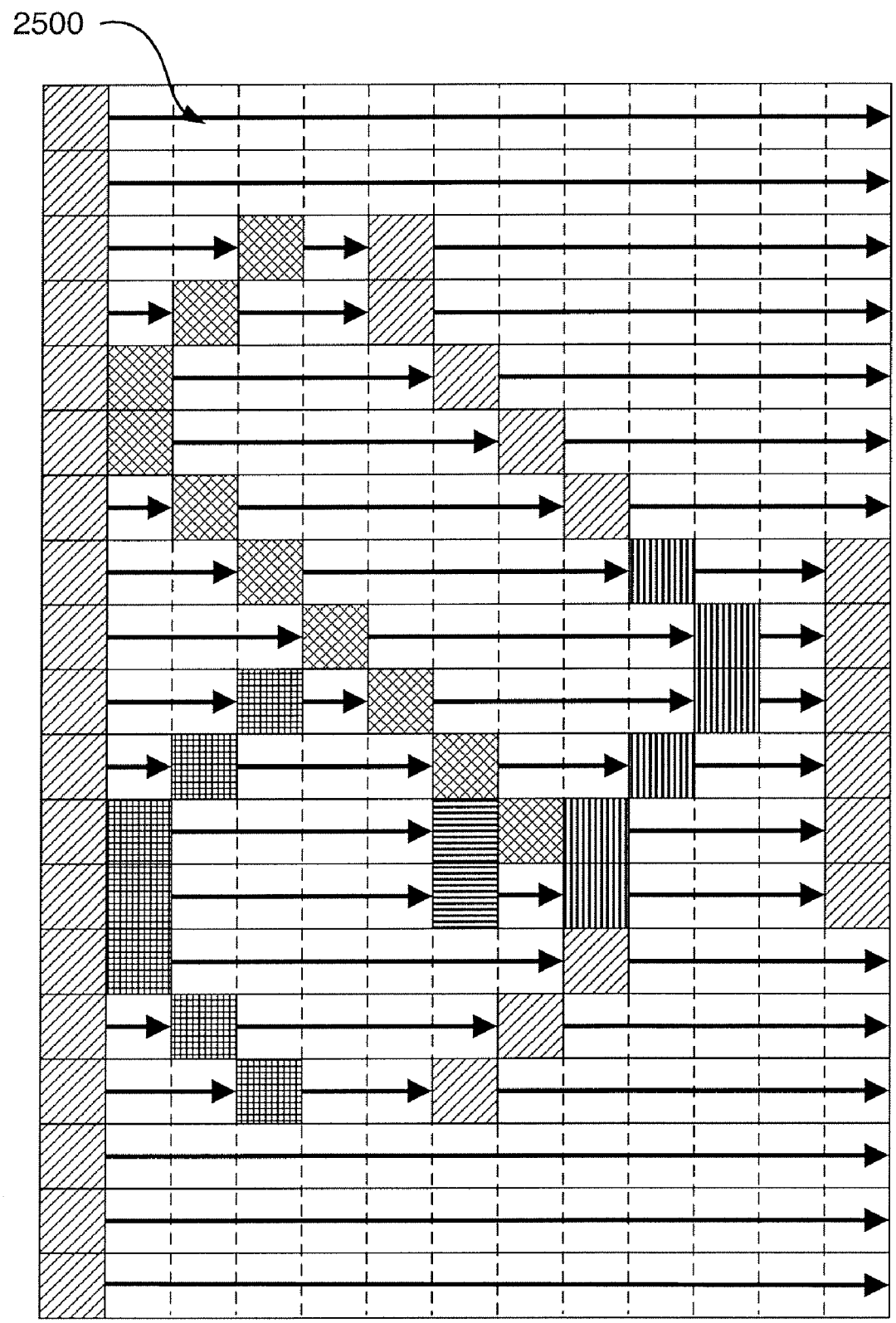

Finally, the list of scanlines 2500 shown in FIG. 28 is converted to a fillmap representation by applying an algorithm similar to that described in FIG. 12 to each of the scanlines in the list of scanlines 2500.

Yet another method of generating a fillmap representation of a page is to use a "multipass" algorithm. In this algorithm, input page representation objects are divided into a set of N batches. For example, a first batch may contain the background object and the K objects with least priority. A second batch may then contain the remaining objects in the page representation. In this example, the priority of each object in the second batch is higher than the priority of all objects in the first batch. Objects in the first batch are converted into an equivalent set of edges, levels and fills. These edges, levels and fills are then scan converted, and a fillmap and a table of fill compositing sequences are generated using the method 600.

Subsequently, objects from the second batch are converted into an equivalent set of edges, levels and fills. These edges, levels and fills are scan converted to produce scanlines of fill compositing sequence runs. Next, the background fillmap is scan converted to produce fill compositing sequence runs. The fill compositing sequence runs derived from the second batch of objects for successive scanlines in the page are then merged with the corresponding scanlines of fill compositing sequence runs derived from the background fillmap in the manner described with reference to FIGS. 23 to 28. The resulting merged fill compositing sequence runs are converted to a further fillmap and further table of known fill compositing sequences by applying an algorithm similar to that described in FIG. 12 to each of the successive merged scanlines of fill compositing sequence runs. The background fillmap and the table of known fill compositing sequences belonging to the background are discarded. This is the second pass operation, with objects from the second batch effectively being painted onto objects from the first batch. Note that, in general, any number of passes can be applied. In the general case, the priority of each object in the Mth batch is higher than the priority of all objects in the (M−1)th batch.

Figure 19:
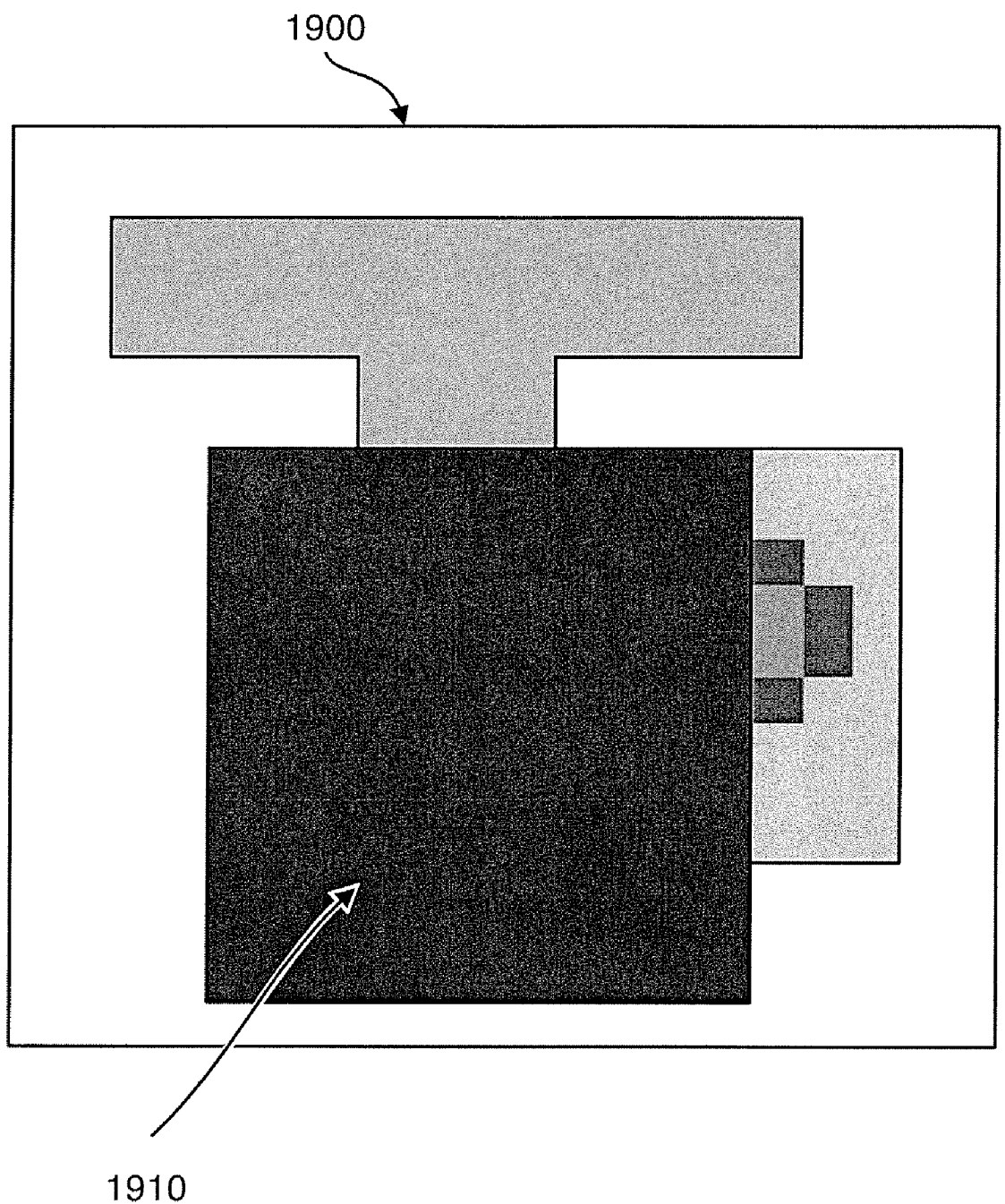
FIG. 19 shows another page representation.
Figure 20:
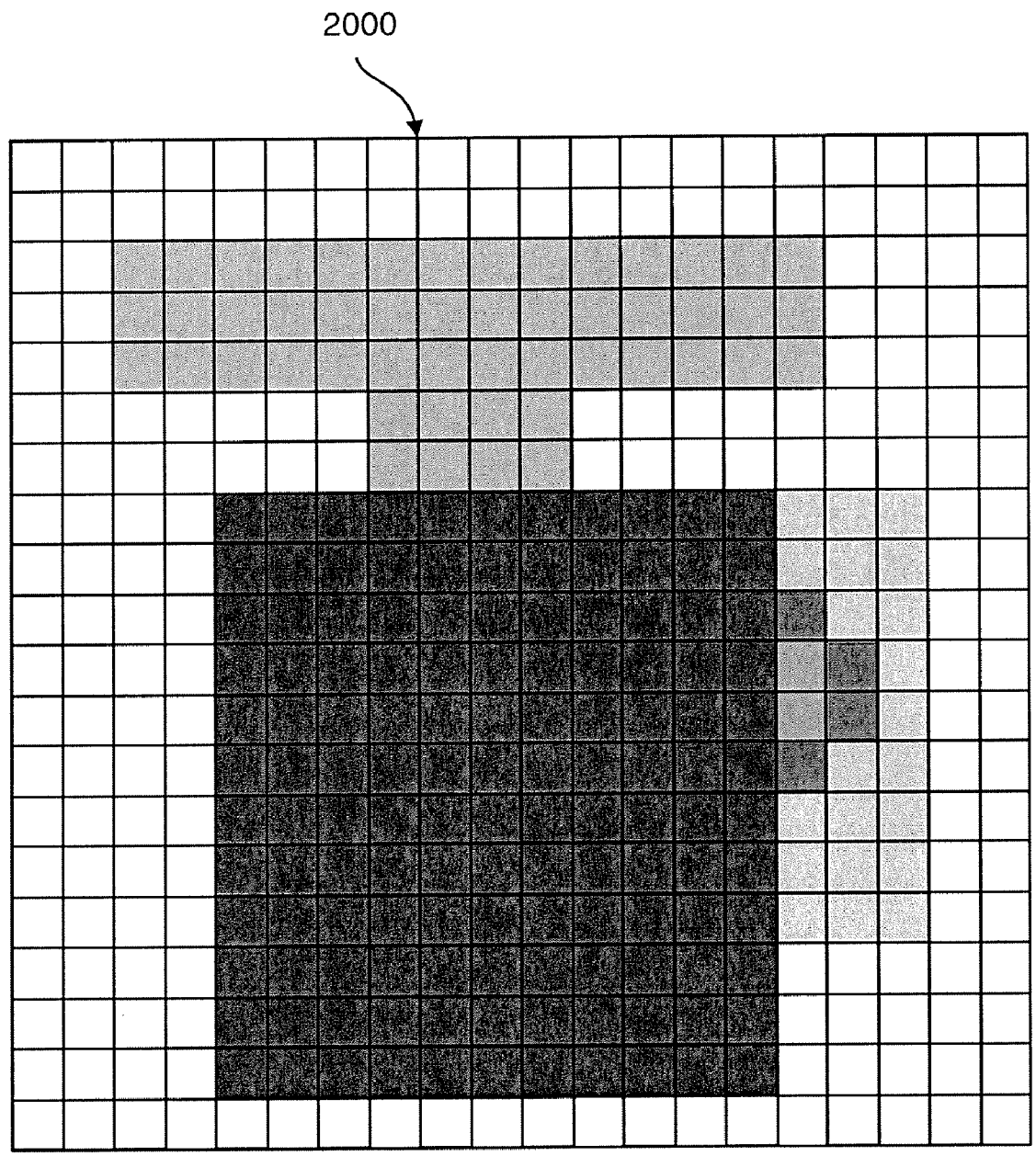
FIG. 20 shows a bitmap representation of the page representation shown in FIG. 19.
Figure 21:
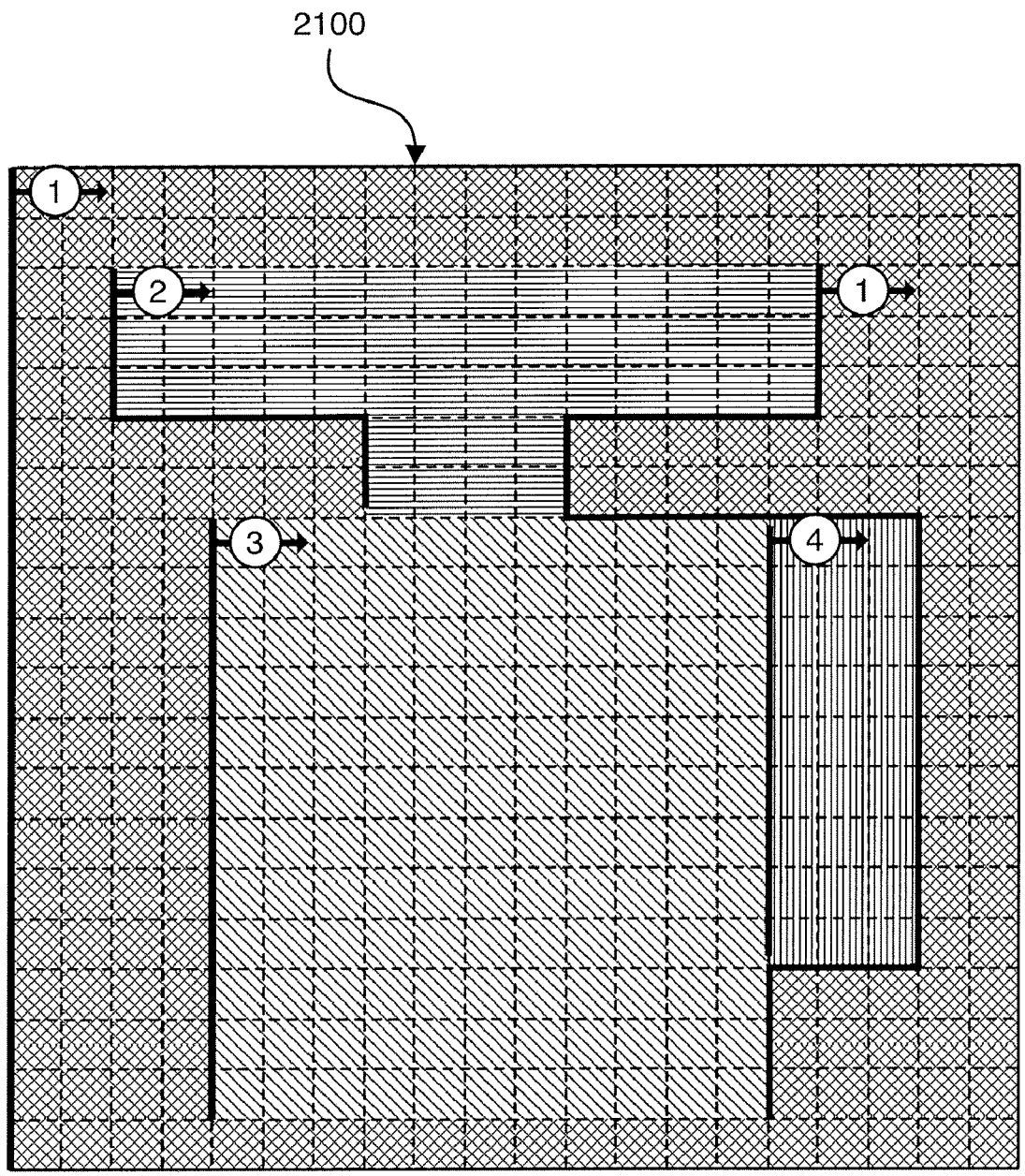
FIG. 21 shows a fillmap representation of the page representation shown in FIG. 19.

FIG. 19 shows the page representation 1900 resulting from adding a rectangular fill path 1910 with a dark grey flat fill to the page of which the representation 1500 is shown in FIG. 15. The rectangular fill path 1910 with a dark grey flat fill has a higher priority than each of the objects already contained within the page of which the representation 1500 is shown in FIG. 15. FIG. 20 shows a raster image 2000 of the page of which the representation 1900 is shown in FIG. 19. FIG. 21 shows the fillmap 2100 resulting from merging a new batch containing in this instance a single object, described by the rectangular fill path 1910 with a dark grey flat fill, into the fillmap represented in FIG. 17. The table of known fill compositing sequences 2200 which are referenced by each of the edges in the fillmap 2100 is shown in FIG. 22.

Figure 2:
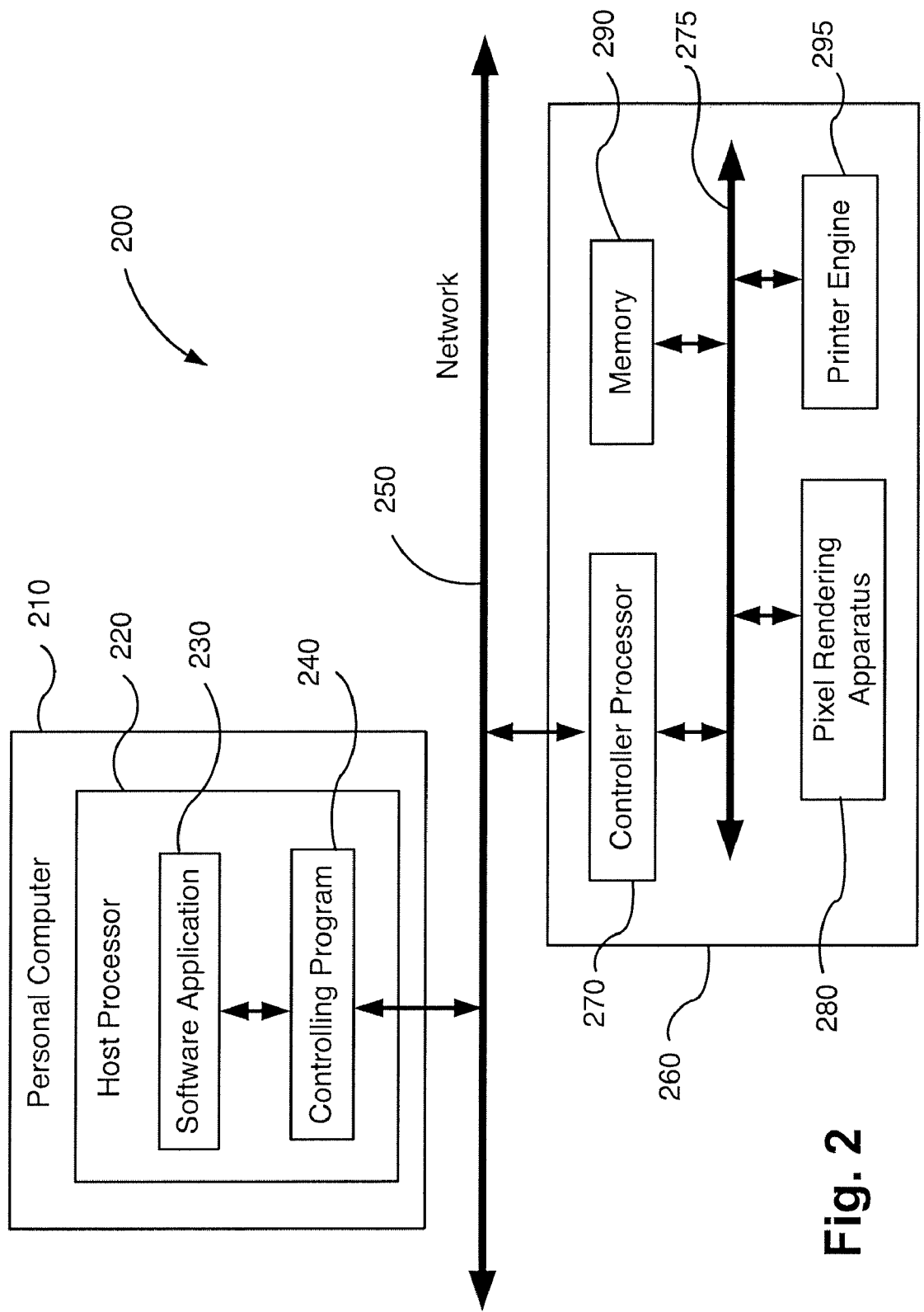

FIG. 2 shows a schematic block diagram of an alternate embodiment of the invention comprising of a pixel rendering system 200 for rendering computer graphic object images in accordance with the present invention. The pixel rendering system 200 comprises a personal computer 210 connected to a printer system 260 through a network 250. The network 250 may be a typical network involving multiple personal computers, or may be a simple connection between a single personal computer and printer system 260.

The personal computer 210 comprises a host processor 220 for executing a software application 230, such as a word processor or graphical software application, and a controlling program 240.

The printer system 260 comprises a controller processor 270, a pixel rendering apparatus 280, memory 290, and a printer engine 295 coupled via a bus 275. The pixel rendering apparatus 280 may be in the form of an ASIC coupled via the bus 275 to the controller processor 270, and the printer engine 295. However, the pixel rendering apparatus 280 may also be implemented in software executed in the controller processor 270.

In the pixel rendering system 200 shown in FIG. 2 the fillmap and table of known fill compositing sequences are generated in the controlling program 240 executing on the host processor 220. The controlling program then serialises the fillmap and table of known fill compositing sequences to produce a spool file. The spool file is then sent to the pixel rendering apparatus 280 via the network 250 for rendering to pixels. Once the pixel rendering apparatus 280 has rendered the fillmap to pixels, the pixels are transferred to the printer engine 295 for colour space conversion, halftoning and printing.

Figure 3:
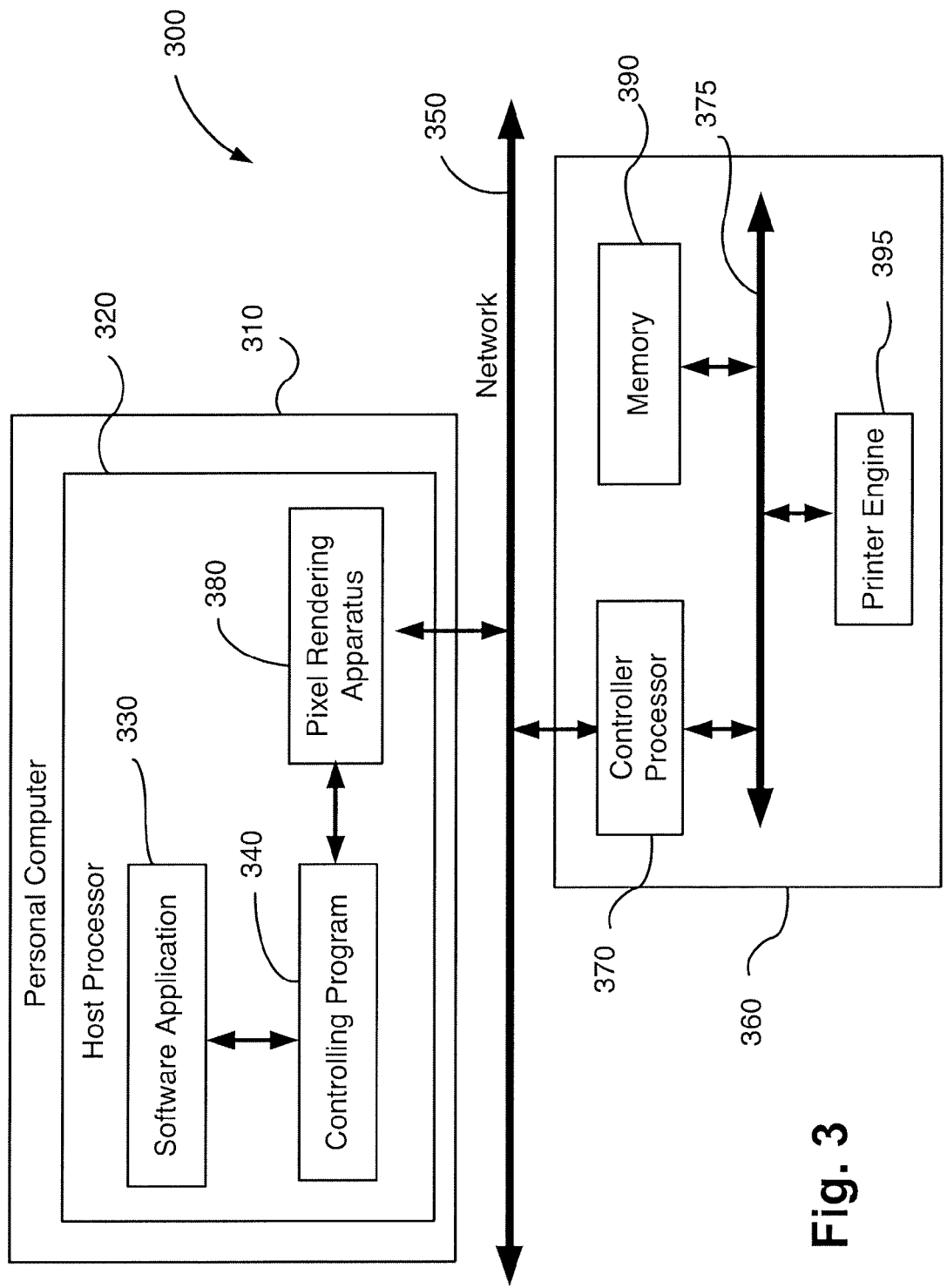

FIG. 3 shows a schematic block diagram of yet another embodiment of the invention comprising of a pixel rendering system 300 for rendering computer graphic object images in accordance with the present invention. The pixel rendering system 300 comprises a personal computer 310 connected to a printer system 360 through a network 350. The network 350 may be a typical network involving multiple personal computers, or may be a simple connection between a single personal computer and printer system 360.

The personal computer 310 comprises a host processor 320 for executing a software application 330, such as a word processor or graphical software application, a controlling program 340, and a pixel rendering apparatus 380.

The printer system 360 comprises a controller processor 370, memory 390, and a printer engine 395 coupled via a bus 375.

In the pixel rendering system 300 shown in FIG. 3 the fillmap and table of known fill compositing sequences are generated in the controlling program 340 executing on the host processor 320. The controlling program then transfers the fillmap and table of known fill compositing sequences to pixel rendering apparatus 380, also executing on the host processor 320, for rendering to pixels. The rendered page is then colour space converted and halftoned before being compressed and serialised to produce a spool file. The spool file is then sent to the printer engine 395 via the network 350 for printing.

Figure 31:
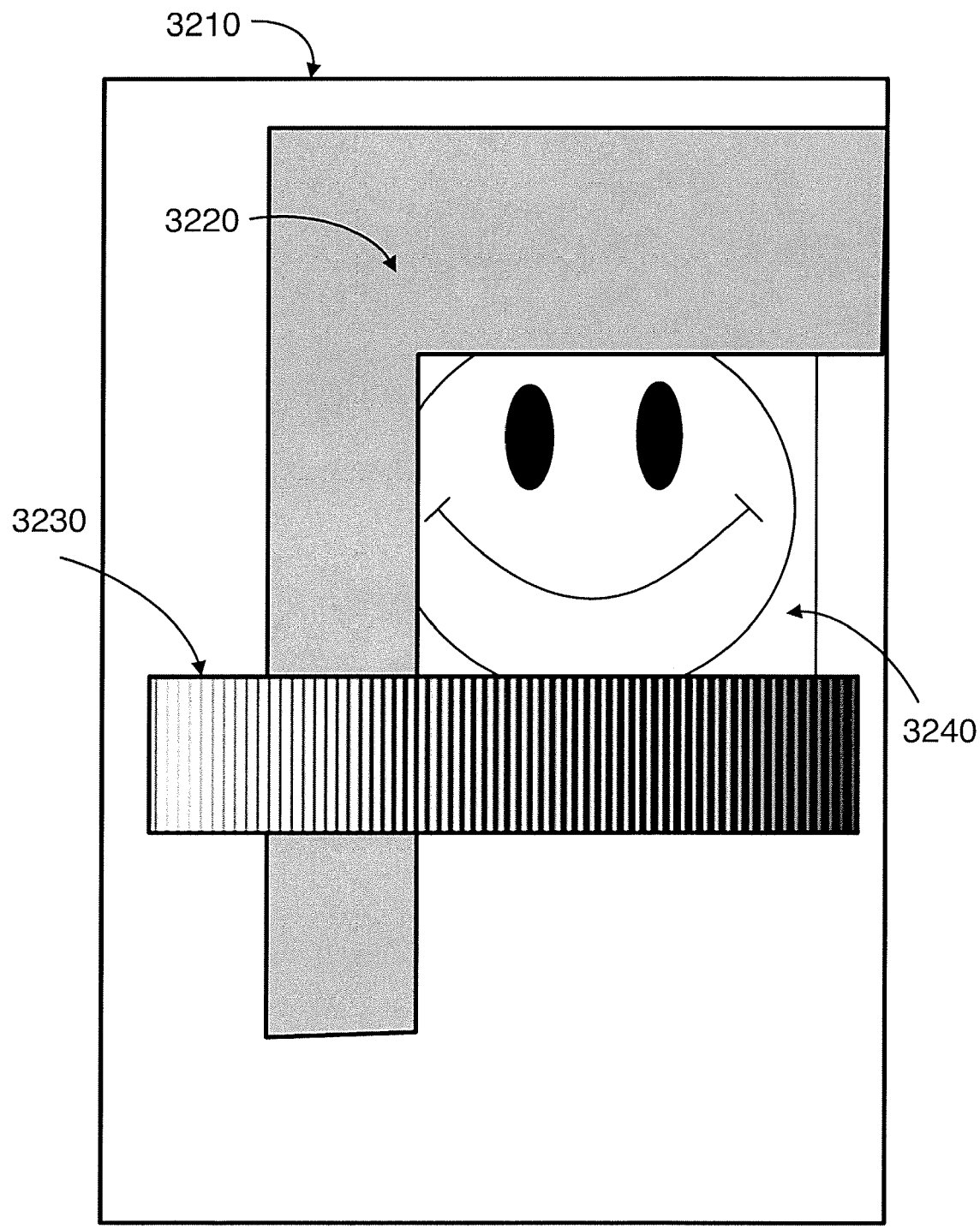
FIG. 31 is an illustration of a typical page to be rendered.
Figure 32:
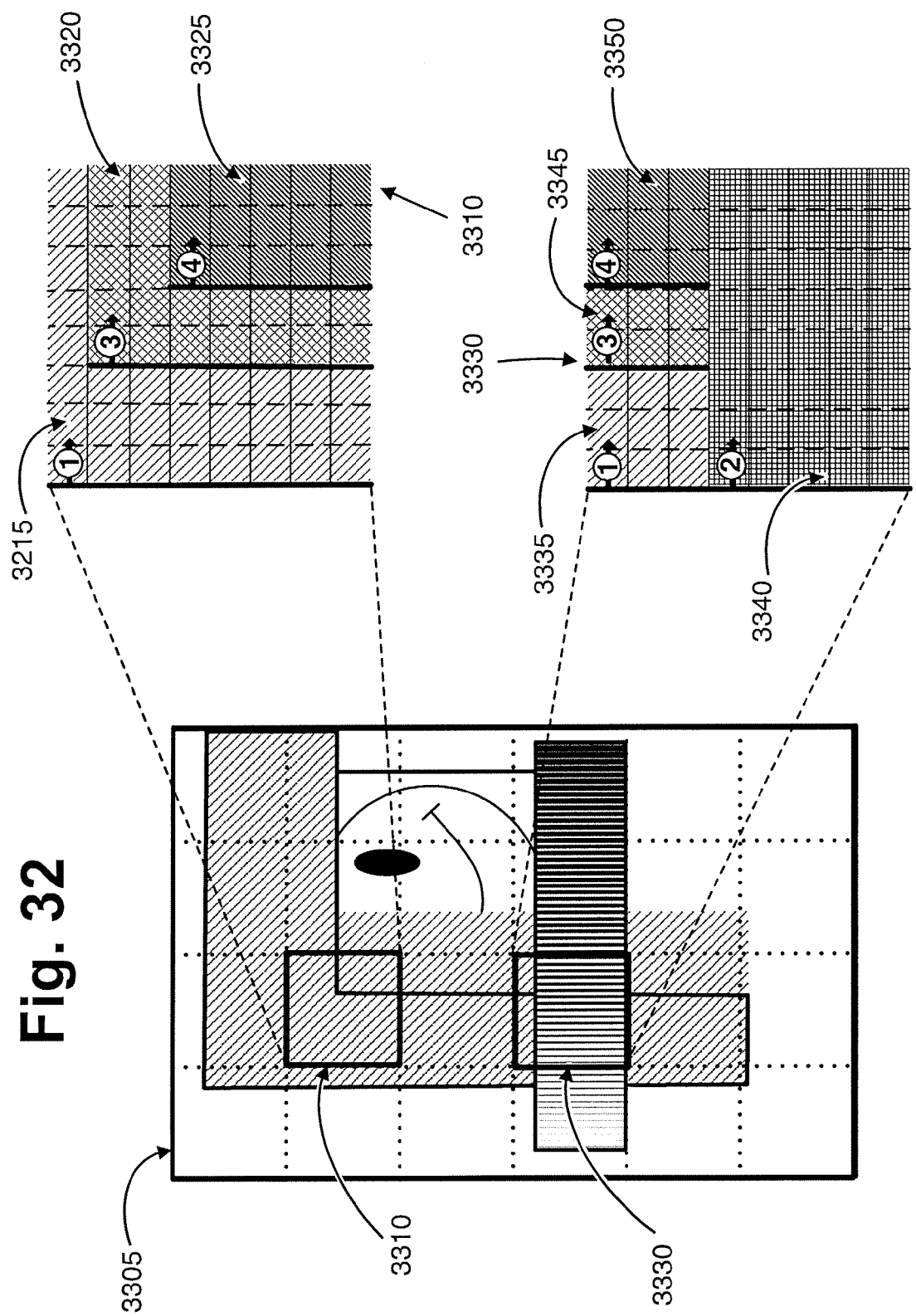
FIG. 32 shows the page from FIG. 31 with grid lines overlaid, and two fillmap tiles in expanded view.

Having described the manner in which the a fillmap representation of a page is generated, a method of processing the fillmap to ensure that it is compact and can be rendered in real-time is now described. FIG. 31 shows a typical page 3210 containing three objects arranged on a background in ascending Z-order as follows: a low resolution opaque source bitmap object 3240, a semitransparent flat object 3220, and a linear blend object 3230. FIG. 32 shows the page 3210 of FIG. 31 with grid lines overlaid, and two fillmap tiles in expanded view. The fillmap tiles 3310 and 3330 are at tile positions (1, 1) and (1, 3) respectively expressed in (column, row) form. The contents of fillmap tile 3310 are shown expanded at the top right of FIG. 32. The three regions 3315, 3320 and 3325 in fillmap tile 3310 reference the fill compositing sequences with indices 1, 3 and 4 respectively. The contents of fillmap tile 3330 are also shown expanded at the bottom right of FIG. 32. The four regions 3335, 3340, 3345 and 3350 in fillmap tile 3330 reference the fill compositing sequences with indices 1, 2, 3 and 4 respectively.

The advantage of the fillmap representation is that there is no pixel over-painting required to either generate or render a fillmap. However rendering a fillmap may require complex compositing operations to generate each output or page resolution pixel (step 1450 of FIG. 14). These potentially complex compositing operations mean that it is impossible to guarantee that a fillmap as so far described can be rendered in real-time. In addition, source bitmap fills referenced by fill compositing sequences may contain redundant data because certain pixels thereof are obscured by higher priority opaque objects. This means the additional memory required to store this unused source fill data is wasted.

Processing the fillmap to ensure that it is compact and can be rendered in real-time is achieved through processing the fill compositing sequences referenced by the fillmap, to ensure that fill compositing sequences are 'flattened', and redundant data is discarded. A flattened fill compositing sequence is a fill compositing sequence which requires no compositing to derive the final pixel colour. The table of fill compositing sequences preferably stores an optimisation operation for each fill compositing sequence, generated at the time the fill compositing sequence is entered into the table of fill compositing sequences and depending on the type of fill compositing sequence. Possible optimisation operations for different fill compositing sequence types are listed in Table 1 below. The optimisation operations will be described in further detail below.

TABLE 1

Optimisation operations for fill compositing sequences

| Fill compositing sequence type | Optimisation operation |
| --- | --- |
| A fill compositing sequence referencing a single, low-resolution opaque source bitmap. | CROP All unused source bitmap tiles are to be discarded. |
| A fill compositing sequence referencing a single, low-resolution source bitmap composited with one or more flat colour fills. | FLATTEN TO BITMAP The fill compositing sequence is to be replaced by a fill compositing sequence referring to a single low resolution opaque bitmap. |
| A fill compositing sequence referencing a single flat colour. | NONE There is no optimisation possible for this fill compositing sequence. |
| None of the above (a fill compositing sequence that cannot be optimised as a low-resolution opaque bitmap or a flat colour). | FLATTEN TO PIXELS The regions in the fillmap referring to this fill compositing sequence are to be replaced by pixel values at page resolution. |

FIG. 33 shows the table of fill compositing sequences 3410 for the all fillmap tiles on page 3305 shown in FIG. 32. The fill compositing sequence with index 1 references the flat colour fill of object 3220 (FIG. 31) after compositing with the background colour as in the optional variant of step 995 of FIG. 9. The optimisation operation for this fill compositing sequence is set to 'NONE' as this fill compositing sequence requires no optimisation. The fill compositing sequence with index 2 references the blend fill of object 3230 (FIG. 31). In typical rendering systems this blend cannot be rendered in real-time, hence its optimisation operation is set to 'FLATTEN TO PIXELS'. The fill compositing sequence with index 3 references the low resolution source bitmap fill of object 3240 (FIG. 31) composited with the flat colour fill of object 3220. This fill compositing sequence can be optimised as a low resolution source bitmap, and so the optimisation operation is set to 'FLATTEN TO BITMAP'. The fill compositing sequence with index 4 references the low resolution source bitmap of object 3240 (FIG. 31). This fill compositing sequence can be optimised by cropping the source bitmap, and so the optimisation operation is set to 'CROP'.

Figure 34:
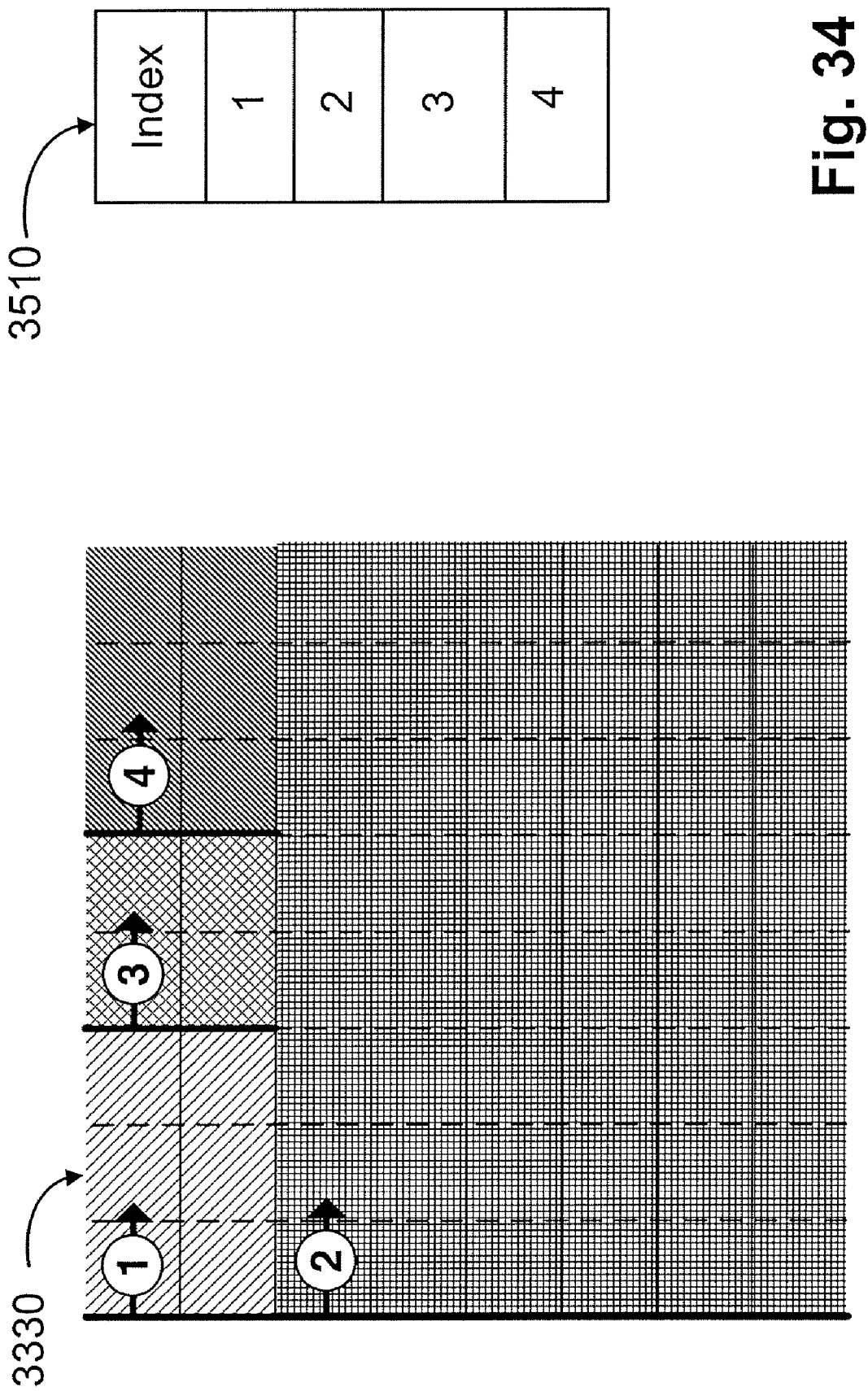
FIG. 34 shows the list of fill compositing sequences for a single fillmap tile.

Each tile in a fillmap has a list of the indices of the fill compositing sequences needed to render the fillmap tile to pixels. An illustration of this is given in FIG. 34, which shows the fillmap tile 3330 from FIG. 32 and the corresponding list of fill compositing sequences 3510.

A fill compositing sequence may reference a source bitmap, which is typically at a lower resolution than that of the printer engine 195. Two distinct fill compositing sequences may reference the same source bitmap. Each source bitmap is preferably stored within an image repository within memory 190 as an array of rectangular tiles. The image repository allows random access to these source bitmap tiles. In this way, source tiles can be independently created, discarded, or modified. Source tiles can be as small as a single pixel or as large as the entire image, but to obtain a proper tradeoff between efficiency and compactness are preferably between these two extremes.

In a fillmap representation of a page, each reference in a fill compositing sequence to a source bitmap is associated with an affine transformation matrix. This matrix allows the renderer to map between the page resolution pixels and source bitmap pixels. Moreover, each source bitmap is itself associated with a bitmask. The bitmask has a single value for each source bitmap tile. The bitmask value is set to either 'NOT REQUIRED' or 'REQUIRED' depending on whether the corresponding source tile contributes colour to an output pixel. If tiles are one pixel in size, the bitmask is clearly of the same resolution as the source bitmap. When each source bitmap is initially stored in the image repository, all bitmask values are set to 'NOT REQUIRED'.

Figure 35:
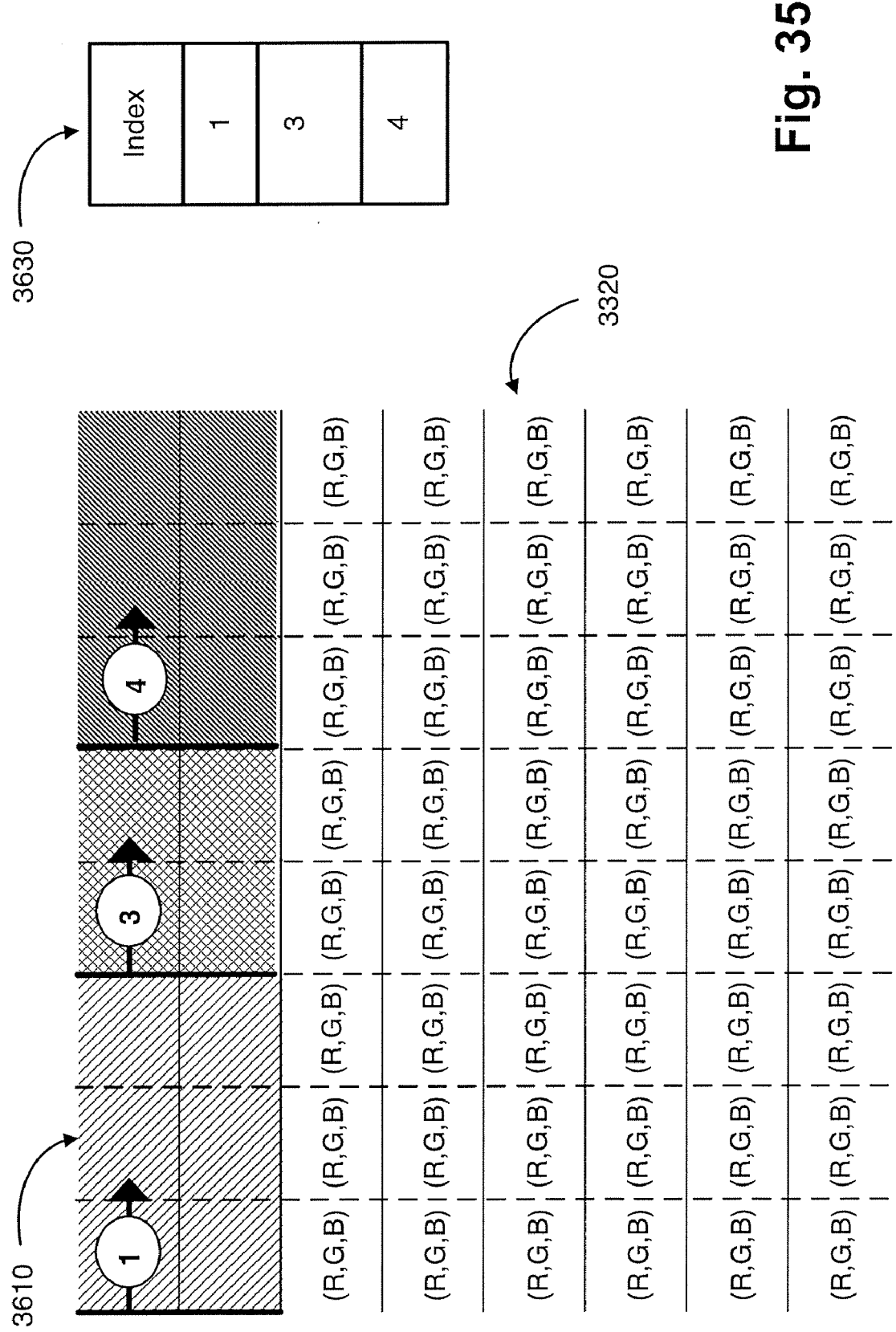
FIG. 35 is an illustration of a hybrid fillmap tile.

A form of fillmap representation known as a hybrid fillmap is used in the present improvement. A hybrid fillmap can comprise one or more hybrid fillmap tiles. A hybrid fillmap tile has at least one region containing page resolution pixel values rather than a reference to a fill compositing sequence. FIG. 35 shows a hybrid fillmap tile representation 3610 of the fillmap tile 3330 from FIG. 32. The region 3340 which previously referred to the fill compositing sequence with index 2 has been replaced by a region 3620 of RGB pixel values. The updated list of corresponding fill compositing sequence indices 3630 (omitting index 2) is also shown in FIG. 35.

Figure 36:
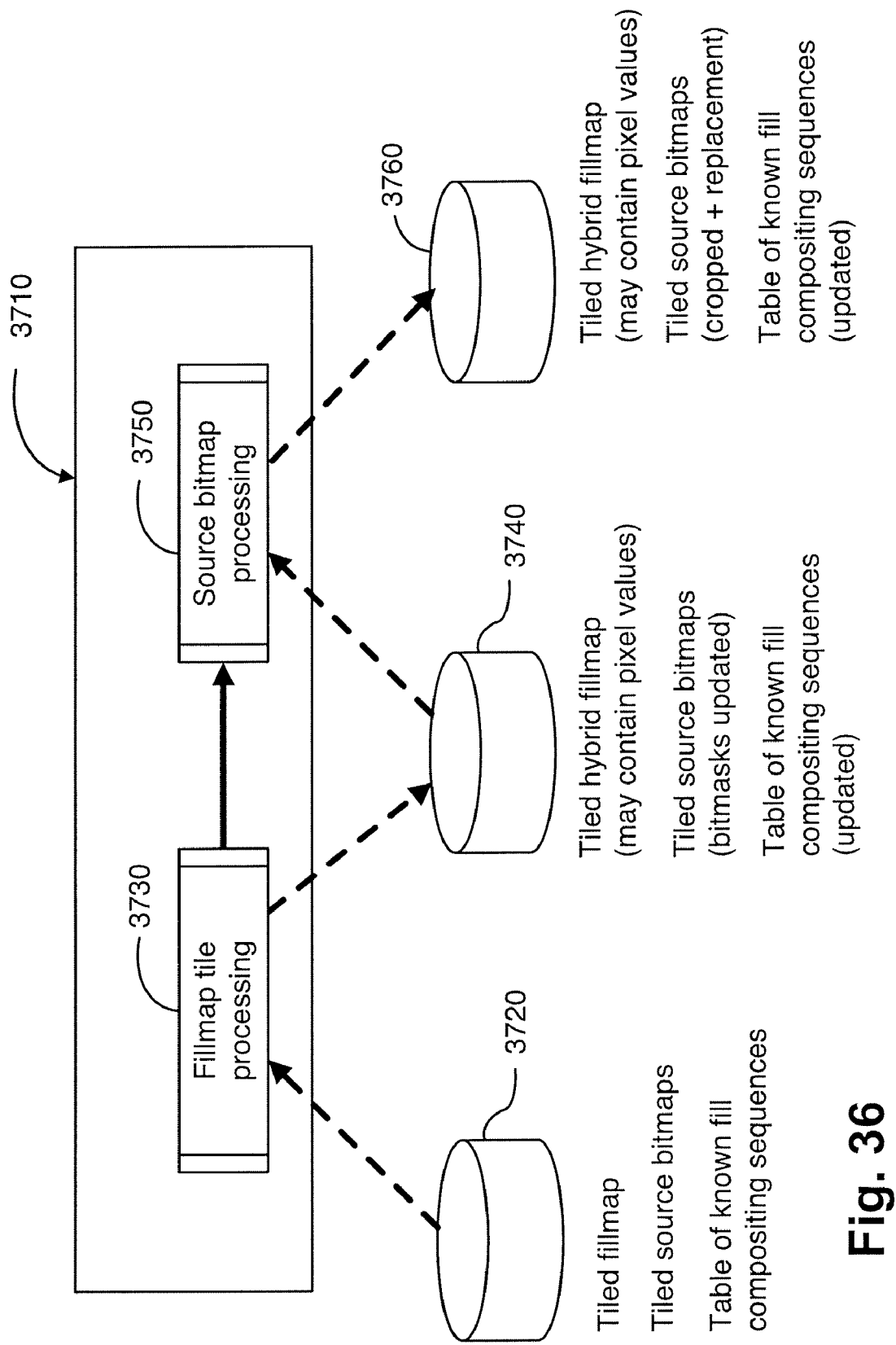
FIG. 36 is a block diagram of the disclosed fillmap optimisation method.

FIG. 36 shows a schematic block diagram of the fillmap processing method 3710, comprising a fillmap tile processing stage 3730, and a source bitmap processing stage 3750. The fillmap processing method 3710 receives a page representation 3720 comprising a tiled fillmap, a table of fill compositing sequences and referenced tiled source bitmaps. The fillmap tile processing stage 3730 processes the tiled fillmap and associated data 3720 and produces intermediate data 3740 comprising a tiled hybrid fillmap, source bitmaps with updated bitmasks, and an updated table of fill compositing sequences. This intermediate data 3740 is then passed onto the source bitmap processing stage 3750. The source bitmap processing stage 3750 discards any unrequired source tiles and generates flattened source bitmaps according to the 'flatten to bitmap' optimisation. The result is spoolable page data 3760 consisting of a tiled hybrid fillmap, a table of flattened fill compositing sequences, and source bitmaps which have either been cropped, or else generated in step 3750.

Figure 37:
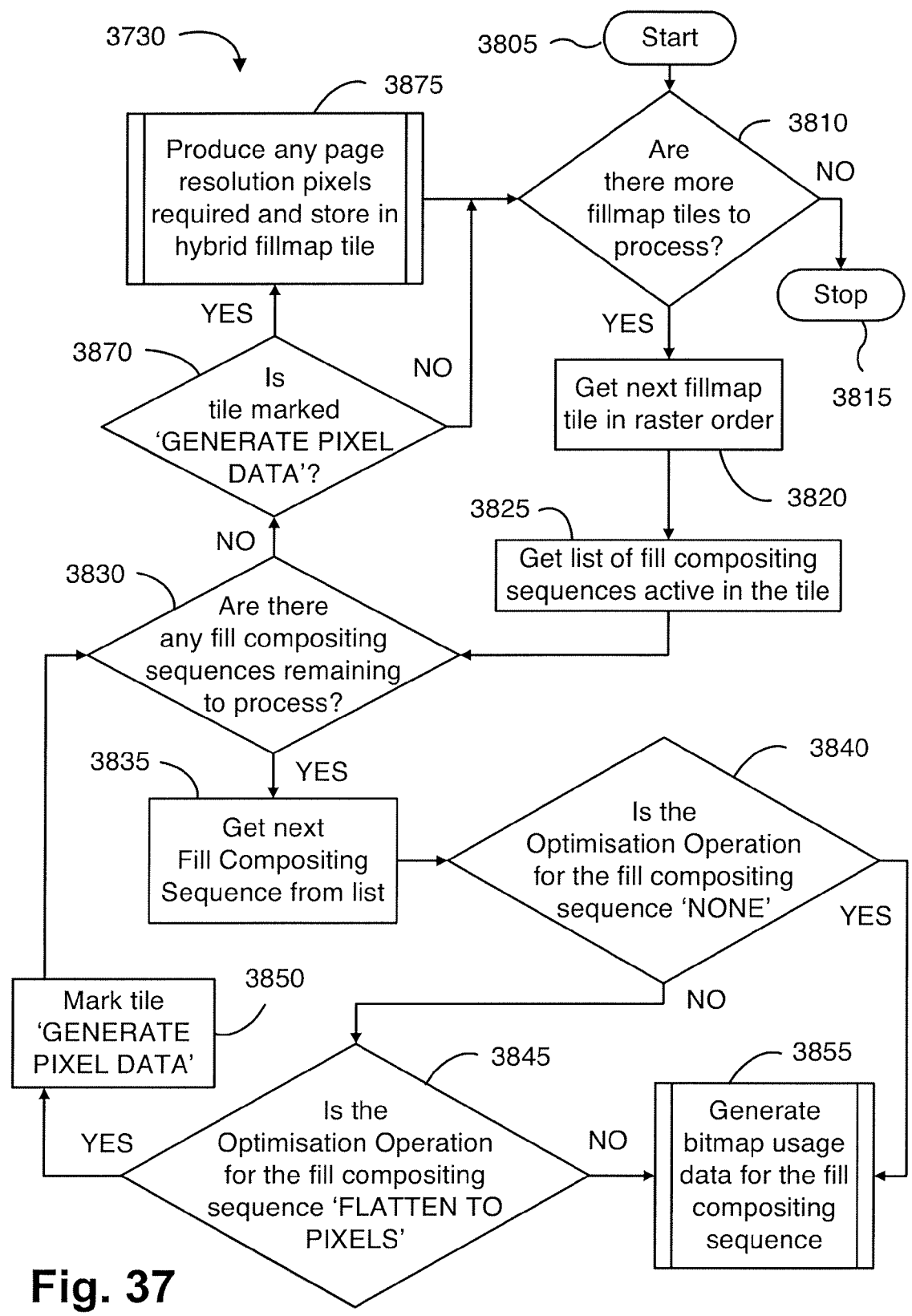
FIG. 37 is a flow diagram of a method of fillmap tile processing.

FIG. 37 is a schematic flow diagram of the fillmap tile processing step 3730 of the fillmap processing method 3710 shown in FIG. 36. Here, fillmap tiles are processed individually and in raster order. Processing begins at step 3805 and proceeds immediately to step 3810 where it is determined whether there are more fillmap tiles to process. If it is determined in step 3810 that there are more tiles to process, then processing proceeds to step 3820 where the next tile in raster order is retrieved. Alternatively, if it is determined in step 3810 that all tiles have been processed, then processing proceeds to step 3815 where tile processing is terminated.

From step 3820 processing proceeds to step 3825 where the list of fill compositing sequences for the retrieved fillmap tile is then obtained. Processing then proceeds to step 3830. In steps 3830, 3835, 3840, 3845, 3850, and 3855 the method iterates through this list to determine whether any regions are to be converted to page resolution pixel values and to update bitmask usage data for source bitmap fills which can be cropped or flattened. Step 3830 determines whether there are any fill compositing sequences remaining in the list to be processed for the current tile. If it is determined in step 3830 that fill compositing sequences remain to be processed, then processing proceeds to step 3835 where the current fill compositing sequence is set to the next fill compositing sequence in the list of fill compositing sequences for the current tile. Processing then proceeds to step 3840.

In steps 3840, 3845, 3850 and 3855 the fill compositing sequence obtained in step 3835 is examined to determine if any optimisation processing is possible. Step 3840 determines whether the optimisation operation for the current fill compositing sequence is 'NONE'. If it is determined in step 3840 that the optimisation operation for the current fill compositing sequence is 'NONE', then no further optimisation processing is possible for the current fill compositing sequence, and processing returns to step 3830. If it is determined in step 3840 that the optimisation operation for the current fill compositing sequence is not 'NONE', then processing proceeds to step 3845, where it is determined whether the optimisation operation for the current fill compositing sequence is 'FLATTEN TO PIXELS'. If it is determined in step 3845 that the optimisation operation for the current fill compositing sequence is 'FLATTEN TO PIXELS', then there is at least one region within the tile which requires conversion to page resolution pixel values, and processing continues to step 3850 where the tile is marked with a flag 'GENERATE PIXEL DATA'. Processing then returns to step 3830. If it is determined in step 3845 that the optimisation operation is not 'FLATTEN TO PIXELS', then processing proceeds to step 3855. If processing has reached step 3855 then the fill compositing sequence optimisation operator must be either 'CROP' or 'FLATTEN TO BITMAP'. In step 3855 the bitmask for the source bitmap referenced by the fill compositing sequence is updated as described below with reference to FIG. 38. Processing then returns to step 3830.

If it is determined in step 3830 that there are no fill compositing sequences remaining to process for the current tile, then processing continues to step 3870 where it is determined whether the tile has been marked with the flag 'GENERATE PIXEL DATA'. If it is determined in step 3870 that the tile has not been marked with the flag 'GENERATE PIXEL DATA', then fillmap tile processing is complete for the current tile, and processing returns to step 3810. Alternatively, if it is determined in step 3870 that the tile has been marked with the flag 'GENERATE PIXEL DATA' then processing continues to step 3875 where all regions in the fillmap tile which reference a fill compositing sequence with optimisation operation 'FLATTEN TO PIXELS' are rendered to page resolution pixels as described in more detail below with reference to FIG. 40. In this way, the fillmap tile is converted to a hybrid fillmap tile. Processing then returns to step 3810.

Figure 38:
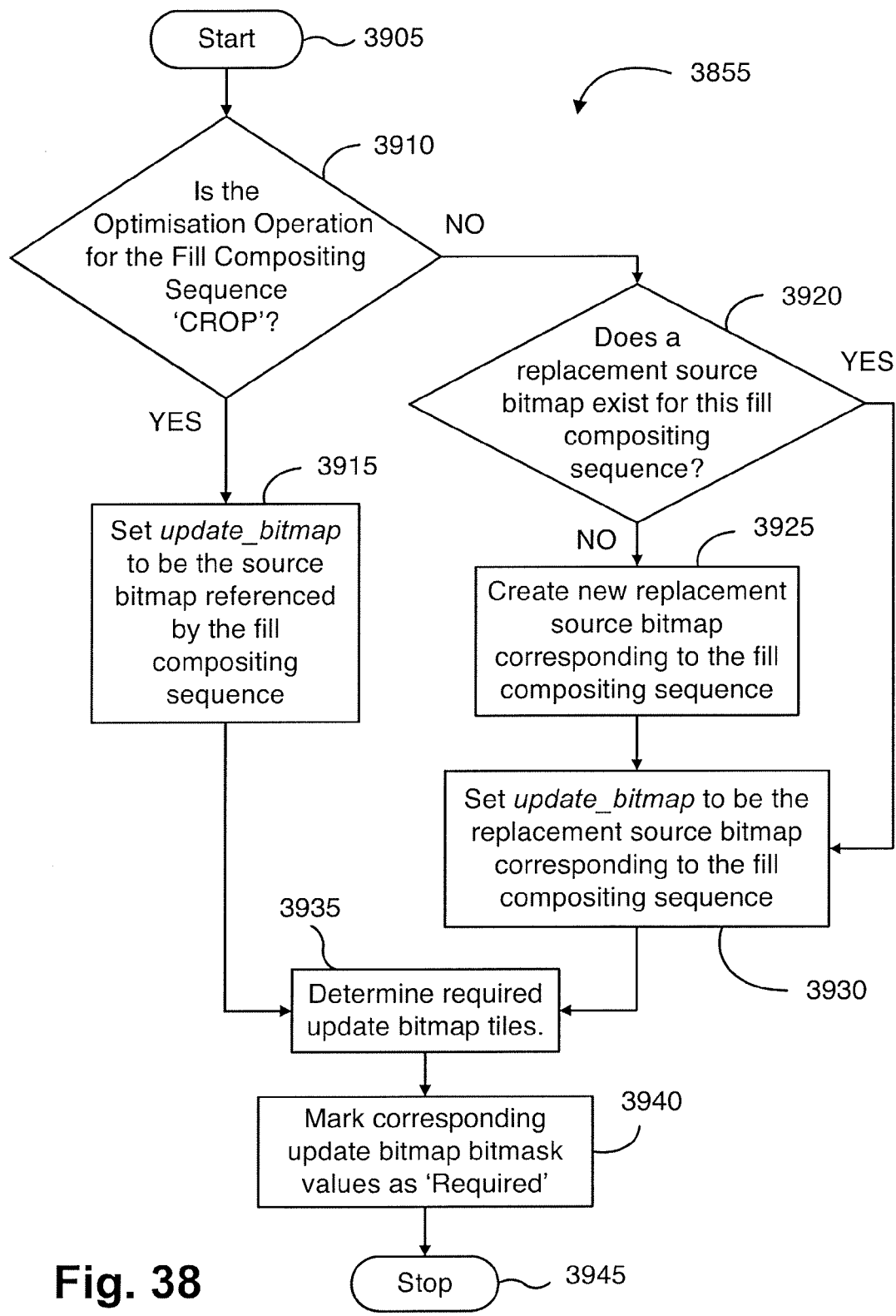
FIG. 38 is a flow diagram of a method of generating bitmap usage data as used in FIG. 37.

FIG. 38 is a schematic flow diagram illustrating step 3855 of FIG. 37 in more detail. Processing starts at step 3905 and proceeds immediately to step 3910 where it is determined whether the optimisation operation for the current fill compositing sequence is 'CROP'. If it is determined in step 3910 that the optimisation operation for the current fill compositing sequence is 'CROP' the processing continues to step 3915, where the variable update_bitmap is set to the single source bitmap referenced by the fill compositing sequence. Processing then continues to step 3935.

If it is determined in step 3910 that the optimisation operation for the fill compositing sequence is not 'CROP', but rather 'FLATTEN TO BITMAP', then processing proceeds to step 3920. Step 3920 determines whether a replacement source bitmap corresponding to this fill compositing sequence has previously been created. If it is determined in step 3920 that a replacement source bitmap has not been created, then processing proceeds to step 3925 where a replacement source bitmap is created as a null image for the current fill compositing sequence. Processing then proceeds to step 3930 where the variable update_bitmap is set to this new replacement source bitmap. This new replacement source bitmap contains no source bitmap data, and has a source bitmap bitmask which is of the same dimensions as the low resolution source bitmap currently referenced by this fill compositing sequence. All values of the newly created source bitmap bitmask are initialised to 'NOT REQUIRED'. Processing then continues to step 3935.

If in step 3920 it is determined that a replacement source bitmap corresponding to the fill compositing sequence exists, then processing continues to step 3930 where the variable update_bitmap is set to be the replacement source bitmap corresponding to the fill compositing sequence. Processing then continues to step 3935.

In step 3935, the tiles of the source bitmap stored in the variable update_bitmap which are needed in order to render pixels within the corresponding region of the current fillmap tile (determined in step 3820) are determined. Processing then proceeds to step 3940 where the required bitmap tiles are marked as such by setting the values in the bitmask associated with the variable update_bitmap which correspond to these required bitmap tiles to 'REQUIRED', if they have not already been so set during processing of a previous fillmap tile. Processing then proceeds to step 3945 where processing for the current fill compositing sequence concludes.

Figure 39:
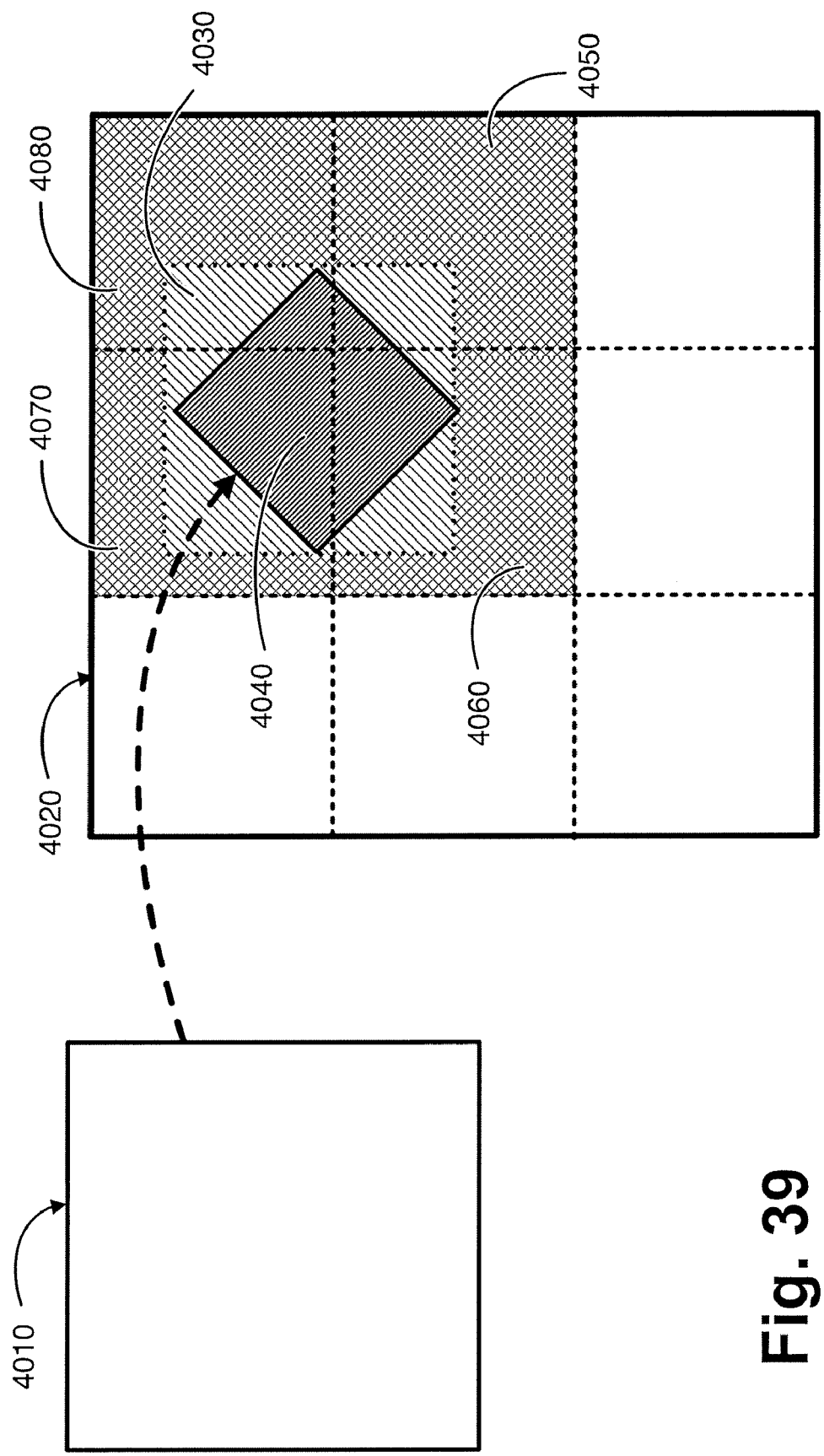
FIG. 39 illustrates fillmap tile to source bitmap tile mapping.

FIG. 39 is an illustration of the method of determining the required source bitmap tiles for a fillmap tile, as used in step 3940 of FIG. 38. A fillmap tile 4010 is mapped into source bitmap space 4020 via the inverse of the affine transform used to map the source bitmap to the page space. An upright bounding box 4030 in source bitmap space is "drawn" around the mapped fillmap tile 4040. The vertices of the bounding box 4030 are then snapped to the surrounding source bitmap tile vertices to determine the source bitmap tiles required to render the fillmap tile to pixels. In the example shown, the bounding box 4030 touches source tiles 4050, 4060, 4070 and 4080, so these are the source bitmap tiles required to render fillmap tile 4010 to pixels.

Figure 40:
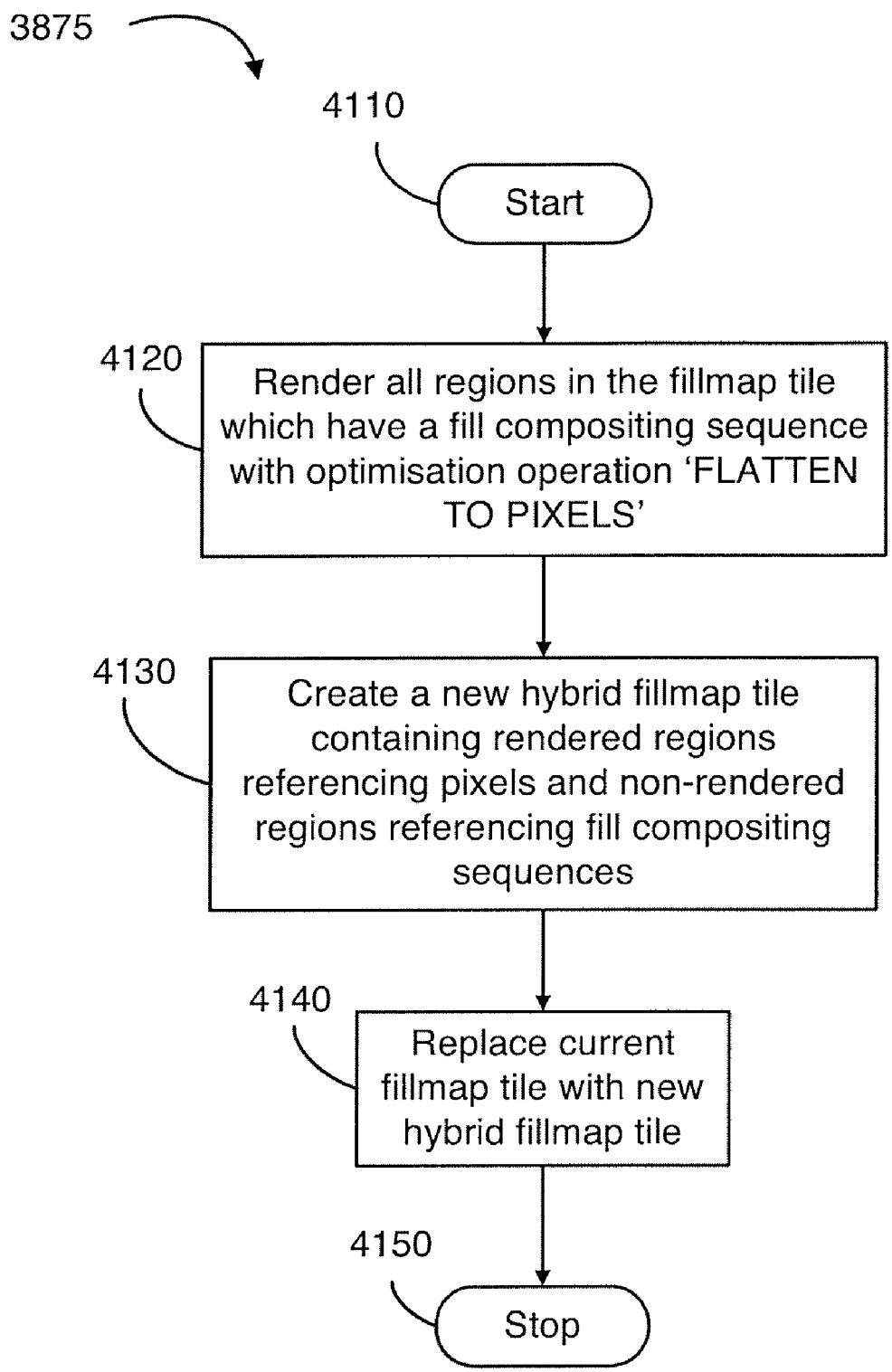
FIG. 40 is a flow diagram of the method of hybrid tile creation as used in FIG. 37.

FIG. 40 is a schematic flow diagram illustrating step 3875 of FIG. 37 in more detail. Processing begins at step 4110 and proceeds to step 4120 where all regions which reference fill compositing sequences with the optimisation operation 'FLATTEN TO PIXELS' are rendered to pixels. Processing then proceeds to step 4130 where a new hybrid fillmap tile is created which contains all those regions rendered to pixels in step 4120 and those regions which were not rendered to pixels. Processing then proceeds to step 4140 where the current fillmap tile is replaced by the newly created hybrid fillmap tile. Processing continues to step 4150 where processing terminates.

Figure 41:
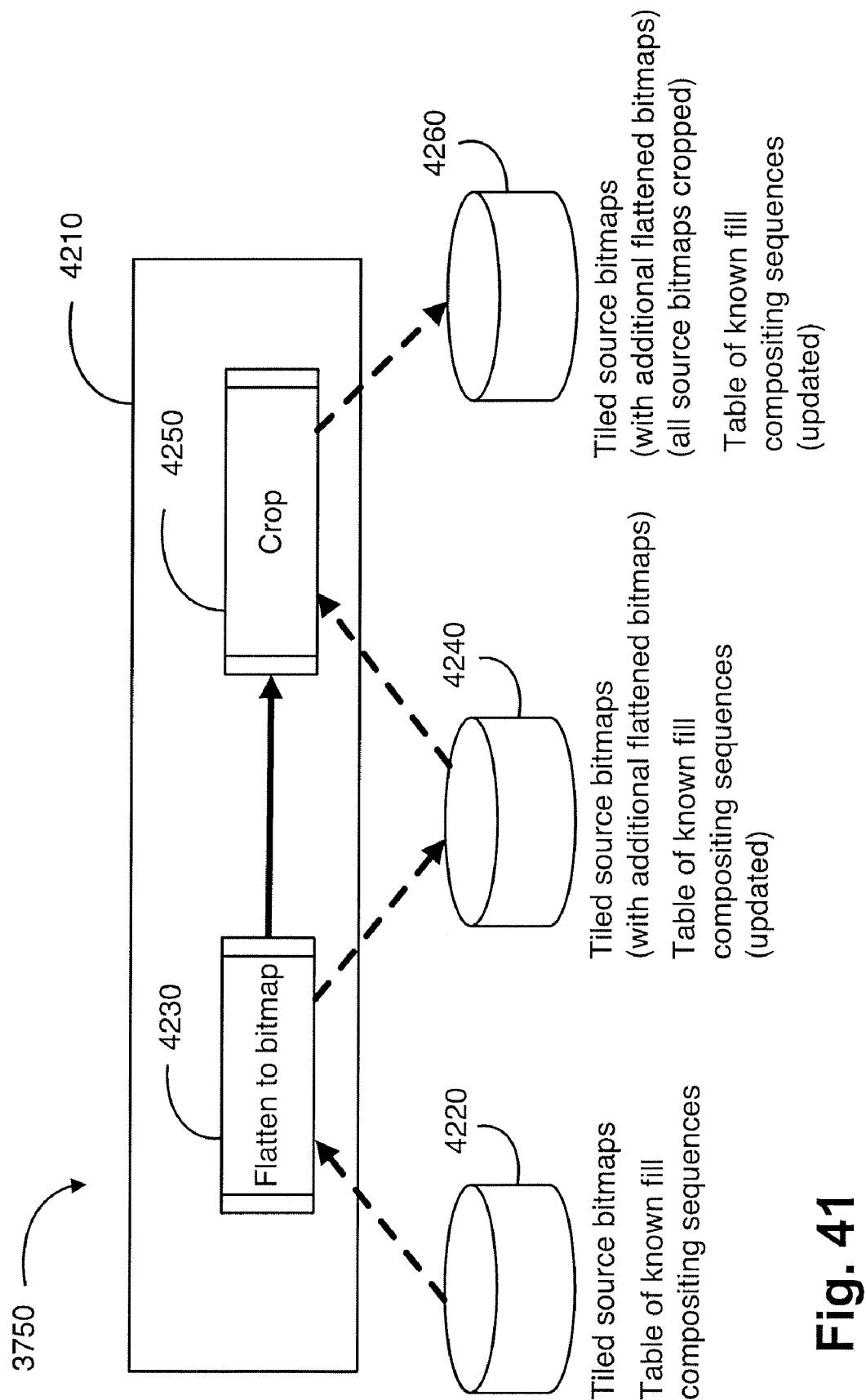
FIG. 41 is a block diagram of the disclosed method of source bitmap processing as used in FIG. 37.

Referring back to FIG. 36, source bitmap processing is performed once fillmap tile processing is completed. FIG. 41 shows a schematic flow diagram of the source bitmap processing step 3750 in more detail.

The source bitmap process 3750 comprises a flatten to bitmap stage 4230 and a cropping stage 4250. The source bitmap process 3750 receives data 4220 comprising the table of fill compositing sequences and all the tiled source bitmaps for the fillmap as a whole. The flatten to bitmap stage 4230 processes any fill compositing sequences that can be flattened to an opaque bitmap. For all fillmap fill compositing sequences with the optimisation operation 'FLATTEN TO BITMAP', the fill compositing sequence is composited to create bitmap data for any replacement source bitmap tiles whose corresponding bitmask value is 'REQUIRED'. The fillmap's fill compositing sequence is then updated to reference the replacement source bitmap. This produces data 4240 comprising an updated set of tiled source bitmaps and the updated table of fill compositing sequences.

Next, for all fillmap fill compositing sequences with the optimisation operation 'CROP', the cropping stage 4250 discards any source bitmap tile whose corresponding bitmask value is 'NOT REQUIRED'. This produces data 4260 comprising the final updated set of tiled source bitmaps and the updated table of fill compositing sequences.

Figure 42:
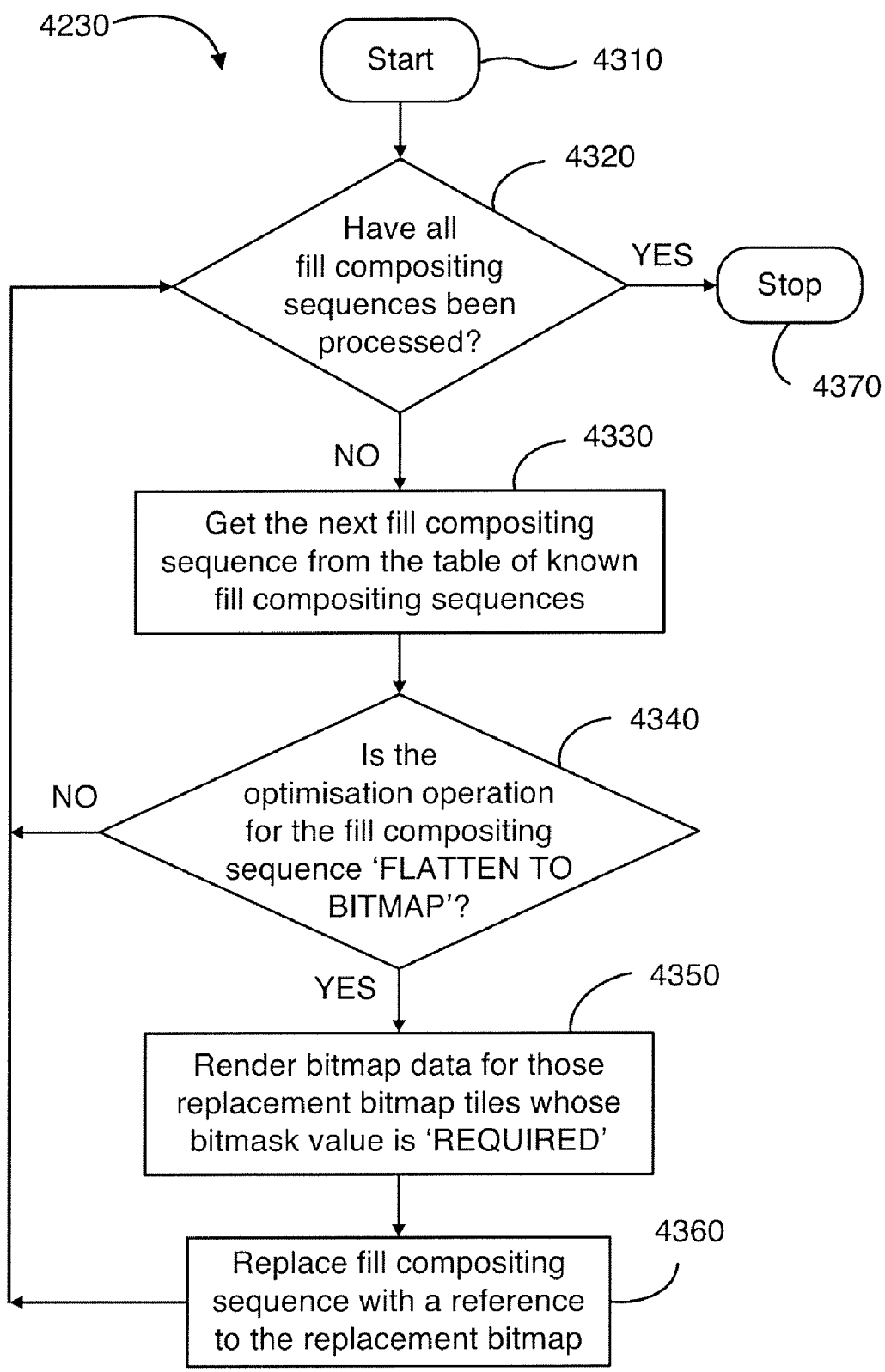
FIG. 42 is a flow diagram of the flatten to bitmap method as used in FIG. 37.

FIG. 42 is a schematic flow diagram showing the flatten to bitmap process 4230 is from FIG. 41 in detail. Processing starts in step 4310 and proceeds directly to step 4320 where it is determined whether all fill compositing sequences in the table of fill compositing sequences have been processed. If it is determined in step 4320 that all compositing sequences have been processed, the flatten to bitmap processing terminates in step 4370. Otherwise step 4320 proceeds to step 4330, which retrieves the next fill compositing sequence from the table of fill compositing sequences. Processing then continues from step 4330 to step 4340, which tests whether the optimisation operation for this fill compositing sequence is 'FLATTEN TO BITMAP'. If it is determined in step 4340 that the optimisation operation is not 'FLATTEN TO BITMAP', processing returns to step 4320 to continue iterating through the table of fill compositing sequences. Alternatively, if in step 4340 it is determined that the optimisation operation for the fill compositing sequence is 'FLATTEN TO BITMAP', processing continues to step 4350, where the fill compositing sequence is rendered at source resolution to create bitmap data for all replacement bitmap tiles whose corresponding bitmask value is 'REQUIRED'. Once these replacement bitmap tiles are created, processing moves from step 4350 to step 4360, where the current fill compositing sequence is replaced in the table of fill compositing sequences by a reference to the replacement bitmap. Processing then returns to step 4320.

Figure 43:
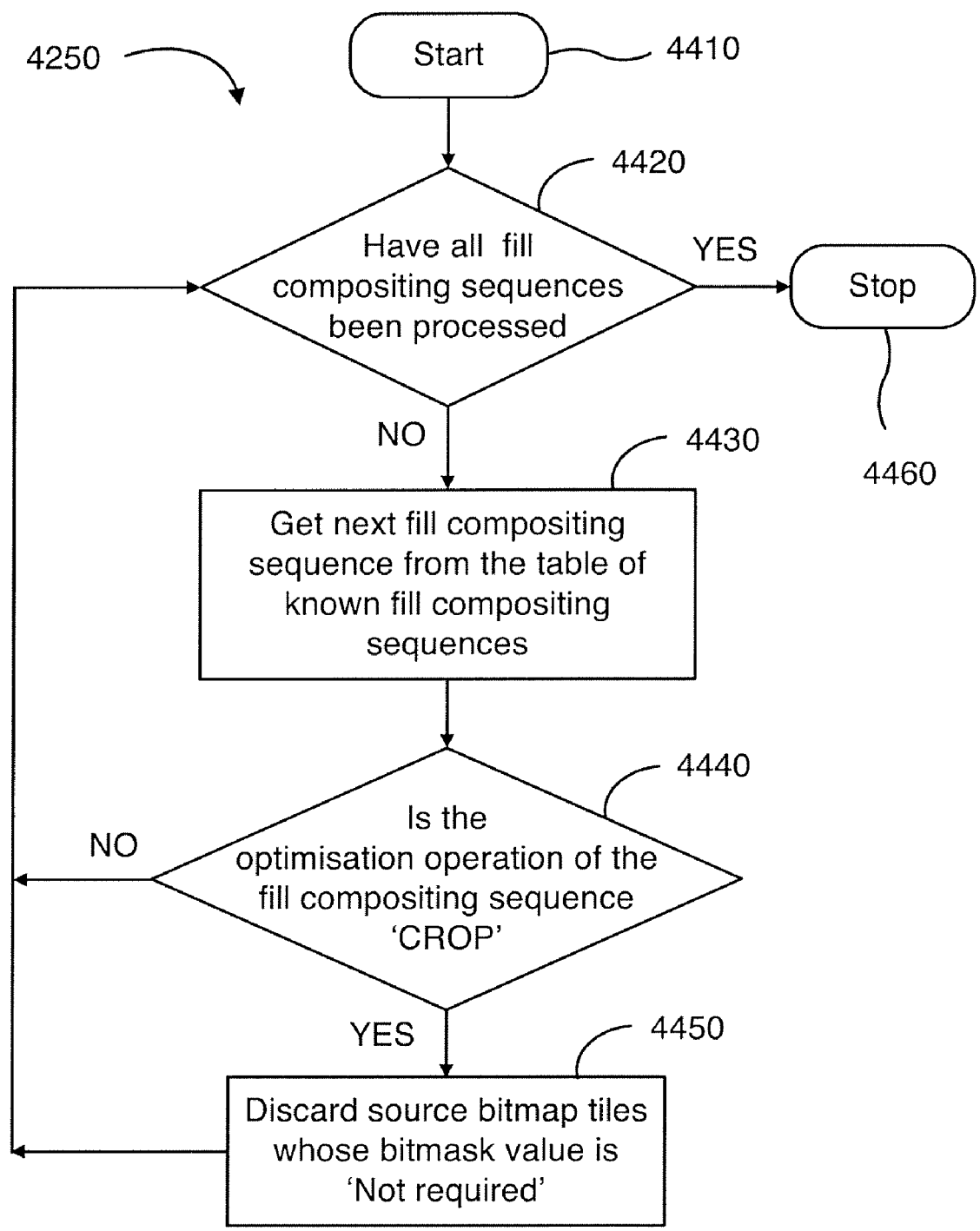
FIG. 43 is a flow diagram of the source bitmap cropping process as used in FIG. 37.

FIG. 43 is a schematic flow diagram of the source bitmap cropping process 4250 from FIG. 41. Processing begins at step 4410 and proceeds directly to step 4420 where it is determined whether all fill compositing sequences in the table of fill compositing sequences have been processed. If it is determined in step 4420 that all fill compositing sequences have been processed, processing continues to step 4460, where the bitmap cropping processing terminates. Otherwise processing continues from step 4420 to step 4430, where the next fill compositing sequence from the table of fillmap fill compositing sequences is obtained. The source bitmap cropping process 4250 then proceeds to step 4440 which tests whether the optimisation operation for this fill compositing sequence is 'CROP'. If it is determined in step 4440 that the optimisation operation is not 'CROP', processing returns to step 4420 to continue iterating through the table of fill compositing sequences. Alternatively, if in step 4440 it is determined that the optimisation operation for the fill compositing sequence is 'CROP', processing moves to step 4450. At step 4450, all unmarked source bitmap tiles, i.e. those tiles whose corresponding bitmask value is 'NOT REQUIRED', are discarded. Once these source bitmap tiles are discarded, processing then returns to step 4420.

Figure 44:
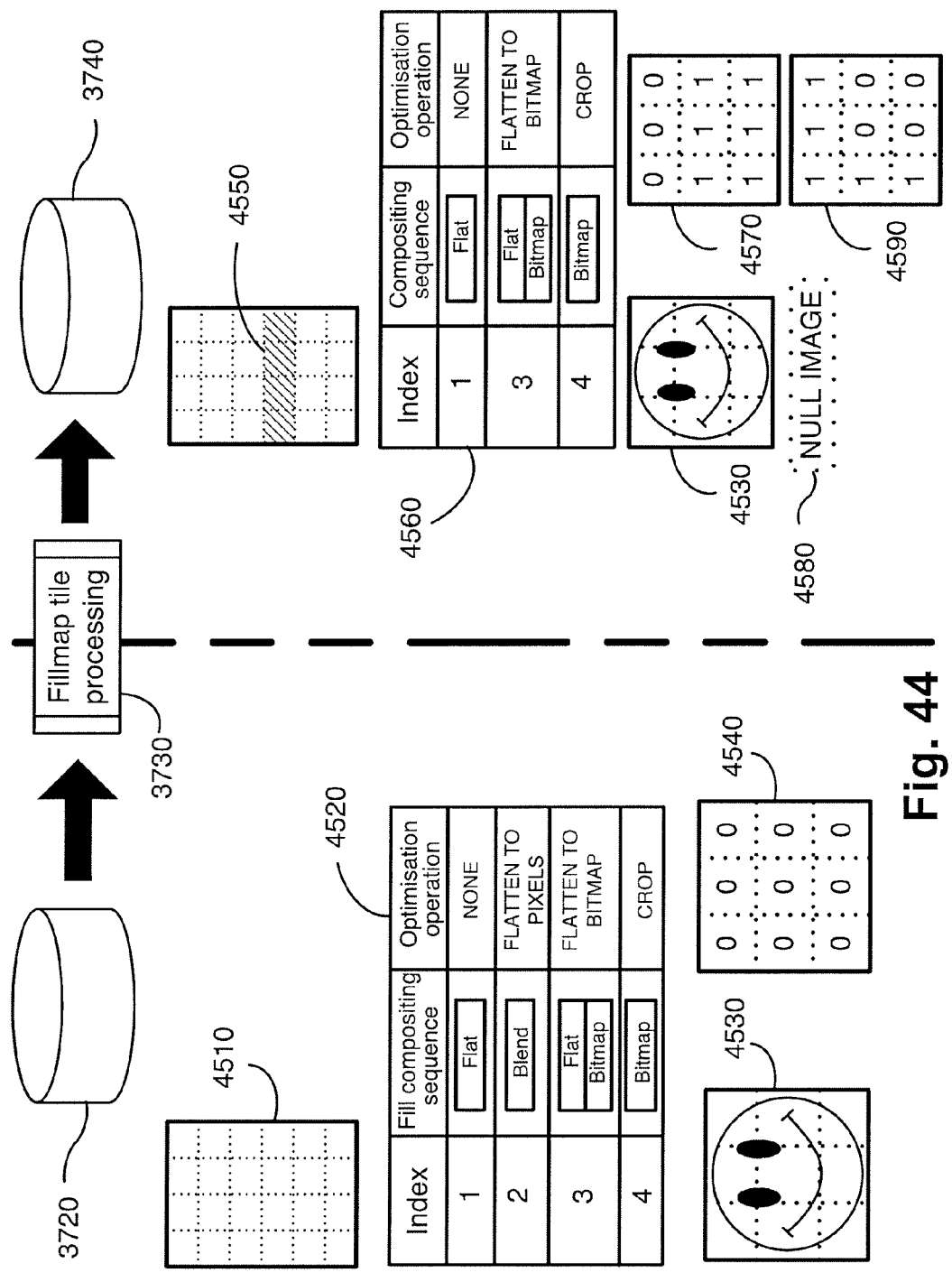
FIG. 44 illustrates fillmap tile processing for the page shown in FIG. 31.

FIG. 44 illustrates the fillmap tile processing stage 3730 for the page 3210 given in FIG. 31. Fillmap tile processing receives a tiled fillmap 4510, its corresponding table of fill compositing sequences 4520 (corresponding to table 3410), and the single referenced source bitmap 4530 (corresponding to object 3240), together with corresponding source bitmap bitmask 4540. In both FIG. 44 and FIG. 45, a value of '0' in the source bitmap bitmask represents 'NOT REQUIRED', while the value '1' represents 'REQUIRED'.

On completion of fillmap tile processing 3730, all page resolution pixel values have been generated and stored within hybrid fillmap tiles 4550. An updated table 4560 of fill compositing sequences has been generated with fill compositing sequence 2 removed, and the bitmask 4540 for the original source bitmap has been updated to 4570 to indicate source bitmap tile usage. Finally, a null replacement bitmap 4580 has been created, together with a corresponding bitmask 4590 indicating replacement bitmap tile usage.

Figure 45:
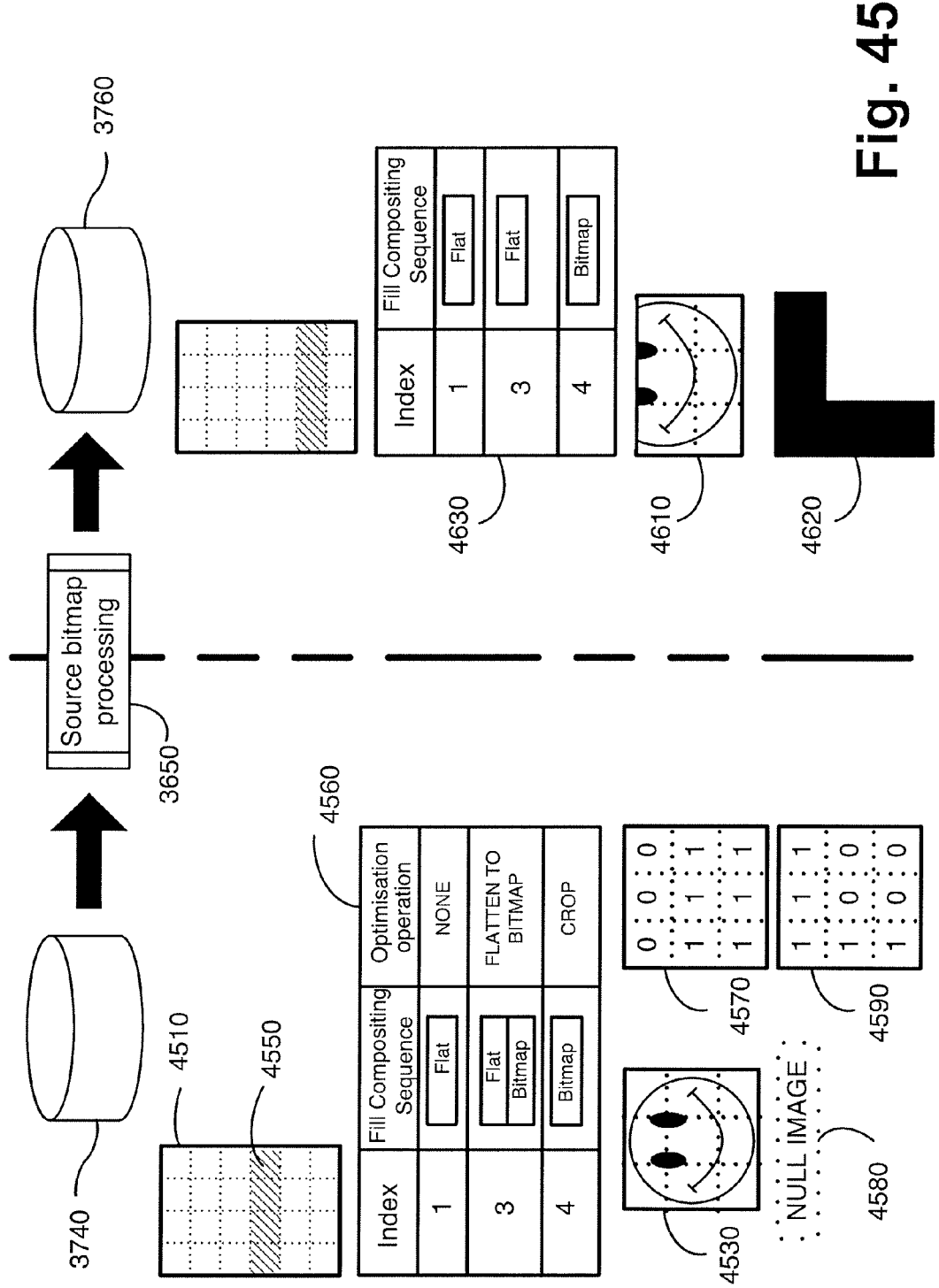
FIG. 45 illustrates source bitmap processing for the page shown in FIG. 31.

FIG. 45 illustrates the source bitmap processing stage 3750 for the page 3210 given in FIG. 31. Source bitmap processing receives a tiled fillmap 4510 containing hybrid tiles 4550, the table of fill compositing sequences 4560, the referenced tiled source bitmap 4530 with corresponding source bitmap bitmask 4570, and the null replacement bitmap 4580 with corresponding replacement bitmap bitmask 4590.

On completion of source bitmap processing, the fillmap 4510 is unchanged. However, the redundant source bitmap tiles of the referenced source bitmap 4530 have been cropped 4610 according to the usage information in source bitmap bitmask 4570. Bitmap tile data for the single replacement bitmap 4620 has been created according to usage information in bitmask 4590. Finally, the table of fill compositing sequences 4560 has been updated to 4630 to reference the new replacement bitmap 4620. The table entry 3 which previously referenced the fill compositing sequence comprising a source bitmap and a semitransparent flat fill now references the replacement bitmap 4620. On completion of source bitmap processing, bitmap bitmasks 4570 and 4590, and optimisation operation data from the table of fill compositing sequences are discarded.

Referring once more to system 100 (FIG. 1), by describing the operation of the pixel rendering apparatus 180 in detail, computer programs are also implicitly disclosed. It should be apparent to the person skilled in the art that the individual steps described herein are to be put into effect by computer programs and that the computer programs are not intended to be limited to any particular control flow.

Such computer programs may be stored on any computer readable medium to form a computer program product. The computer readable medium may include storage to devices such as magnetic or optical disks, memory chips, or other storage devices suitable for interfacing with a processor. The computer programs when loaded and executed on such processors results in the respective component parts of system 600 described herein.

The foregoing describes only some embodiments of the present invention, and modifications and/or changes can be made thereto without departing from the scope and spirit of the invention, the embodiments being illustrative and not restrictive.

We claim:

1. A computer-implemented method of generating a page representation to be rendered to a raster image from a plurality of objects, the computer comprising a processor configured to implement the method and a storage device to store the page representation, each of the plurality of objects comprising an outline and a fill, said method comprising the steps of:
   generating a first intermediate page representation from a first subset of the plurality of objects, said generating step comprising the sub-steps of:
      determining a first plurality of disjoint regions from the outlines of the first subset of objects, the first plurality of disjoint regions defined by a first plurality of pixel-aligned edges, wherein at least one of the plurality of edges extends over a plurality of scanlines; and
      deriving a fill compositing sequence for each of the first plurality of disjoint regions, wherein a fill compositing sequence comprises one or more fills and one or more operators;
   storing the first intermediate page representation comprising the edges and the fill compositing sequences on the storage device; and
   merging the first intermediate page representation with a second subset of the plurality of objects to create the page representation, wherein an object in the second subset of the plurality of objects overlaps an object in the first subset of the plurality of objects, said merging step comprising the sub-steps of:
  determining a plurality of spans, each of the plurality of spans comprising an intersection of a scanline and the outlines of the second subset of objects;
  utilizing the plurality of spans and the edges of the first intermediate page representation to determine a second plurality of disjoint regions, the second plurality of disjoint regions defined by a second plurality of pixel-aligned edges, wherein at least one of the plurality of edges extends over a plurality of scanlines; and
  deriving a fill compositing sequence for each of the second plurality of disjoint regions, wherein said fill compositing sequence is used to render the raster image.

2. The method according to claim 1, wherein said step of determining the plurality of spans further comprising the sub-steps of:
  (i) determining a list of the object edges that are active on the current scanline; and
  (ii) defining the span to be bounded by an adjacent pair of edges on current scanline, or by an edge and an adjacent boundary of said raster image, wherein the associated fill compositing sequence comprises the fills associated with the active object edge that contribute to the pixels in the span.

3. The method according to claim 1, further comprising a step of spooling the page representation to be rendered.

4. The method according to claim 1, said step of deriving the fill compositing sequence further comprising the steps of:
  determining whether said fill compositing sequence references a source bitmap fill at a lower resolution than a page resolution of the raster image; and if so
  discarding a portion of the source bitmap fill that does not contribute to the pixel value within the disjoint region.

5. The method according to claim 4, wherein the source bitmap fill comprises a plurality of source bitmap tiles, and said discarding comprises the steps of:
  marking at least one of the plurality of source bitmap tiles that contribute to the pixel value within the disjoint region, and
  discarding at least one unmarked source bitmap tile from the source bitmap tiles.

6. The method according to claim 5, further comprising the steps of:
  compositing said marked source bitmap tiles with at least one flat fill to generate bitmap data for a further source bitmap; and
  replacing said fill compositing sequence with a further fill compositing sequence comprising the generated further source bitmap tile.

7. The method according to claim 1, further comprising the steps of:
  determining whether the fill compositing sequence requires compositing at a page resolution, and if so:
  compositing the fill compositing sequence at said page resolution to generate pixel values for the defined region,
  storing said generated pixel values in the page representation, and discarding the composited fill compositing sequence.

8. An apparatus for generating a page representation to be rendered to a raster image from a plurality of objects, each object comprising an outline and a fill, said apparatus comprising:
  means for generating a first intermediate page representation from a first subset of the plurality of objects, said means for generating comprising;
    determining a first plurality of disjoint regions from the outlines of the first subset of objects, said first plurality of disjoint regions defined by a first plurality of pixel-application aligned edges, at least one of the plurality of edges extends over a plurality of scanlines; and
    means for deriving a fill compositing sequence for each of the first plurality of disjoint regions, wherein a fill compositing sequence comprises one or more fills and one or more operators;
  means for storing the first intermediate page representation comprising the edges and the fill compositing sequences; and
  means for merging the first intermediate page representation with a second subset of the plurality of objects to create the page representation, wherein an object in the second subset of the plurality of objects overlaps an object in the first subset of the plurality of objects, said means for merging comprising:
    means for determining a plurality of spans, each of the plurality of spans comprising an intersection of scanline and the outlines of the second subset of the plurality of objects;
    means for utilizing the plurality of spans and the edges of the first intermediate page representation to determine a second plurality of disjoint regions, said second plurality of disjoint regions defined by a second plurality of pixel-aligned edges, at least one of the plurality for edges extends over a plurality of scanlines; and
    means for deriving a fill compositing sequence for each of the second plurality of disjoint regions, wherein said fill compositing sequence is used to render the raster image.

9. A computer readable storage device having recorded thereon a computer readable program for controlling the operation of a data processing apparatus on which the program code executes to perform a method of generating a page representation to be rendered to a raster image, from a plurality of objects, each object comprising an outline and a fill, said method comprising the steps of:
  generating a first intermediate page representation from a first subset of the plurality of objects, said generating step comprising each sub-steps of:
    determining a first plurality of disjoint regions from the outlines of the first subset of the plurality of objects, said first plurality of disjoint regions defined by a first plurality of pixel-aligned edges, wherein at least one of the plurality of edges extends over a plurality of scanlines; and
    deriving a fill compositing sequence for each of the first plurality of disjoint regions, wherein a fill compositing sequence comprises one or more fills and one or more operators;
  storing the first intermediate page representation comprising the edges and the fill compositing sequences on a storage device; and
  merging the first intermediate page representation with a second subset of the plurality of objects to create the page representation, wherein an object in the second subset of objects overlaps an object in the fist subset of the plurality of objects, said combining step comprising the sub-steps of:

determining a plurality of spans, each of the plurality of spans comprising an intersection of a scanline and the outlines of the second subset of the plurality of objects;

utilizing the plurality of spans and the edges of the first intermediate pa a representation to determine a second plurality joint regions, said second plurality of disjoint regions defined by a second plurality of pixel-aligned edges, wherein at least one of the plurality of edges extends over a plurality of scanlines; and deriving a fill compositing sequence of each of the second plurality of disjoint regions, wherein said fill compositing sequence is used to render the raster image.

* * * * *